United States Patent
Wojcik et al.

(10) Patent No.: US 7,050,995 B2
(45) Date of Patent: *May 23, 2006

(54) SYSTEM FOR MANAGING ORDERS AND METHOD OF IMPLEMENTATION

(75) Inventors: Casimir M. Wojcik, Tampa, FL (US);
Paul A. Pretto, Clearwater, FL (US);
Jim Courier, Dade City, FL (US); Bob Morrow, Plant City, FL (US); Joseph R. Wehry, Jr., Riverview, FL (US);
Paul Kuczynski, Tampa, FL (US);
Matt F. Edwards, Dade City, FL (US);
Mark A. Schnieder, Land O'Lakes, FL (US); Thomas W. Loftus, Plant City, FL (US); Brian Schnieders, Temple Terrace, FL (US); Thomas C. Bernardi, Odessa, FL (US); Craig Raymond Pellerin, Tampa, FL (US);
Ron D. Bushaw, Plant City, FL (US);
Michael Lewis Schebell, Lutz, FL (US); Bill Hartley, Sring Hill, FL (US);
Sheila Cappel, Lutz, FL (US);
Kimberly Weisgarber, Webster, FL (US); Henry Lee Vogler, Brandon, FL (US); Louis Duane Ferguson, Zephyrhills, FL (US)

(73) Assignee: Lykes Bros., Inc., Tampa, FL (US)

(*) Notice: Subject to any disclaimer, the term of this patent is extended or adjusted under 35 U.S.C. 154(b) by 314 days.

This patent is subject to a terminal disclaimer.

(21) Appl. No.: 10/193,339

(22) Filed: Jul. 11, 2002

(65) Prior Publication Data
US 2002/0188530 A1 Dec. 12, 2002

Related U.S. Application Data

(63) Continuation of application No. 09/083,681, filed on May 22, 1998, which is a continuation of application No. 08/474,970, filed on Jun. 7, 1995, now Pat. No. 5,758,329, which is a continuation of application No. 08/111,242, filed on Aug. 24, 1993, now Pat. No. 5,666,493.

(51) Int. Cl.
*G06F 17/60* (2006.01)
(52) U.S. Cl. .................. 705/28; 705/402; 705/14
(58) Field of Classification Search .................. 705/28, 705/26, 27, 402
See application file for complete search history.

(56) References Cited

U.S. PATENT DOCUMENTS 4,734,858 A * 3/1988 Schlafly ....................... 705/26

(Continued)

OTHER PUBLICATIONS

Witt, Clyde E. "Publisher Creates Textbook Case for Distribution" Material Handling Engineering, v43n3, pp.: 41-47 Mar. 1998.*

(Continued)

*Primary Examiner*—Lynda Jasmin
(74) *Attorney, Agent, or Firm*—Womble Carlyle

(57) ABSTRACT

The system of this invention manages customer orders using vendor supplied software systems interfaced on a real-time basis to touch the data in each system on a real-time basis. In effect, there is horizontal communication between the various components of the system such as inventory, purchasing, order management and receipt, logistics and inventory to have continual data flow without using a vertical software interface. As a result, customer orders are received on a real-time basis using screens that are user friendly to promptly take orders, to verify customer data and to verify the ability to meet those orders. Transmission of documents within the system is minimized thereby making it more efficient, timely and cost efficient.

40 Claims, 42 Drawing Sheets

U.S. PATENT DOCUMENTS

| | | | | |
|---|---|---|---|---|
| 4,799,156 | A | * | 1/1989 | Shavit et al. .................. 705/26 |
| 4,972,318 | A | | 11/1990 | Brown et al. |
| 4,984,155 | A | * | 1/1991 | Geier et al. .................... 705/26 |
| 5,038,283 | A | * | 8/1991 | Caveney ....................... 705/28 |
| 5,101,352 | A | * | 3/1992 | Rembert ........................ 705/8 |
| 5,117,364 | A | * | 5/1992 | Barns-Slavin et al. ....... 705/402 |
| 5,265,006 | A | * | 11/1993 | Asthana et al. ................ 705/8 |
| 5,273,392 | A | * | 12/1993 | Bernard et al. ............. 414/807 |
| 5,291,396 | A | | 3/1994 | Calcerano et al. |
| 5,310,997 | A | | 5/1994 | Roach et al. |
| 5,311,438 | A | | 5/1994 | Sellers et al. |
| 5,493,491 | A | | 2/1996 | Calcerano et al. |
| 5,666,493 | A | * | 9/1997 | Wojcik et al. ................. 705/26 |
| 5,758,329 | A | * | 5/1998 | Wojcik et al. ................. 705/28 |

OTHER PUBLICATIONS

Eastman Kodak Streamlines Its Product Distribution. Industrial Engineering, Sep. 1990.
Enterprise Logistics Help Make-to-Stock Manufacturers. Industrial Engineering, Jul. 1990.
Transportation Software Gets a New Look. Distribution, Nov. 1992.
Advanced Interorganizational Operations in Logistics Processes. Computer Integrated Manufacturing, May 1992.
Software Helps You Take Loads Off Your Feet. Transportation & Distribution, Jul. 1991.
Load Planning for Shipments of Low Density Products. European Journal of Operational Research, Jan. 1990.
Keying into Versatility. Distribution, May 1993.
Communicating Time-Phased Requirements to Suppliers Significantly Reduces Cost, Changes Business Methods. Industrial Engineering, Nov. 1988.
Computer Systems in Logistics and Distribution. A Guide to Implementation and Application, 1991.

* cited by examiner

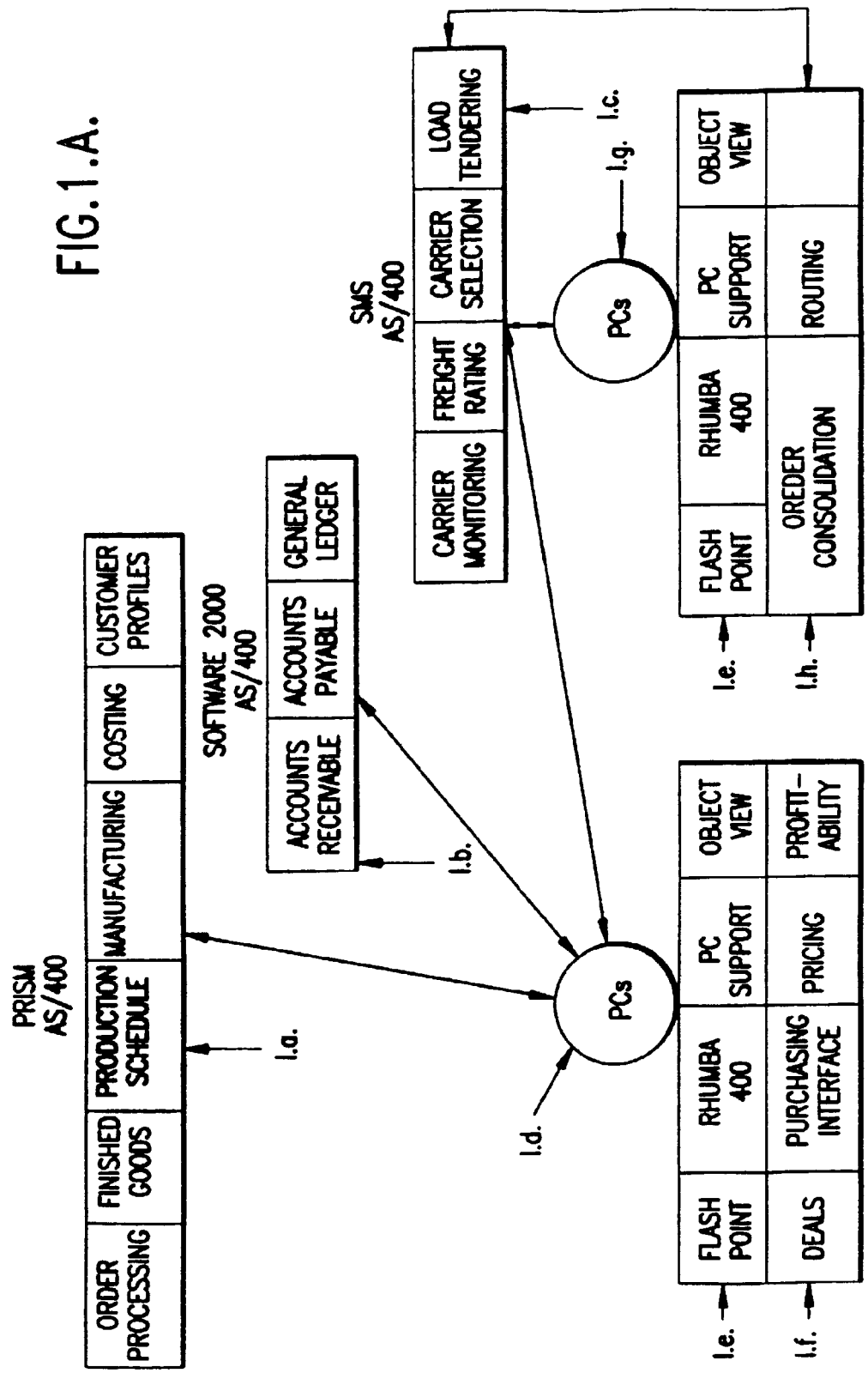
FIG.1.A.

FIG.5

ORDER FULFILLMENT SCREEN

FILE  EDIT  SELECTIONS  HELP

MAINTAIN CUSTOMER MASTER CONTROLS — ARDCUM1 — PAGE

COMPANY
CUSTOMER NUMBER  999999
HOME ??????  USO
NAME  LYKES RECREATIONAL DATA CENTER  ☐ ACTIVE
ADDRESS  HIGHWAY 54 EAST

CITY  ZEPHYRHILLS  STATE [FL]  COUNTY ☐
POSTAL CODE  22532
TELEPHONE  1314464353  FAX  1321326541
ALIAS
NATIONAL ACCOUNT
PARENT (CO/CUSTOMER)
TAX ID
SALES LEVEL ID
SALESPERSON CODE
LOCKBOX NUMBER
STATEMENT DESTINATION

STATEMENT ORDER
● BILL TO — 46
○ SHIP TO — 48

[OK]  [CANCEL]  [EXIT]

FIG. 6

SYSTEM FOR MANAGING ORDERS AND METHOD OF IMPLEMENTATION

CROSS REFERENCE TO RELATED APPLICATION

This application is a continuation of application Ser. No. 09/083,681, filed May 22, 1998, which is a continuation of application Ser. No. 08/474,970 filed Jun. 7, 1995 now U.S. Pat. No. 5,758,329, issued May 26, 1998, which is a continuation application Ser. No. 08/111,242, filed Aug. 24, 1993 now of U.S. Pat. No. 5,666,493, issued Sep. 9, 1997.

BACKGROUND OF THE INVENTION

1. Field of the Invention

The present invention relates to a system for providing efficient management and fulfillment of customer orders in a food processing and distribution environment. More specifically, the invention relates to a system having an order management function, integrated with financial services to process orders promptly and create current and efficient financial records. Likewise the system includes a logistics function for processing orders and consolidating them into appropriate loads for delivery over transportation systems. Integrated in the system is an inventory management system that cooperates with the order management function, financial services function and logistics function to properly manage the raw material and finished product through a warehouse for delivery to a customer. Also included in the system is a purchasing system based upon an electronic catalog that streamlines the purchasing function by using blanket vendor orders to approve the purchase of the necessary materials to support the system.

2. Related Art

A software package named Flashpoint provided by Knowledge Ware, Inc. is utilized to create screens for customer service representatives. PRISM software provided by Marcam is used to operate IBM AS/400 mini computers to support terminals using Flashpoint software. SMS software, supplied by ITLS of Canada, resides on the AS/400 platform to support the logistics function and TRACS software supplied by Westerley Development Corp., supports PCs driven by the TRACS software. Rhumba/400 software is supplied by Wall Data, as well as PC Support by IBM to enable communications between an AS/400 platform and PC terminals. Furthermore, Software 2K provided by Software 2000 of Boston, Mass. supports financial functions. Marcam has issued U.S. Pat. No. 4,864,507 pertaining to a method and apparatus for process manufacture control. The aforementioned vendor software and patent are hereby incorporated by reference.

None of the foregoing software is integrated to provide an efficient order management system. In the past, these software packages operated vertically. This prior architecture does not provide the necessary system integration for efficient real-time data management.

SUMMARY OF THE INVENTION

The present invention has the ability to efficiently receive customer orders, process them, create appropriate financial records and coordinate this information with the inventory and manufacturing functions to prepare and load consolidated shipment for transportation to a customer. This is accomplished by touching each sub-system's database on a real time basis by horizontal integration of each system to create a harmonious flow of data between systems. This unique concept allows for continual updating of the system over time.

Most importantly, a deal with a customer is settled before the order is taken by using the horizontal data flow between systems to verify availability to meet the order, integrate customer data and price the deal while speaking to the customer.

It is an object of this invention to efficiently receive and process customer orders.

It is another objective of this invention to minimize costs of a food processing and supply business.

It is yet another object of this invention to create a system tailored to customer profiles for the delivery of products.

It is still another object of the invention to efficiently manage inventory.

It is yet another object of this invention to efficiently assemble and deliver loads of products to customers.

It is further an object of this invention to efficiently purchase and account for materials.

It is still another object of this invention to create a financial system to support each of the above objectives.

It is an object of this invention to create and integrate a system incorporating the above functions at minimal cost.

It is still another object of this invention to provide business control features to manage such a system.

BRIEF DESCRIPTION OF THE DRAWINGS

The invention is better understood by reading the following Detailed Description of the Preferred Embodiments with reference to the accompanying drawing figures, in which like reference materials refer to like elements throughout, and in which:

FIG. 1a illustrates the application software architecture.

FIG. 5 illustrates an order fulfillment screen for use by a customer service representative to maintain customer master controls.

FIG. 6 illustrates a screen for order entry by a customer service representative.

DETAILED DESCRIPTION OF THE PREFERRED EMBODIMENTS

Figure 1:
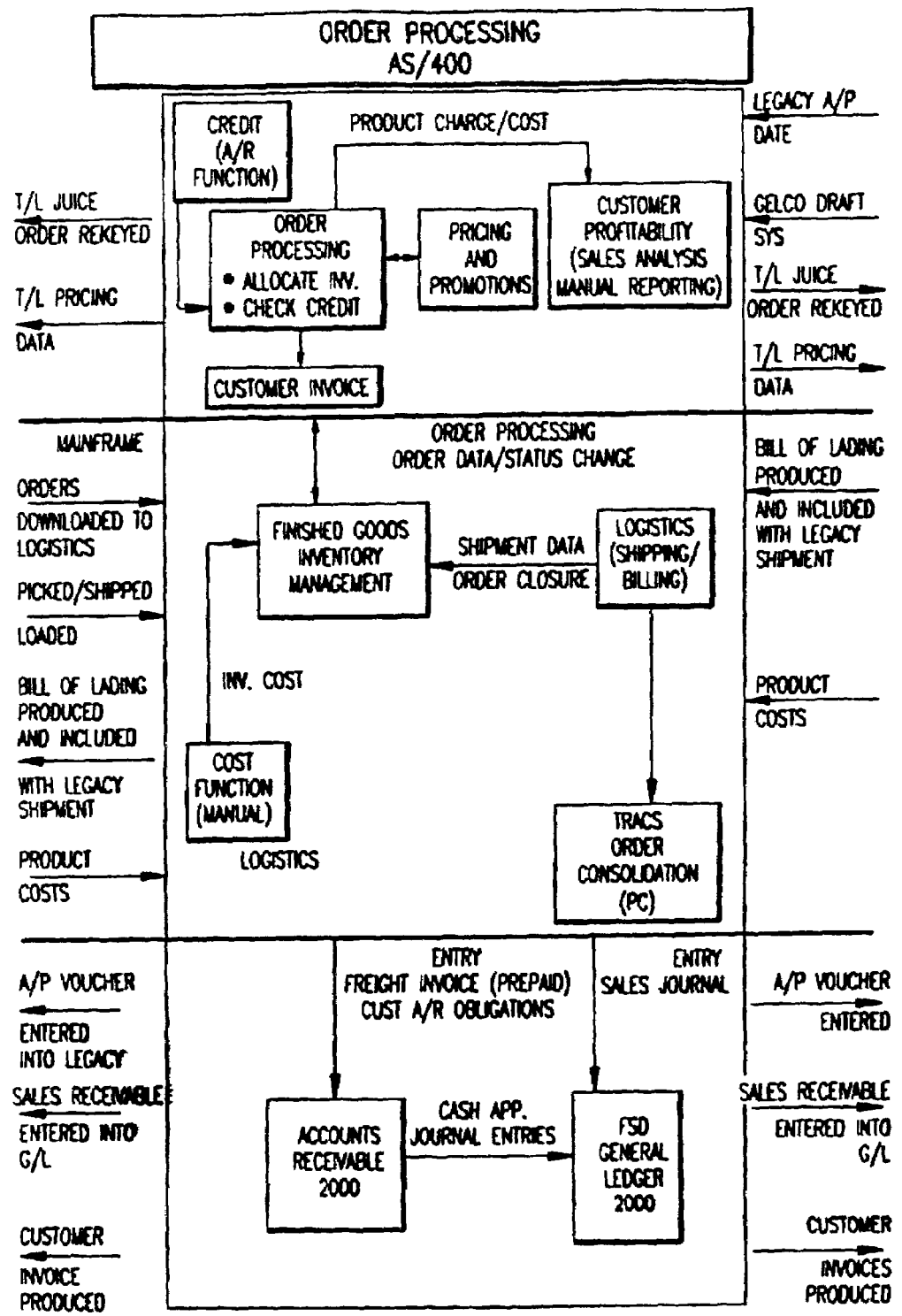
FIG. 1 illustrates an overview of the order management system.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar process.

I. Order Management

Referring to FIG. 1, it shows an overall schematic of the order processing data flow, based on an IBM AS/400 platform. The figure is self-explanatory and will be amplified in the following description of this invention by reference to the specific figures that go into the necessary detail.

Referring to FIG. 1*a*, there is shown the software functions resident in the networked AS/400s and interconnected PCs. The PRISM software resides on AS/400 1.*a*., Software 2000 resides on AS/400 1.*b*., and Shipment Management System (SMS) software resides on AS/400 1.*c*. AS/400's 1.*a*., 1.*b*., and 1.*c*. are networked and support PCs 1.*d*. each of which has resident enabler software Flashpoint shown as 1.*e*. Also, residing in these PCs are solution software 1.*f*. for creating DEALS, purchasing interface, pricing and profitability (hereinafter described). The SMS software in AS/400 1.*c*. support PCs 1.*g*. having Flashpoint software 1.*e*. and TRACS load builder software 1.*h*., hereinafter described. The implementation of both solution softwares (1.*f*. and 1.*h*.) are unique to this invention.

Generally, the GUI (graphic user interface) consolidates the various fields by pulling data from numerous screens into one screen used by a customer service representative. When a specific field is entered, the interface updates the supporting multiple screens thereby saving time while interacting with a customer. The resulting screen is user friendly and responds to queries in real time.

PRISM software on the AS/400 platform interfaces with Flashpoint software on the PC platforms to allow the creation of the above-described user friendly screens, and to interact with other modules of this invention. The enabler software between the PRISM customer order management software and the Flashpoint software is the Rhumba 400 and the IBM PC support. This interface also talks to Software 2000 that maintains accounts receivable (A/R) files. It also allows for keeping separate data stored in synchronization without having the data keyed in.

Figure 1B:
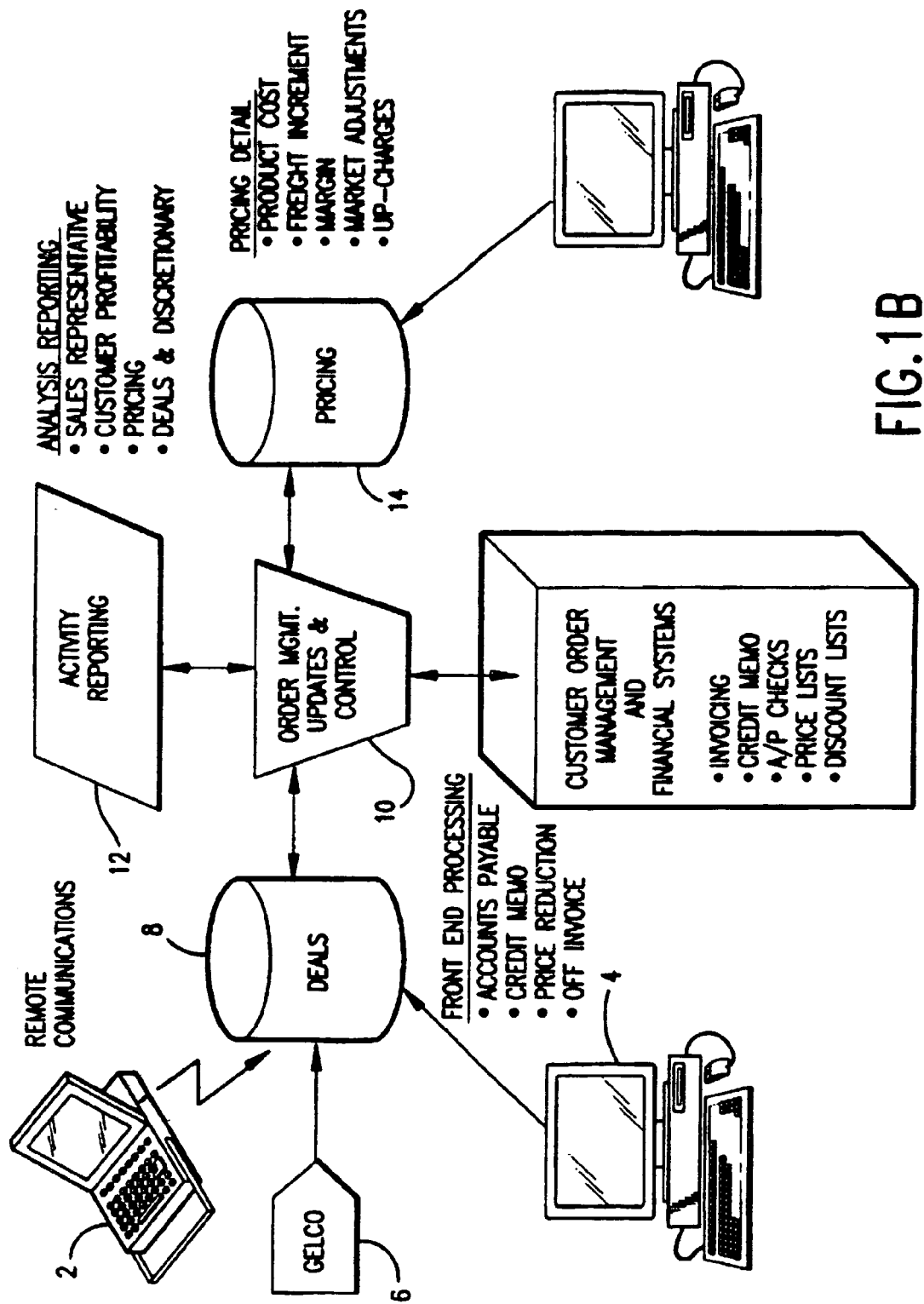
FIG. 1b illustrates the order management update and controls.

FIG. 1*b* further describes the relationship of input devices (2 and 4) to the system which captures sales representative and customer activities including financial data. Shown here is the use of Gelco checks (6) and input devices (2 and 4) to input and manage DEALS (8). Gelco (6) is an existing vendor that allows checks to be written to customers for a variety of reasons. The Gelco checks (6) and information from input devices (2 and 4) then are fed into the DEAL system (8), to properly reflect discretionary spending. The information from the DEAL system (8) is transmitted to the order management system and updates the control function (10) where it creates activity reporting (12) to give input for sales representative reports, customer profitability reports, pricing reports and deals and discretionary reports. The information also flows from order management update control to pricing function (14) where the details of pricing are worked out using product costs, freight increments, profit margin, market adjustment and other charges to create correct pricing. Likewise information flows from order management updates and controls to financial systems (16) where appropriate financial records are created. These include invoicing, credit memo, accounts payable checks, price lists and discount lists, among many others.

Figure 2:
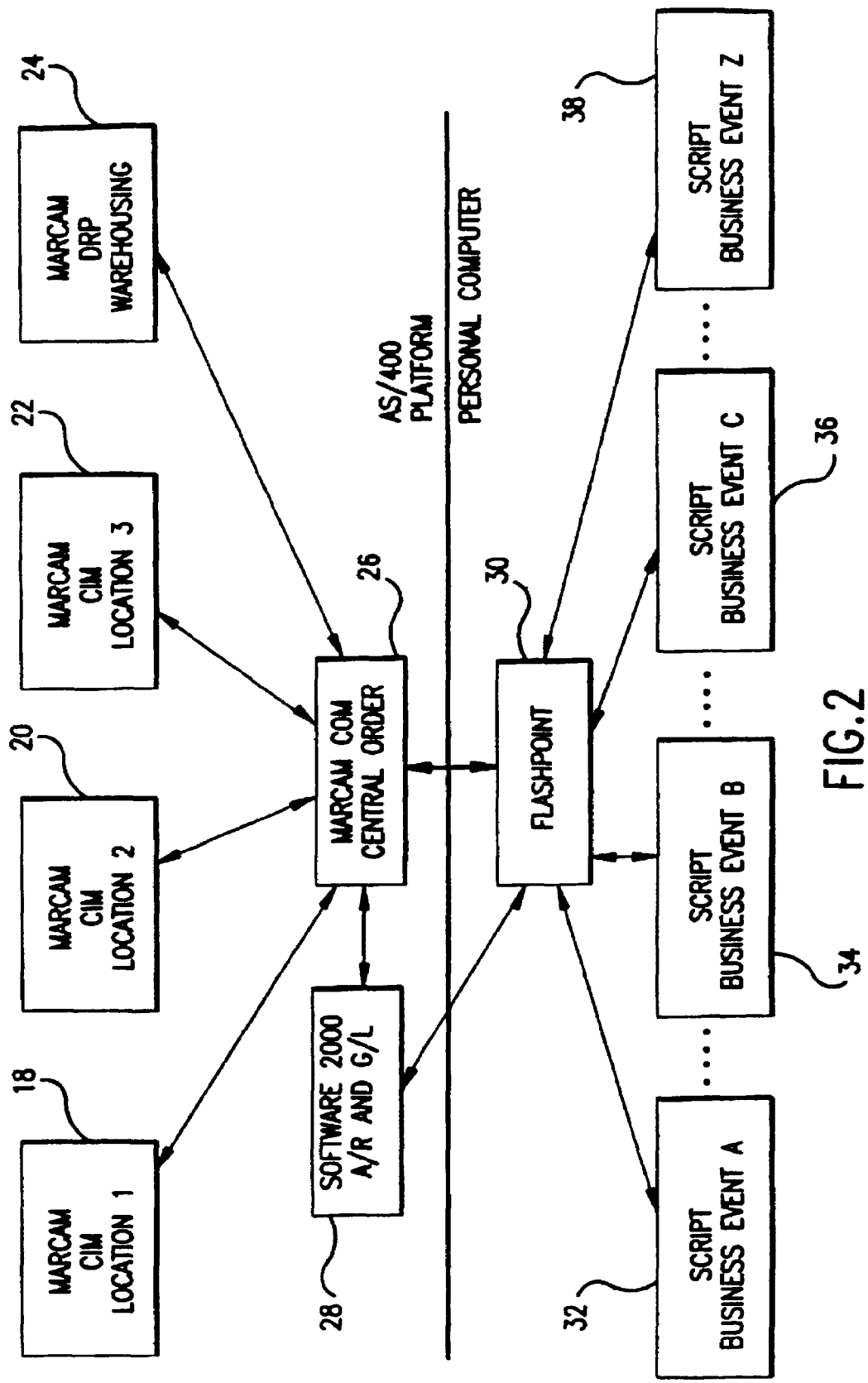
FIG. 2 illustrates the order fulfillment and architecture.

Referring to FIG. 2 the order fulfillment architecture has multiple inputs from computer integrated manufacturing systems at various locations as well as from warehousing database (24). Information on the activities at these various sites are fed into the central customer order management (COM) (26) function at the same time, information is fed to a software package supplied by a vendor known as Software 2000 (28). Accounts receivable and the general ledger functions are created using Software 2000 (28). The foregoing functions are performed on an AS/400 platform. Data from the customer order management system is transmitted to Flashpoint software (30), that resides on personal computers or like equipment such as work stations. This software is used as a basis to create business scripts (32, 34, 36 and 38) that are displayed on each personal computer to aid customer service representatives in taking and creating orders.

Figure 3:
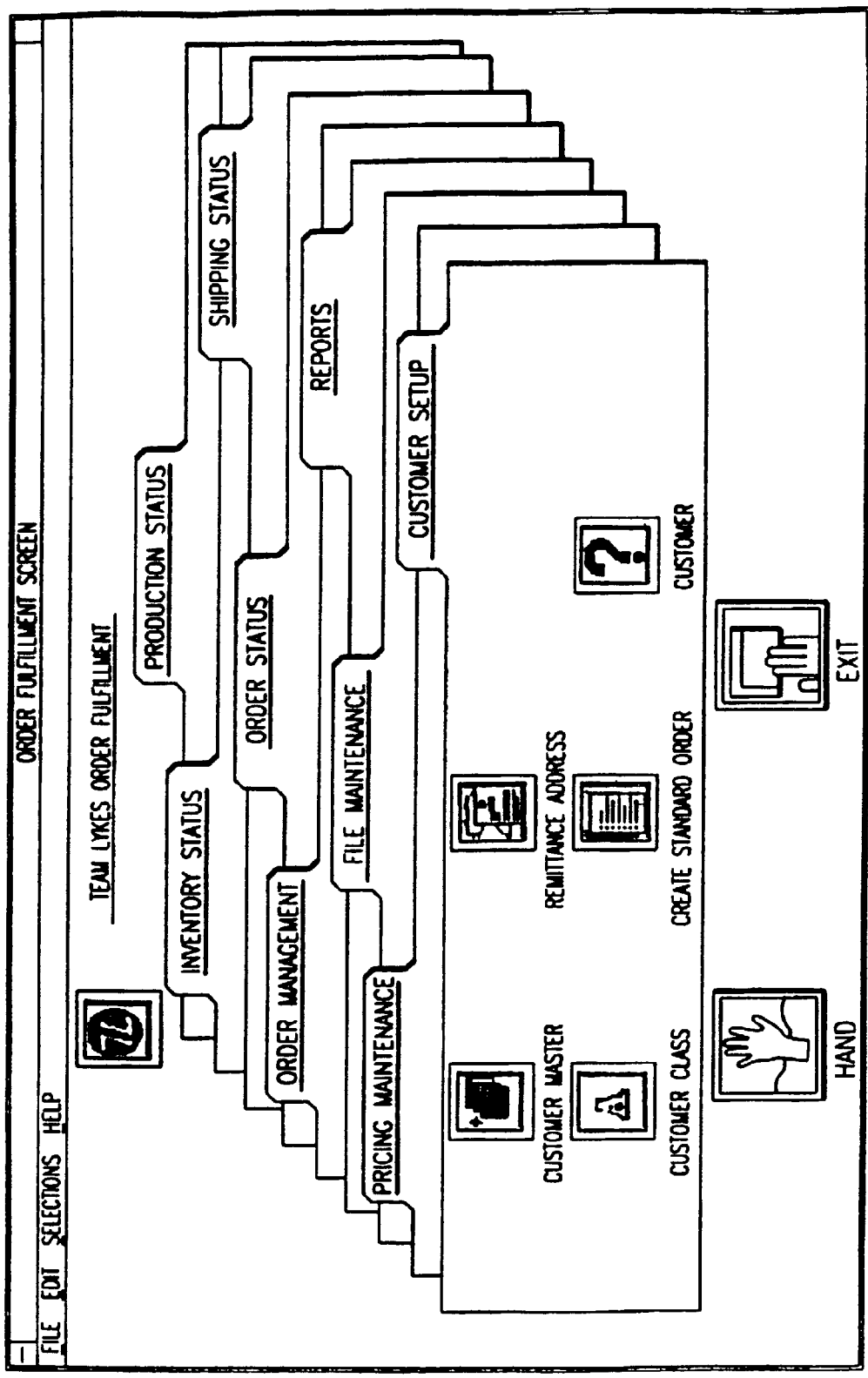
FIG. 3 illustrates an order fulfillment customer representative screen.

FIG. 3 demonstrates one of the screens created for the order fulfillment function used by a customer service representative. Shown in FIG. 3 are the various files that have been created based upon the Flashpoint software. Unique to this system is the windowing of such files in one location for a customer service representative so that he or she does not have to page back and forth through the software while engaged in a discussion with a customer to create an order. As a result, orders are taken and fulfilled promptly in a real-time mode because the file folder serves as a main menu which can be navigated using the mouse to select a business event unlike in the past where there was much delay in the process.

Figure 4:
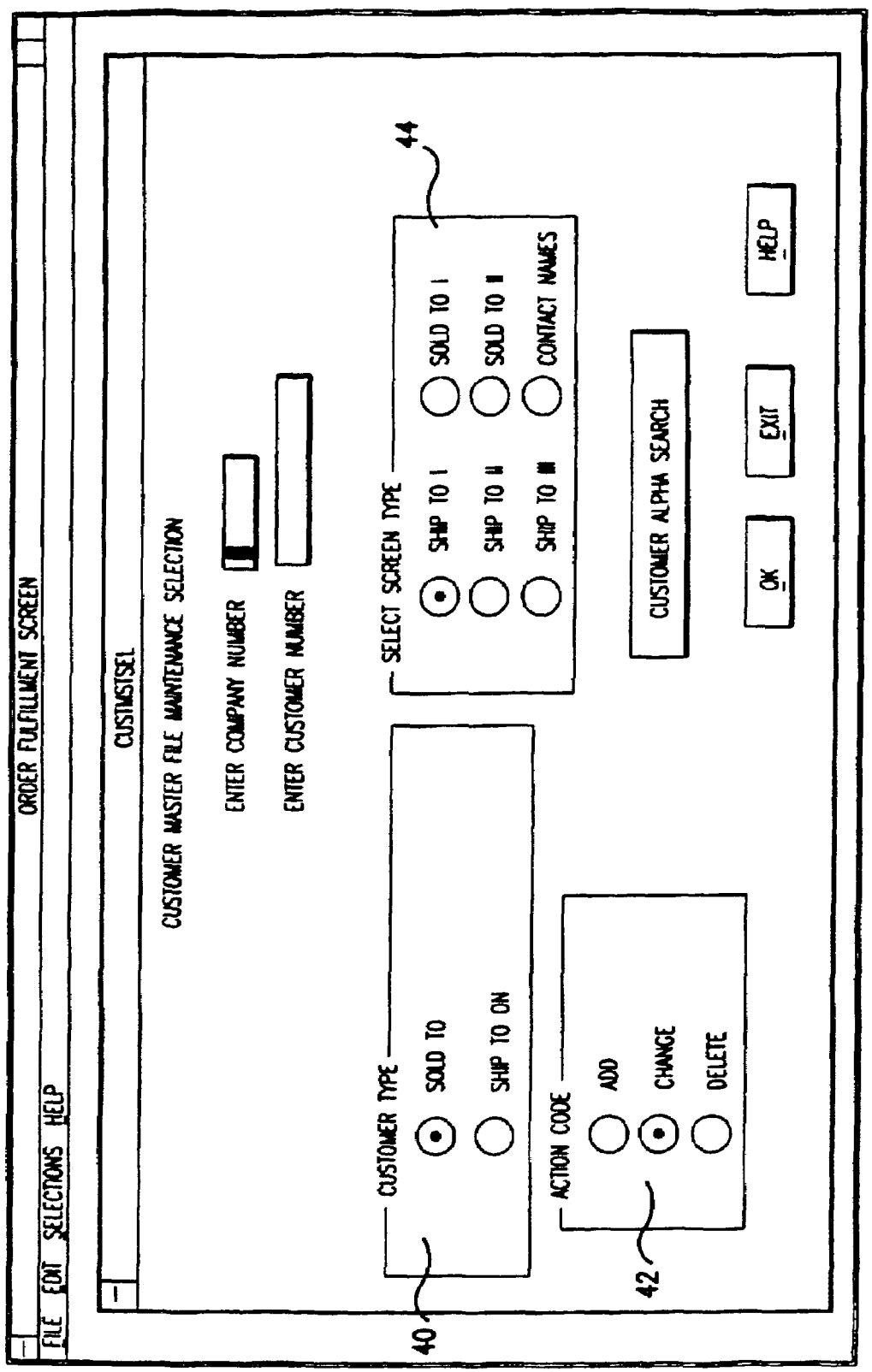
FIG. 4 illustrates an order fulfillment customer/master file maintenance selection screen for use by a customer service representative.

FIG. 4 shows another order fulfillment screen used by customer service representatives. It is entitled Customer Master File Maintenance Selection and by use of a mouse the customer service representative can quickly navigate through the basic data on a customer and if necessary update it based upon the interview. This submenu has been customized to a series of radio (40, 42) and push (44) buttons in order that the majority of the navigation can be accomplished by single mouse clicks.

FIG. 5 shows a further screen entitled Maintain Customer Master Control Screen used by customer service representatives. This screen has the basic data for each customer and once again can be navigated promptly to update it if necessary. If the information is correct it is the basis for creating the customer records used throughout this system. This screen is populated by data entered on previous screens in order that the screen user does not have to re-key, thus eliminating a potential for unsynchronized master files. Also, the "Bill To" and "Ship To" screen sequence is customized for this presentation. "Ship To" navigates forward through related screens then automatically navigates in reverse, and activates Software 2000 customer maintenance files saving the operator the navigation.

Figure 6:
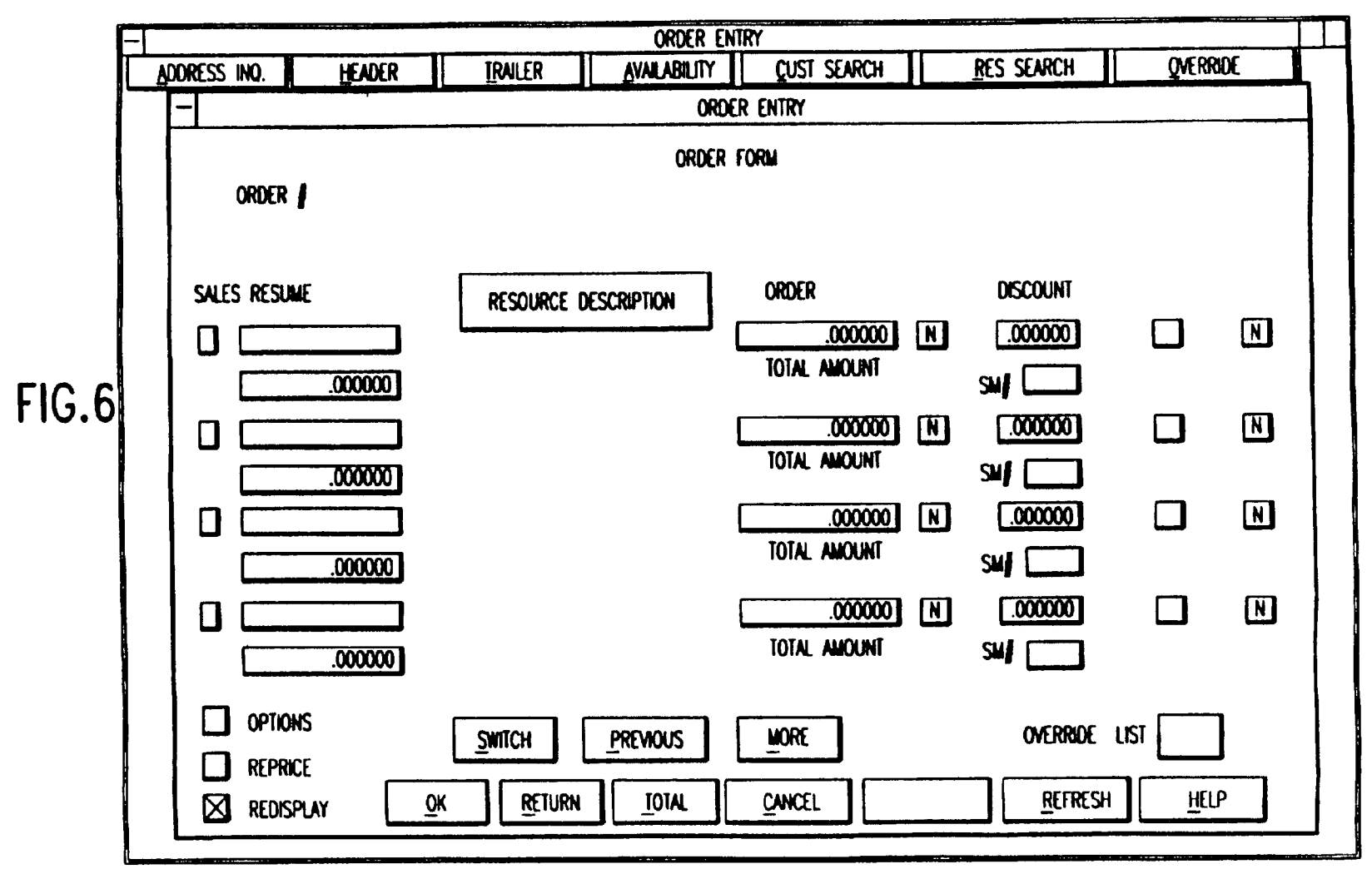

FIG. 6 is entitled Order Form and it has the basic information blocks to be completed in creating an order by a customer service representative. This screen has the series of buttons added to easily allow access to additional screens. The "Resource Description" (50) and "Sm" (52) fields were pulled in from other screens.

Shown in FIGS. 4, 5 and 6 are radio buttons as well as normal push buttons to indicate functions that may be selected by the operator to allow real-time navigation through the files supporting these screens. The feature of updating files forward and backwards results in error free master files.

II. Financial

The Exception Resolution process design (103) involves putting in procedures and policies to ensure customer service levels. This begins with the order acceptance process all the way through the collection and application of cash. For any problems that arise, that process will have procedures and policies to handle and resolve them.

Figure 7:
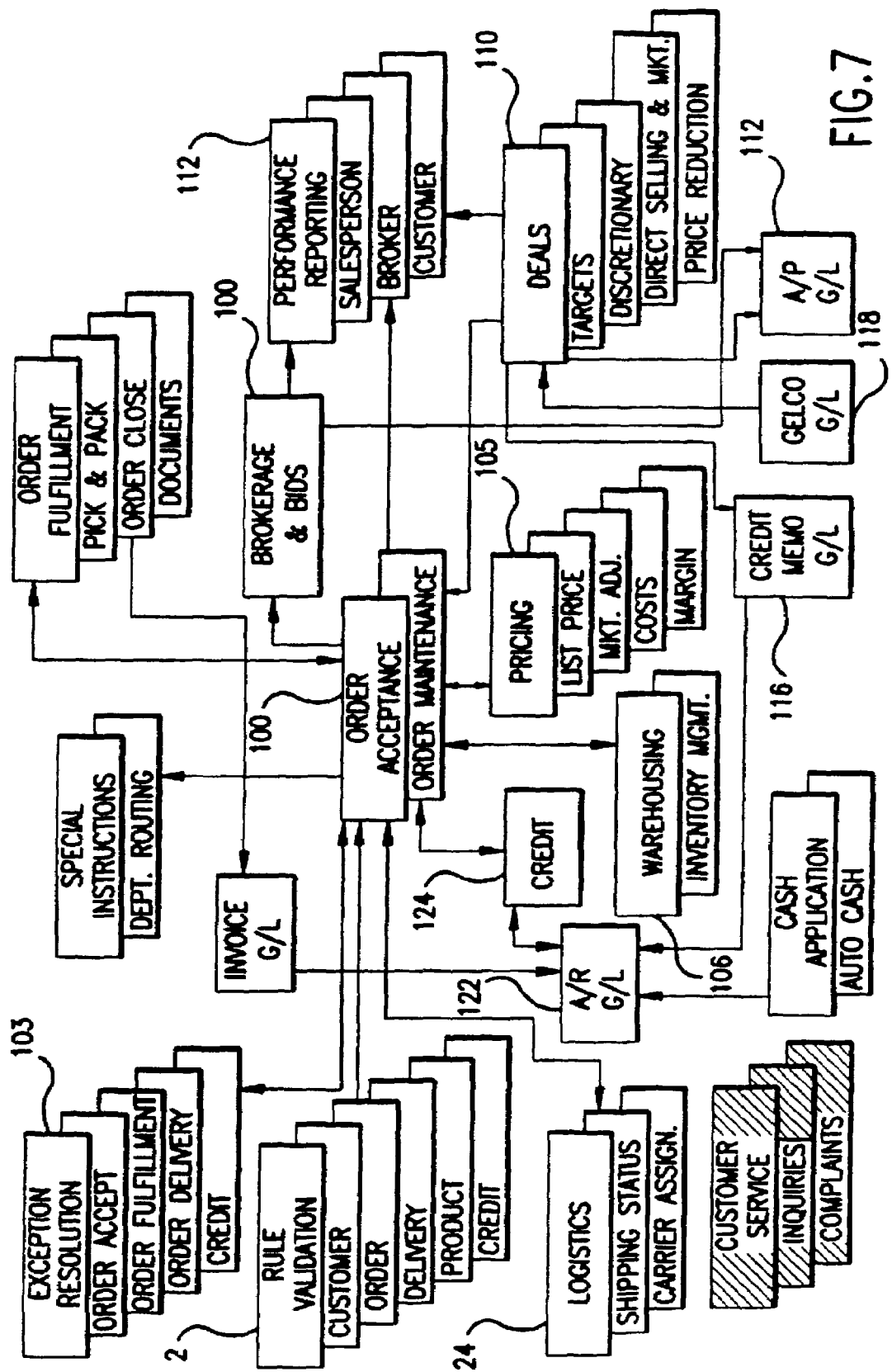
FIG. 7 illustrates the order acceptance system.

Referring to FIG. 7, Order Acceptance (100) is the beginning of the entire process. Data can enter the system via two ways, (1) manual entry from the customer service representative and the tool they use is a Knowledge Ware based application that interacts with the AS/400 PRISM system for manually taking orders or (2) by EDI transmissions. At order acceptance the system goes through a variety of validations shown on the left-hand side of this diagram as a process called Rule Validation (102). Validated order and customer attributes include, but are not limited to, the order lead time required from the customer, their delivery schedules, whether delivery schedules can be met, their credit, available inventories and production times for their products and like rules. This feedback is conveyed to the customer while on the telephone. With the EDI scenario exception reports will be created and conveyed to the customer.

Logistics (104) primary objective is to reduce the outbound and also the inbound freight costs of the organization. This is accomplished in a couple of ways (1) by using software to consolidate the less than truckload shipments to different plants to have better utilization of the trucking operation. It also houses a low cost core carrier list to be utilized to expedite shipping processes and to monitor the performances of carriers.

Pricing (105) is in software residing on a LAN file server. It is geared towards looking at customers, markets and products. In addition, it brings in other business data like product cost, profitability targets, where customer ship-to's are located, freight delivering costs to develop delivery pricing to customer and FOB pricing picking up shipper's dock. Included are market adjustments, overhead, et cetera, to be used to compile and work out a customer product pricing. (Also seen on FIG. 1b (14)).

Warehousing (106) is designed to ensure inventory accuracy, to put away and retrieve inventory in an expedient fashion, to validate the order to ensure what is loaded on the truck, and to ensure all documentation prepared for the shipment is accomplished.

DEALS (8) includes discretionary spending, negotiating deals with customers by writing them an AP check to rebate for performance, initiating a credit memo to them on account, giving them a "Gelco check" for buying advertisements, or buying down their price for special promotional activities that customers may undertake. Also, the sales representatives will have the ability to put discount lists into the system via this DEAL system (8) to give them a special allowance. This information is fed into PRISM and shows an allowance off of their invoice when invoicing occurs. The sales representative can create a credit memo to issue invoice errors and apply the amount to a pre-set account.

This DEALS system (8) also houses the sales representatives' targets by product category and customer by which they will be measured. This also gathers the data to support customer profitability reporting.

Performance Reporting (112) is where all the data comes together. This is outside of the AS/400 environment, on a LAN file server, to gather data from the order acceptance, the invoicing, the pricing, the shipping and the DEALS (8) function, plus brokerage fees to brokerage companies that service accounts. From this data is generated all of the performance reportings such as sales representative activities, customer profitability, analysis of movement trends and the like. There will be a customer score card created to rate the customer for profitability, volume and the like. This data is used for management decisions related to this customer.

Order Fulfillment (114) is used after order acceptance and it gets the product picked and packed at the warehouse, closes the order, and generates all necessary documents.

Credit Memo (116), G/L (General Ledger) (118), AP (Accounts Payable) System (120), Accounts Receivable System (122), how customer credit is established, and procedures (how they interact at order entry time is important), and are all traditional accounting functions.

III. Logistics

Order Planning

Figure 8:
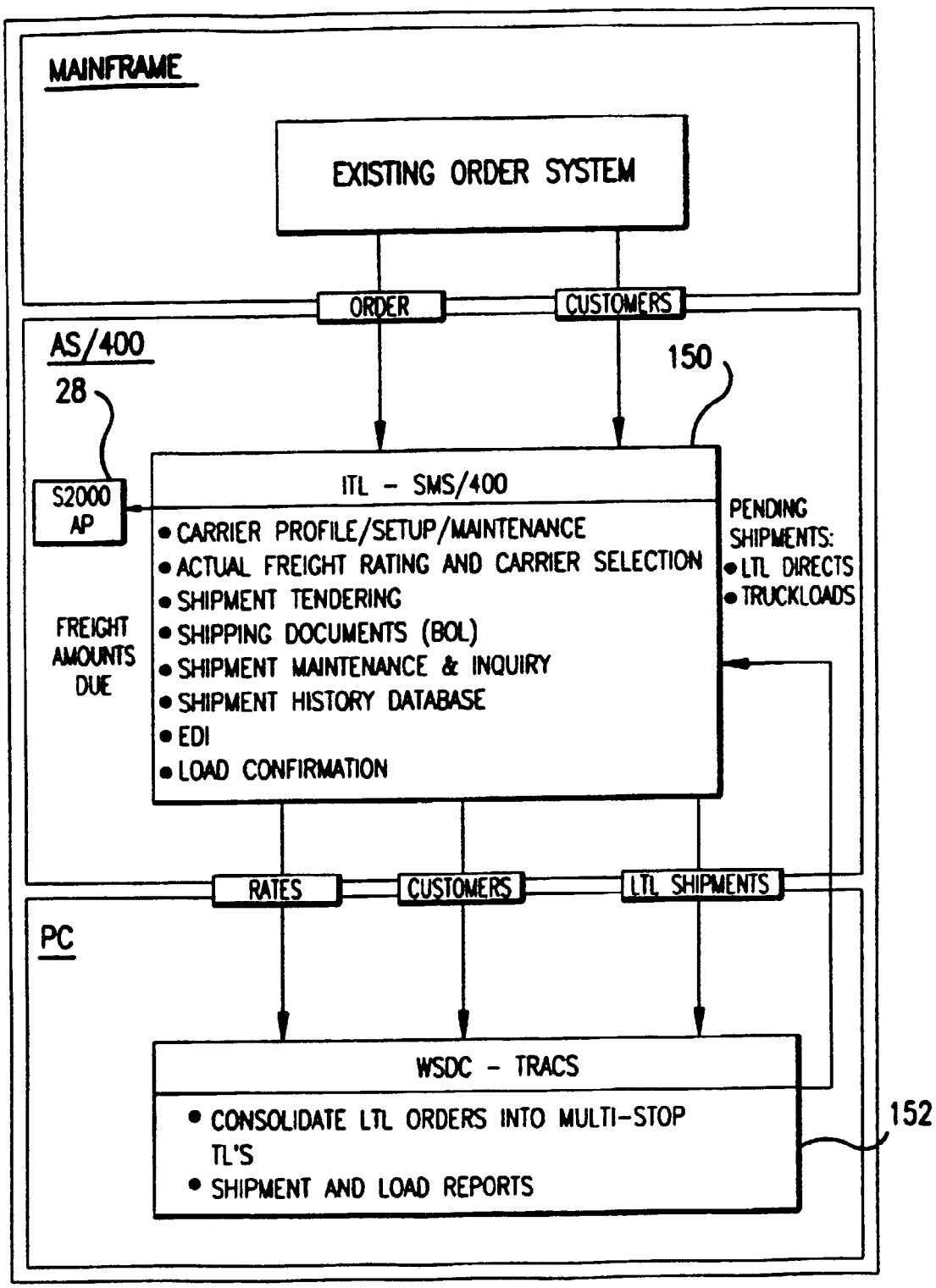
FIG. 8 illustrates the system management software/TRACS architecture.

Referring to FIG. 8, SMS/TRACS Architecture (SMS, also known as shipment management system), which is a vendor supplied software, is illustrated. The diagram shown in this figure lays out the relationship of the hardware in this system as well as the supporting software. It is understandable by one skilled in the art upon examining this figure and will only be touched upon lightly. The main frame has resident software for providing order management. This software communicates with the AS/400 (150) which is networked with other AS/400s to create the basic information network. Residing on the AS/400 (150) platform is the SMS Software supplied by ITLS of Canada, and on the PCs the TRACS Software supplied by Westeley Development Corp. of Stamford, Conn. This combined software has the functions indicated on the drawing and also communicates with an accounting function supported by Software 2000 (28). The SMS/TRACS software residing in the AS/400 (150) further supports PCs (152) or work stations or the like with information generated by the AS/400 (150) resident software on rates, customer information and less than full truckload shipments. This software provides for consolidation of less than full loads, as well as creates shipment and load reports. It likewise creates information feeding back to the AS/400 (150) to create shipping instructions. The use of this hardware and software combination uniquely supports the logistics system for load building. The load builder function includes load tendering, load planning, load confirmation and load inquiry to build loads. This allows handling multiple orders to create a load.

Figure 9:
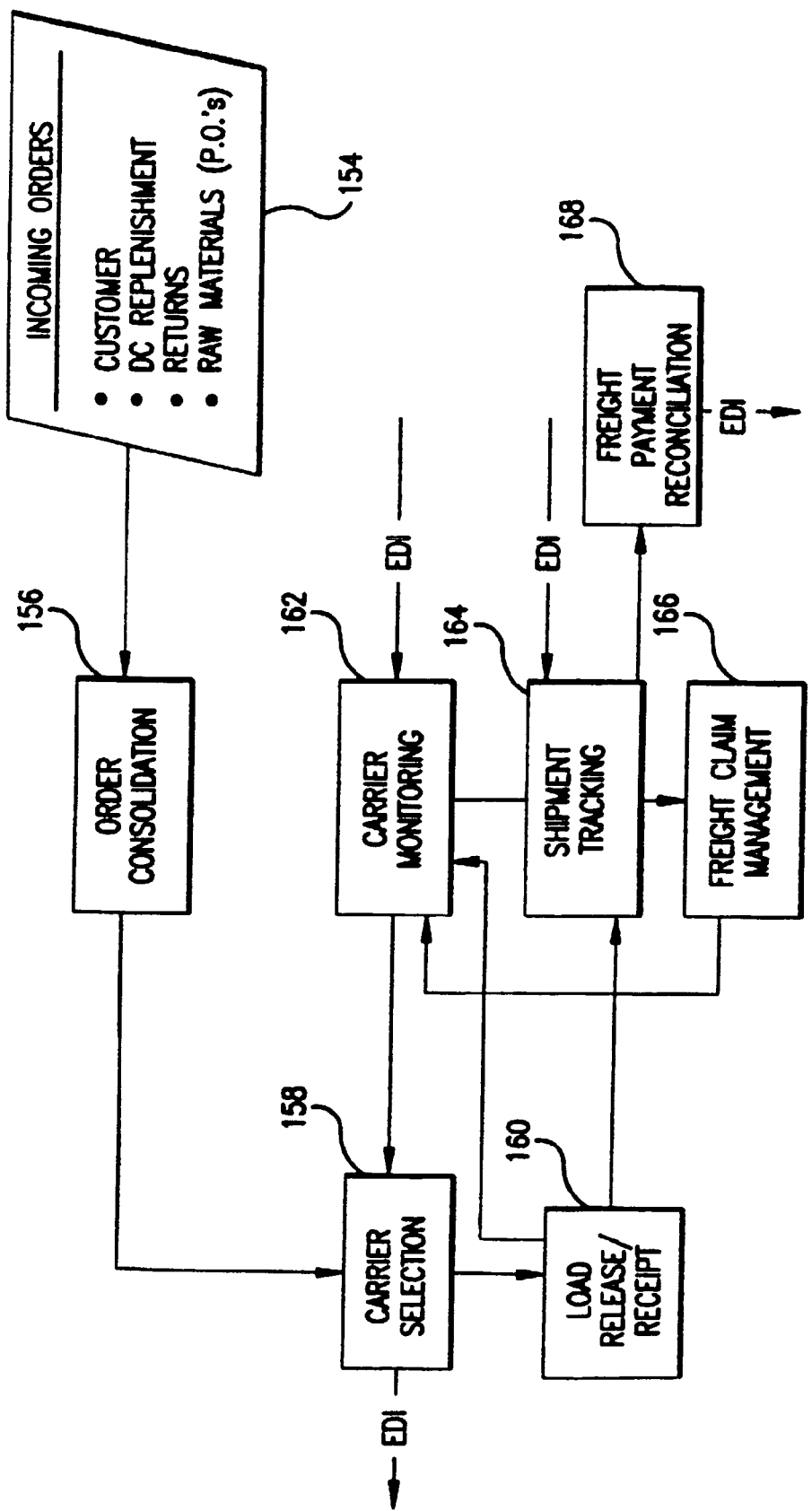
FIG. 9 illustrates, in diagrammatic form, the delivery process for managing and executing the activities associated with inbound and outbound movement of goods.

FIG. 9 is a diagram of the delivery process for managing and executing activities associated with inbound and outbound movement of goods. Shown in the diagram is the function of taking incoming orders (154) from customers as well as distribution center replenishment, information on returns and purchase of raw materials generated through POs. This information flows to the order consolidation function (156) from which information goes to the function for carrier selection (158). The carrier selection function (158), as further described hereinafter, goes through a series of decision making steps to select the correct carrier for the correct destination and load for that carrier and takes this information and sends it to the load release receipt function (160) where data is created to input to the carrier monitoring function (162) as well as the shipment tracking function (164). From the shipping tracking function (164) information flows to the freight claim management function (166) as well as the freight payment reconciliation function (168). There is feedback from the freight claim management function (166) to the carrier monitoring function (162) as the case may be. The carrier selection function (158), carrier monitoring function (162), shipment tracking function (164) and the freight payment function (166) all have EDI connections to customers to create data bases necessary to support these functions.

Figure 10:
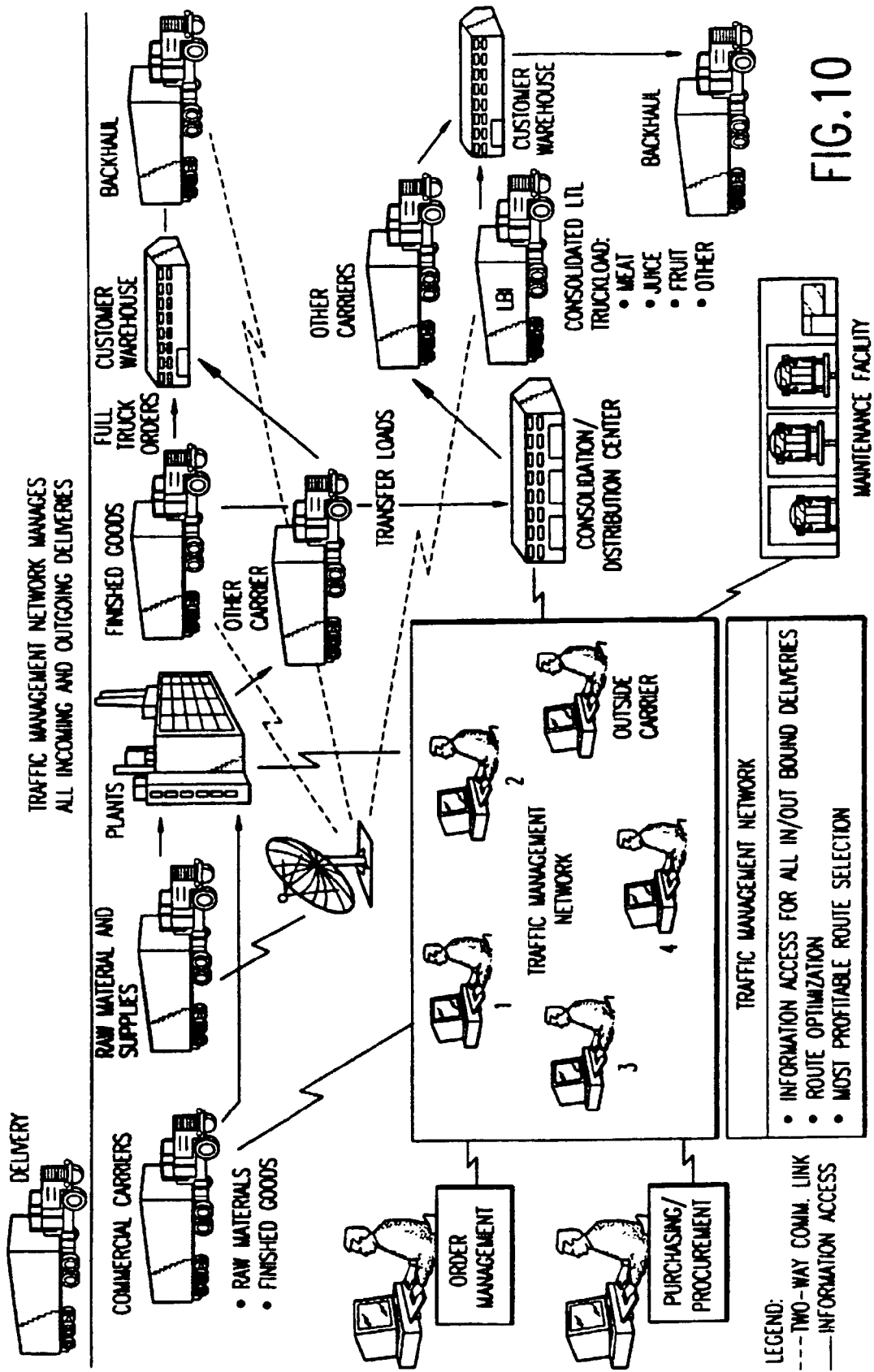
FIG. 10 illustrates diagrammatically the traffic management network of all incoming and outgoing deliveries.

FIG. 10 is a diagram of the traffic management network showing how goods are received and distributed using the system. It is a system that allows for multiple tracing of carriers available to deliver goods to customers.

Figure 11:
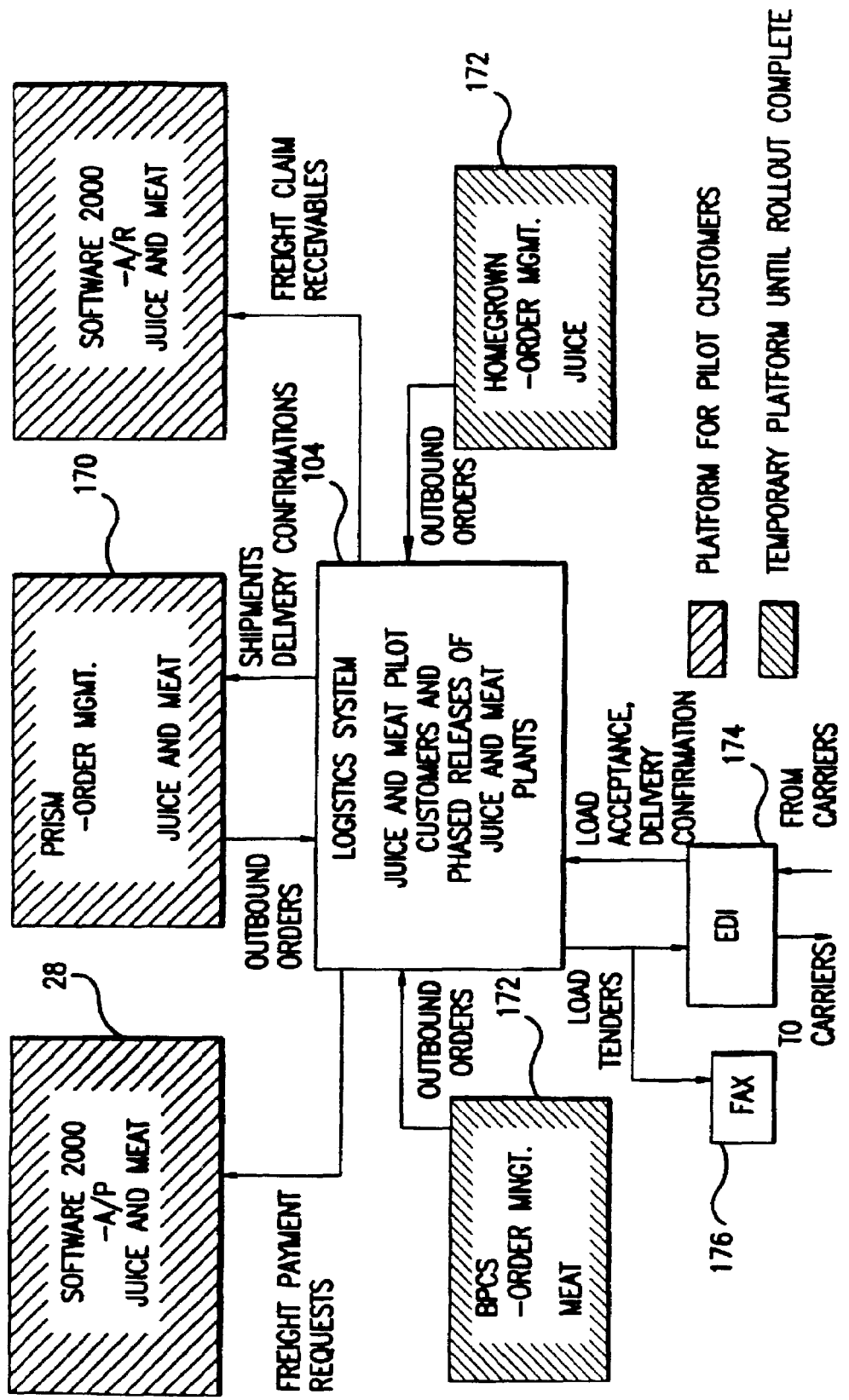
FIG. 11 illustrates the logistics system interfaces.

FIG. 11 is a diagram of the logistics system interface. Shown in this interface are the various software and communications that support the system. The Software 2000 (28) supports the accounts payable function as previously described. PRISM software (170) supports the order management function and Software 2000 (28) supports the accounts receivable function, all of which feed into logistics systems (104) where the various bits of data created are used for support. From the logistics system (104) outbound orders (172) are received as well as internal information on the production of goods. The logistics system (104) is connected through EDI (174) and fax (176) to carriers for tendering and accepting delivery.

Figure 12:
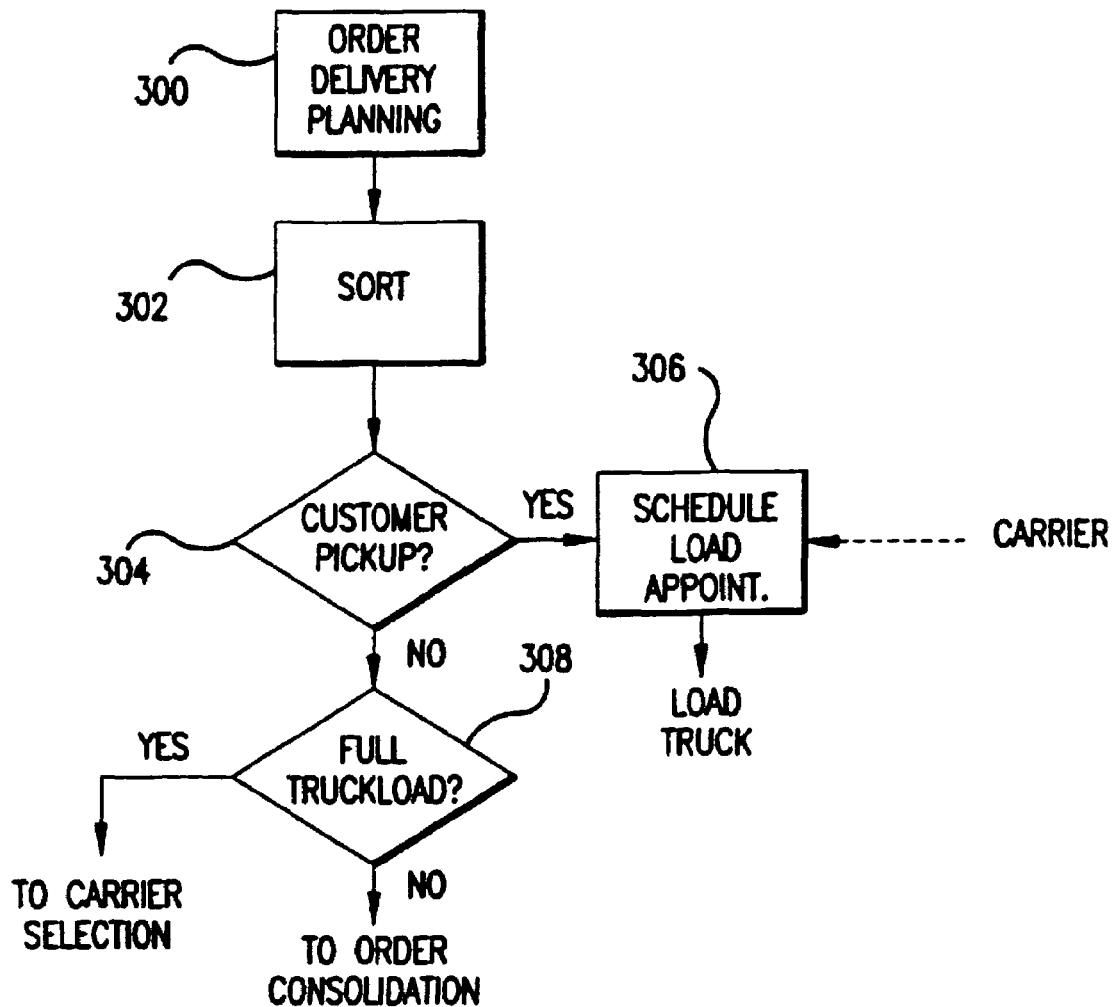
FIG. 12 illustrates the delivery subprocess for order delivery planning.

Referring to FIG. 12, Order Delivery Planning (300) is where orders are received from the order management system. The first action with the orders is to download them into the system, then sort them based on ship date, and also by priority such as a quick delivery. For example, there are orders for a particular shipping date, those orders would be sorted into full truckloads including those that are LTL (less than a truckload) and customer pickup (the carrier or customer picks the order up with their private fleet i.e., an XYZ truck or customer arranges their own carrier which means that XYZ arranges ABC carrier to come and pick it up). Referring to the schedule load appointment function in Box 306, if it is a customer pickup, then an appointment is scheduled to actually come to the dock and load the product. The warehouse keeps a list of appointments and times (i.e., eight trucks can load in one hour, and therefore there are eight time slots for one hour increments) and records the trucks' schedules. The dotted line is for the carrier to actually call in and confirm or set the appointment with the warehouse. The arrow coming down indicates that the truck will be loaded when the carrier arrives.

If it is not a customer pickup, go to the Full Truckload decision in Box 308 which questions a full truckload or not. Full truckload means did the customer order an entire truckload with their product or is their order on two separate truckloads. For example, is there half an order of frozen and half an order of chilled orange juice? In the present system, these are two separate orders, and therefore do not create a full truckload even though in theory it would be a full truckload. If there is a full truckload you go to "carrier selection" which will be two or three processes down the decision tree. If you don't, the orders are passed onto order consolidation. Again, the process here is to determine which are full truckloads and which are the LTL shipments. The LTL shipments would again go to the order consolidation function which is one of the keys to the entire process.

Order Consolidation

Figure 13:
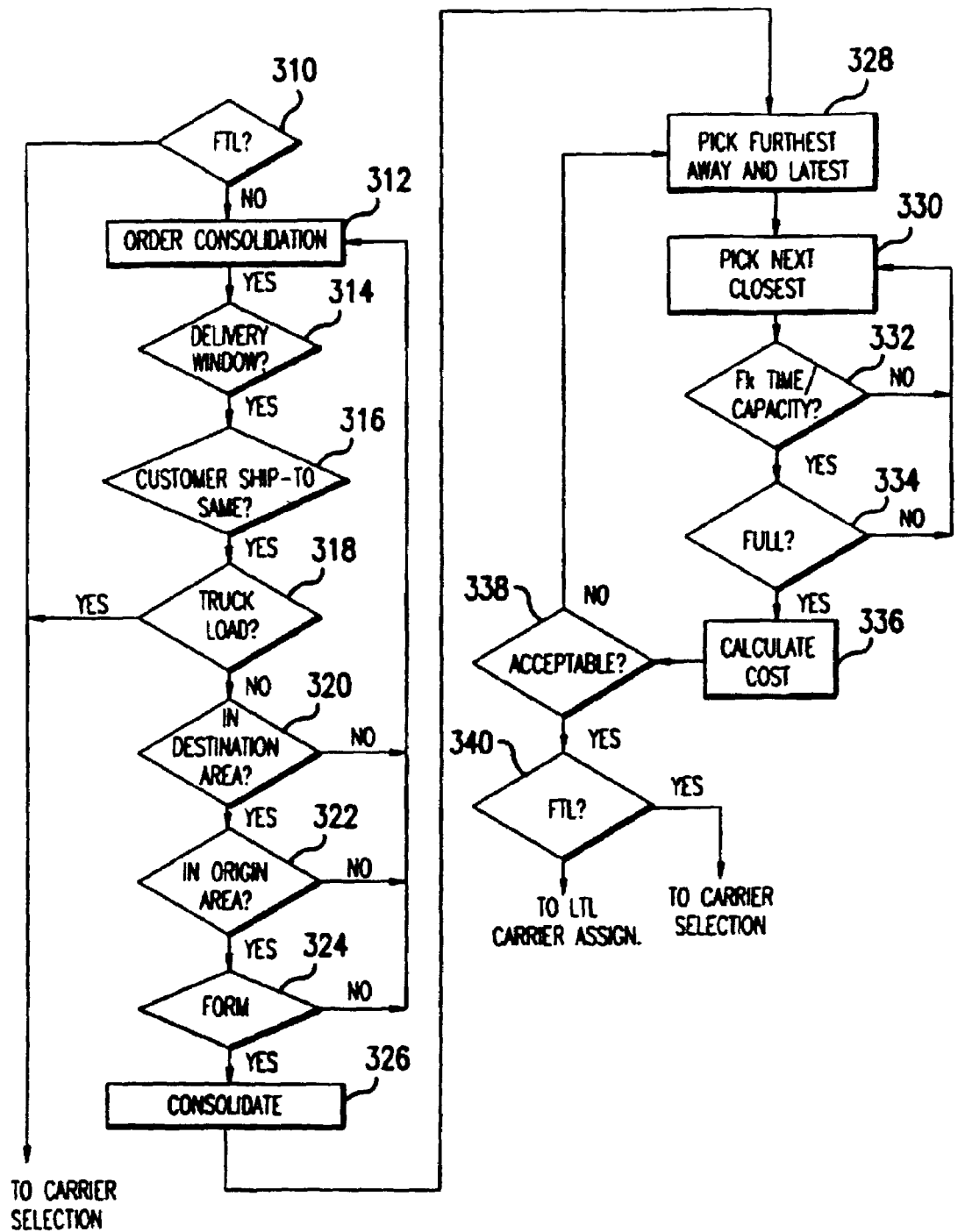
FIG. 13 illustrates the delivery process flow charts for order consolidation.

Referring to FIG. 13, Box 310 this is the same decision process that was made in the order delivery planning process of FIG. 12, but instead, if a full truckload the arrow goes to the left and goes down to carrier selection. There is no need to go through consolidation because it is a full truckload. If it is not a full truckload, go to the order consolidation function of Box 312. This results in putting LTL shipments into a full truckload. The system goes through certain decisions to determine what is the optimal truckload. The next few boxes are decisions which are made by the software. The AS/400 is able to load build correctly on its resident logic. It is a matter of a logistic planner's judgment to override the internal logic. For the majority of the loads, the load decision is made in the PC based software package to perform the optimal consolidation. The decisions that the actual software goes through are based on a transportation algorithm, in software on the AS/400 Platform shown in Box 314. It looks at a delivery window which means when does that product need to be delivered? Most orders are sorted by shipment date. If an order is shipped on Tuesday, the query is when does it need to be delivered? The query is, how long does it take for a product to get to a certain area, in other words, from Dade City to California it could take two days, but from Dade City to Las Vegas it also might take two days. This data is used to decide whether those two orders can go on the same truck, i.e., can it fit the delivery window based on the guaranteed delivery date for that customer? The system looks at a delivery window and asks if the loads can be consolidated based on transit time, et cetera.

Further, the function shown in Box 316 asks if they can be consolidated if the delivery window is compatible and if the customer shipped to is the same?

The next decision is shown in Box 318 and asks if it is a truckload? Of course, if a full truckload is determined there is no need to proceed. This would be the optimal consolidation if a half a truckload of frozen and a half a truckload of chilled orange juice goes to the same customer. Then you have a full truckload going to the same customer and delivered on the same day, for optimal consolidation. If the arrow to the left says there is a full truckload, the decision tree goes down immediately into carrier selection.

If the decision shown in Box 320 says there is not a full truckload but the two orders are going to the same customer, it then looks at other orders going in the same destination area. There is basically one more check within the destination area. If not, it goes back into the rest of the orders for the next consolidation which is the arrow to the right.

If it is in the same destination area, then it goes to Box 322 the origin area locations 1 and 2. The system would try to put all orders for location 1 before putting location 2. If not in the same origin area the arrow goes to the right and it goes back into potential consolidation with other orders. If yes, it is in the origin area, then the decision arrow going down indicates it might be consolidated.

The decision shown in Box 324, "form," means the form of the product, i.e., frozen, chilled or dry, because the way it is loaded in the truck makes a difference. Frozen goes in the nose of the truck, followed by chilled, and then dry. The reason for this is the location of the cooling unit. Therefore, these should be loaded exactly opposite of the way the truck is built. Stop 1 would be dry, stop 2 chilled, and stop 3 frozen to prevent unnecessary unloading. Consolidation is determined in this form.

The decision shown in Box 326 is the consolidation process. The preceding decisions result in the consideration input to Box 328 to consolidate loads by picking the furthest and latest point away and to build the truckload from that information.

The decision of Box 330 is to select the next closest, i.e. shipment to Los Angeles and San Francisco (next closest). It looks at the next closest load that fits the other requirements (form, destination, origin, et cetera).

The decision of Box 332 says does it fit the time and capacity? Capacity means "x" amount of weight and truckload (for juice it is about 44,000 lbs, meat 36,000 lbs). The difference being that the meat product is packed different on the pallet to only get about 20 pallets on a truck, and the way the meat is stacked results in about 36,000 lbs, not fully cubed out most of the time. Juice products are case goods that are stacked accordingly and can obtain fully cubed out pallets of about 44,000 lbs. Therefore, two 25,000 lb juice orders cannot be sent to the same truck or the load will be 50,000 lbs and the truck would be overweight and not legal.

If the decision is yes, then go to Box 334 which takes the data that there is 44,000 lbs of juice or 36,000 lbs of meat. This data is compared to maximum truckload weight. If the comparison shows that the weight of the load approached the maximum truckload weight, then the order consolidation is finished. If not, then more orders need to be picked to get up to the truckload amount.

If yes, the consolidation is finished, then go to Box 336 and answer what is the cost of delivering these orders. The cost of full truckload rates is built into the system for carrier X.

The next decision Box is 338 which asks if that is acceptable. The logistics planner is going to use his judgment when he sees what the system calculates and the cost. If not acceptable, then it will go back to consolidation and possibly change the parameters. It might be done manually with the system actually calculating the difference in freight. If it is not acceptable, there is the option to do a manual load build.

If acceptable, go to Box 340 which queries if it is a full truckload. This means that it may not be a full truckload and there may only be so many orders which can be consolidate or weighed out (i.e., 44,000 lbs). If there are not enough full truckloads from of all these orders, which does occasionally happen, some LTL carriers do their own load consolidation and pick up small orders from various customers and go to a dock and break bulk terminal to put loads together on the same truck. These carriers are more costly due to the personal consolidation and handling of the product. The ultimate goal is to build full truckloads to lower the freight costs rather than have someone else do it.

If not, go to LTL carrier assignment. The lowest cost LTL carrier should be tendered the load. If it is a full truckload go directly to carrier selection, which is assignment of a full truckload carrier. Either way, there is a carrier selection process.

Carrier Selection Process

Figure 14:
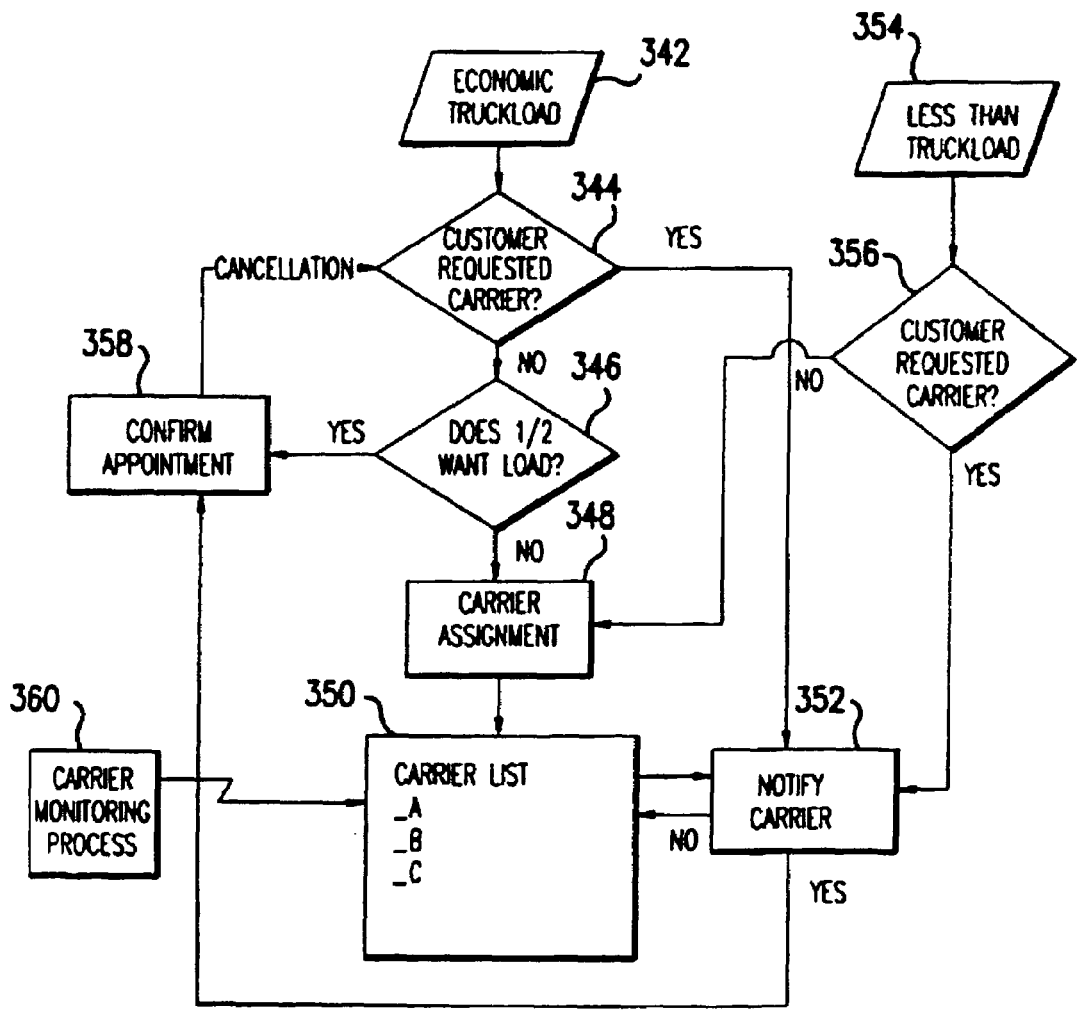
FIG. 14 illustrates the delivery subprocess for carrier selection.

Referring to FIG. 14, beginning with the economic truckload decision shown in Box 342, meaning from a weight standpoint it may make sense to actually build it as a truckload even though it's not fully weighted out such as a meat delivery.

The decision point in Box 344 is customer requested carrier. A customer may request a specific carrier. If yes, it goes to Box 352 which says to notify a carrier that they have a load. This comes later in the decision process.

If not, the decision goes to Box 346 and asks if any of the in-house fleets want the load. If not, go to Box 348 carrier assignment. A database has been designed and set up which contains all of the carriers, service areas and rates. It looks at all the carriers and picks a carrier from the list which is decision Box 350.

Decision Box 350 determines from a list of carriers that haul products to the service area(s) to which the load is destined. The carrier list identifies the carriers and their rates to selected areas. The load is then tendered to the selected carrier with the lowest rate, but the lowest may not have the right equipment available and therefore the decision is made to offer to carrier B. Therefore, the decision is not only the lowest cost carriers with available equipment.

The decision Box 360 feeds into the decision process of Box 350 and inputs a carrier monitoring process which helps determine which carrier to use based on different factors and not on just the cost factor alone. Even though carrier A may be the lowest cost carrier its service rate may be less than 100%, e.g. 90%, while carrier B may be 99% and only cost $10.00 more. Then the decision is made to use carrier B because of the service level considerations. If none of the carriers has equipment available to haul the load, then the decision goes back to an in-house carrier. Assuming that a carrier was not found, the process goes to Box 346. At certain times of the year it has been found difficult to assign carriers to products, necessitating the use of in-house fleets.

Decision Box 352 notifies the carrier. This may be done by telephone or EDI. If via EDI, the carrier may access their mailbox and say yes or no. There are certain transaction forms that are then generated. One is a load tender form 990 that the carrier would send back with an acceptance or rejection of the load. If carrier's are on EDI it would be an efficient process. There is also a load tender form which is not in any of these other process boxes which states what the contents of the load are, for example, the customer, weight, product type, delivery date, et cetera. Rather than relay the information over the phone, a fax including the information is sent to the carrier via the load tender form requesting the carrier's signature if the load is accepted. After acceptance, the executed form is returned via fax. The manual notification of the carrier process is by fax, phone or a combination thereof. EDI is however the preferred means.

Decision Box 354 is a less than truckload shipment. Certain orders are LTL shipments and need to go through a carrier selection process.

Decision Box 356 queries if the customer requested an LTL carrier? There are only a few carriers that haul LTL shipments. If it is not a customer requested carrier, then the process goes to the regular carrier assignment decision in Box 348. The decision is no different for an LTL shipment than for a full truckload regarding carrier assignment considerations. The service level of LTL is also considered. In other words, carrier A may be a truckload only going to that area and truckload B may be a LTL carrier going to that service area. If the LTLs go to California, the decision is to pick that carrier.

Decision Box 352 first determines if there is a customer requested carrier then goes through the carrier selection process of Box 352.

Decision Box 358 instructs that the carrier is to confirm the appointment, meaning that they will pick up the product at the warehouse. This process is done by the carrier calling the warehouse and confirming the appointment. If they do not confirm the appointment, then the load is cancelled and the process follows the exact same selection process, and reassigns the carrier's load to another carrier.

As discussed above, decision Box 360 feeds into the carrier selection process. The carrier monitoring process sets the standards a carrier must meet before it is selected. Criteria are established such as 98% on time delivery, or 1% claims, meaning damaged products, short products or overages that are related to the carrier. In other words, the load could be shipped short which may not be the carrier's fault, but if the carrier has continual shortages, this needs to be tracked. The carrier monitoring process also considers the number of times a carrier rejects a load. For example, if 10 loads were offered and only 8 were accepted, it could mean unavailable equipment. Another criteria is the time it takes to pick up the order at the warehouse, and if they are late. This is considered an exception to on time pick up. If the standard is 98% on time and they are 97% on time, this information needs to be captured. The carrier is required to furnish the actual delivery date. The result is a report or score card which gives them a rating. The selection process is used to weed out the carriers that do not provide the required service level. Based on the report card, the carriage may be rebid to other carriers.

Load Release

Figure 15:
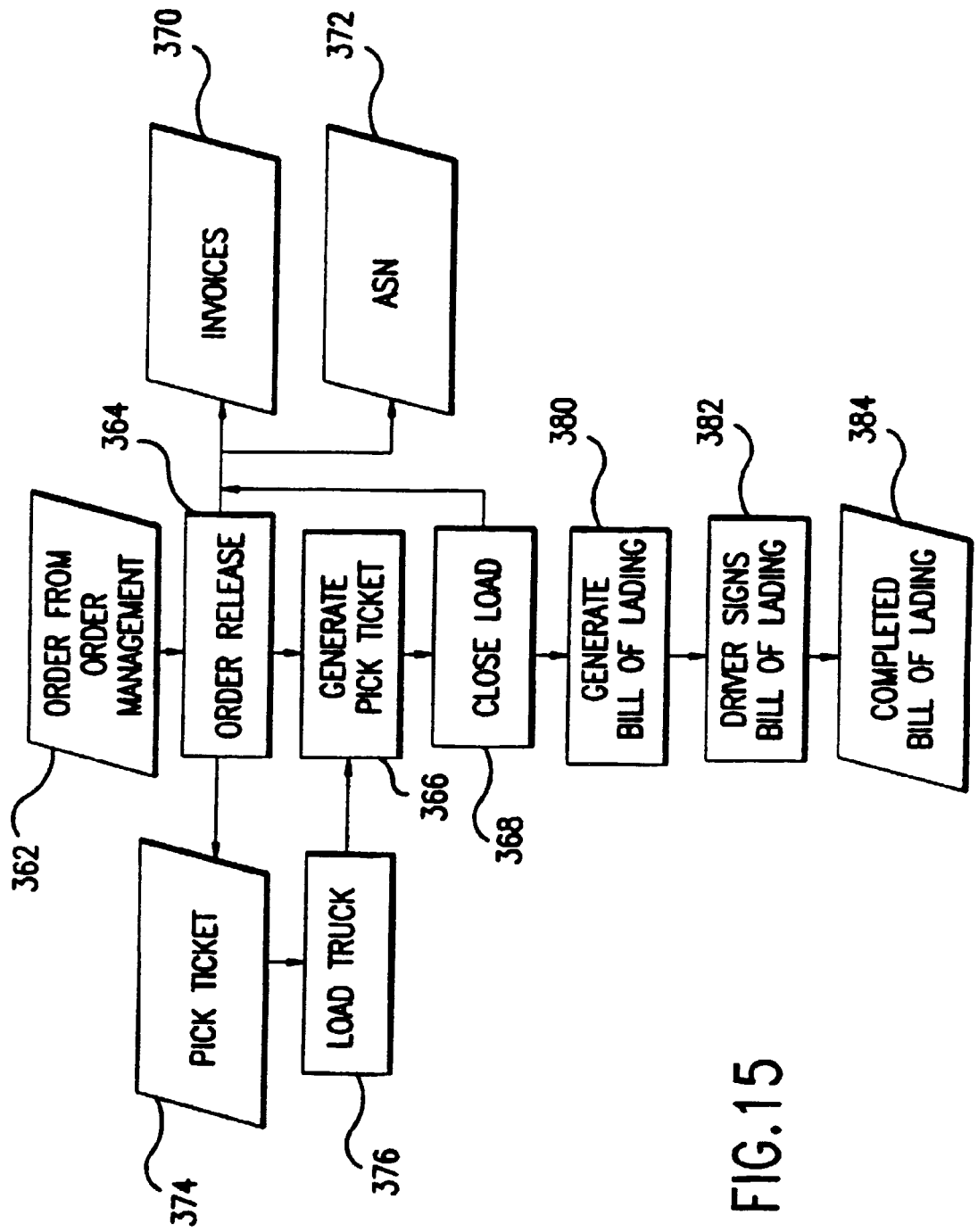
FIG. 15 illustrates a delivery subprocess for load release.

Referring to FIG. 15, decision Box 362 basically outputs that the order was received from order management and has been through the carrier selection process, load consolidation, et cetera because for load release purposes the order that the loads are going to be put on the truck, which loads are going to be put together on the same truck, etc. is required.

Decision Box 364 is the order release portion. At that point there is a decision as to whether the order is going to be shipped. Logistics would actually confirm and send it to the warehouse to be shipped.

Decision Box 366 instructs to generate a pick ticket. A pick ticket is something that is used by the warehouse to determine the location that a product is stored. It shows the products to be put on the truck by SKU level. It states for example that 100 cases of Florida Gold and a 64 oz 12 (12 64 oz to a case) are needed. It may then pick 100 cases of Old South Premium chilled orange juice 8 oz bottles that are 84 to a case. It locates the product by SKU level and instructs placement on the truck by order. It may have multiple orders for one truckload. Box 374, going off the order release in decision Box 364, is another pick ticket which is the same as decision Box 366.

Decision Box 376 is where the truck is actually loaded. Again, the truck must be loaded taking into consideration the commodity type(s) of the load. Decision Box 376 determines how to actually load the truck (e.g., frozen, chilled and dry).

Decision Box 368 determines that the load needs to be closed. At the time the load is closed, the SMS software in the warehouse produces a screen that says the load that is going to the Supervalue in Omaha, Nebr. consists of 200 cases of Florida Gold and 300 cases of Old South at a particular weight. In order to change the count, a warehouse person must verify the count, in other words override the 200 cases of Florida Gold to 201. The weight is either manually or automatically calculated. At that time, the Bill of Lading is generated by the PRISM software system using an SKU number so that a change in quantity would automatically change the data on the weight. A four digit alpha code designating the carrier is used to produce that information directly on the Bill of Lading, closing the load and generating the Bill of Lading.

Decision Box 370 means that information feeds into the invoices. It is fed into Box 368 as well for indicating that the product was shipped. As a result, an invoice is created.

Decision Boxes 370 and 372 are information outputs which feed to the financial data base.

Returning to decision Box 380, a Bill of Lading is generated, which is a legal document that the carrier must retain on the truck at all times while hauling the product. This states the products that are on the truck; where the products are being delivered, and the carrier. It is a legal document required by the ICC for shipments on interstate highways. A Bill of Lading is generated by the system after the information in Box 368 is inputted to close out the load.

Decision Box 382 determines that the driver signs the Bill of Lading. The driver basically signs that he received that product. For example, decision Box 382 indicates that the driver received in the truck 200 cases of Florida Gold orange juice. When the load reaches its destination and the customer says they only received 199 cases, the carrier can be held accountable. The carrier basically signed to say that they received and are responsible for 200 cases of the product. The signing also makes the Bill of Lading a fully executed document for legal purposes.

Decision Box 382 indicates that the Bill of Lading on file should have been executed by the driver to verify any information that may be needed at a later date.

Decision Box 384 is a completed Bill of Lading after the driver signs it.

Freight Claim Management

Figure 16:
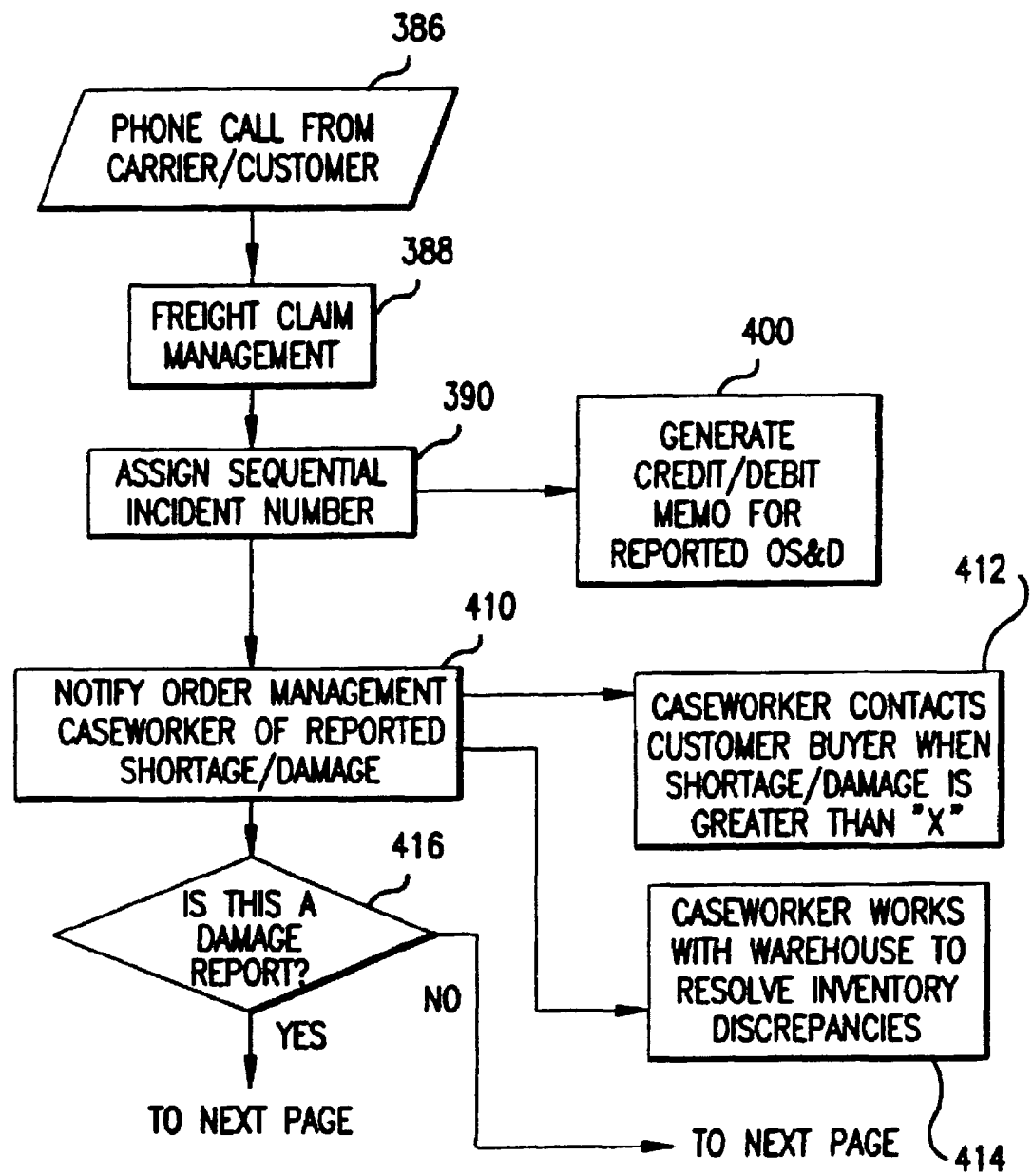
FIG. 16 illustrates a delivery subprocess for freight claim management.

Referring to FIG. 16, decision Box 386 indicates a phone call from the carrier/customer. The carrier has to call while the customer is at the customer's dock, but the customer could also be the one that calls. At this point the process goes to freight claim management in decision Box 388 if there is a claim.

Decision Box 390 is that when a phone call is received from the carrier or customer, a sequential incident number is assigned. It is called an incident number because at that point there is no decision as to whether it is going to be a claim or not. It tracks all instances of overages, shortages, and damages (OS&D).

Decision Box 400 says to generate any credit/debit memo for any OS&D. If after going through the entire claim process and determining that there is an OS&D and the shipper is at fault, then a debit and credit memo is generated so that it is outside of the normal process. If there is an OS&D involved, the customer will not pay for that. If the customer ordered the 200 cases of Florida Gold orange juice and only received 199, short 1 case, it will only pay for 199. A debit/credit memo is generated to accounts receivable so that when the customer pays for that invoice it is only going to pay for 199. The customer's accounts receivable is then updated.

Decision Box 410 indicates to notify an order management caseworker of reported shortages and damages. In other words, the carrier calls and reports the customer's shipment was short or damaged. Order management is then notified.

Decision Box 412 indicates to notify a caseworker to be proactive with customers to settle potential claims.

Decision Box 414 indicates that because there is a reported shortage or damage to notify the warehouse to resolve inventory discrepancies.

Decision Box 416 determines what to do if a damage report is made.

Figure 17:
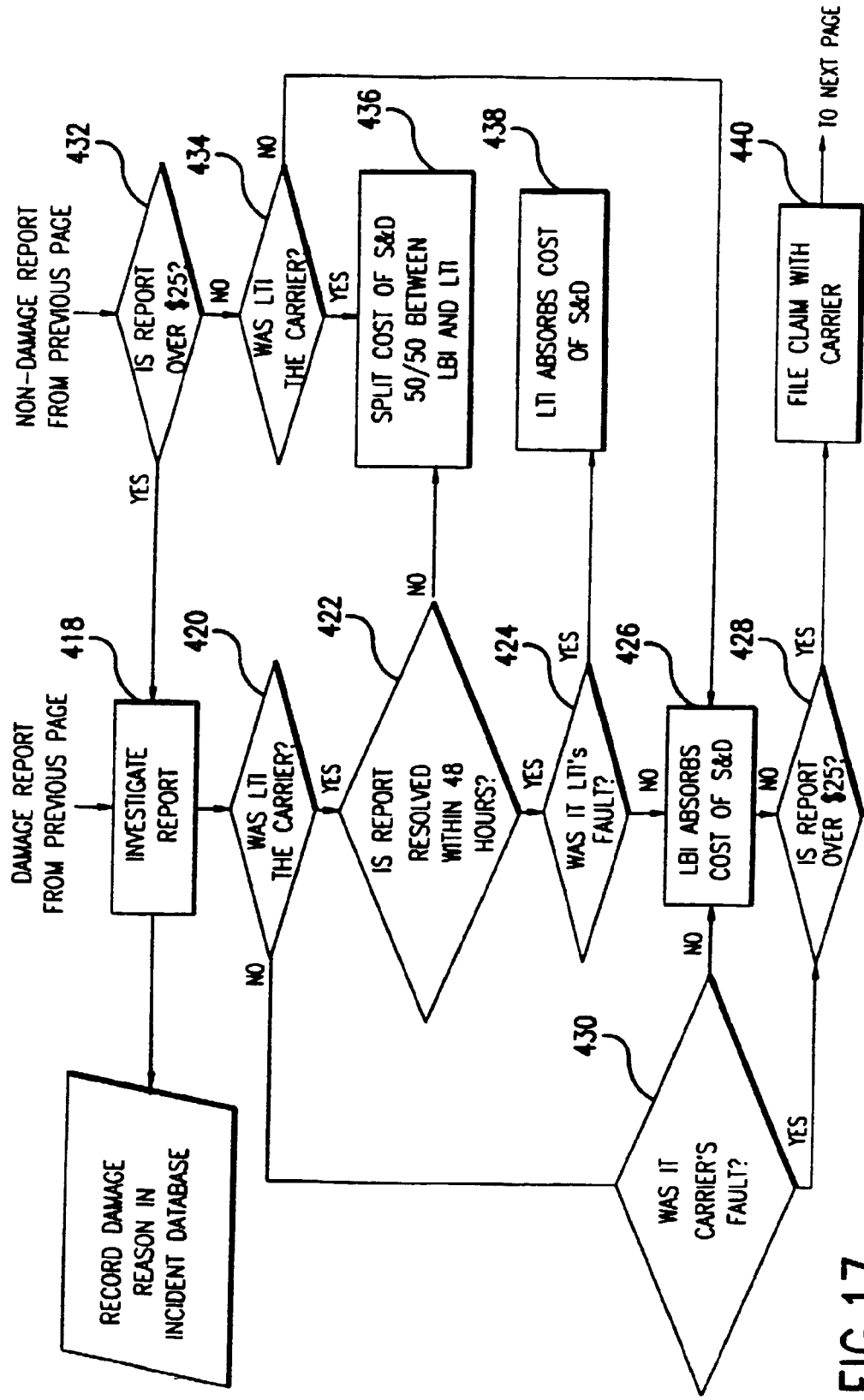
FIG. 17 illustrates a delivery subprocess for freight claim management

Referring to FIG. 17, decision Box 418, a damage report has been made. Damage reports are handled differently from an overage or shortage. An investigation is conducted resulting in a report which states the circumstances concerning the freight claim.

Decision Box 452 indicates to record the damage reason in the incident database. This is done to identify if a particular product keeps getting damaged in transit. The information is recorded in this database for damage from packaging, carrier mishandling, etc. to track the damages by reason code to correct the situations. With carrier problems this can be transferred to their report card as part of the carrier monitoring process.

Box 420 queries if this is an in-house carrier. The reason for this determination is because in-house carriers are treated differently. If yes, the process goes to decision Box 422 and the report is resolved within 48 hours. At that point it may take some investigation to determine who was at fault. If it's not resolved within 48 hours (maximum amount of time on an internal claim) the process goes to decision Box 436, to be explained later. If resolved within 48 hours, and fault assigned, the process goes to decision Box 424.

Decision Box 426 assigns the cost for damage to a carrier or shipper.

Decision Box 428 determines whether the actual amount of damage is over $25.00. If so, a claim is filed with the carrier in decision Box 440. There is a nine-month period in the United States and three months in Canada for filing an ICC claim/form which identifies the product, the damage and the dollar amount.

Decision Box 420, is basically the same decision that is made for an outside carrier that is made for an in-house carrier. If the carrier is at fault, then the process goes to Box 428 and determines if the amount of damage is $25.00. The process then goes through the decision whether a claim is to be filed. If the carrier is not at fault, the shipper absorbs the cost of the damage.

Decision Box 432 is a damage report to find out why there is continuing damage. The incident database was created in order to generate this type of damage report. The decision Boxes 432, 434, 436 and 418 are directed to handling non-damaged, that is short or over products. First, a determination is made whether the report shows an OS&D over $25.00. If yes, the process goes through the regular investigation and handles the damage report accordingly.

Figure 18:
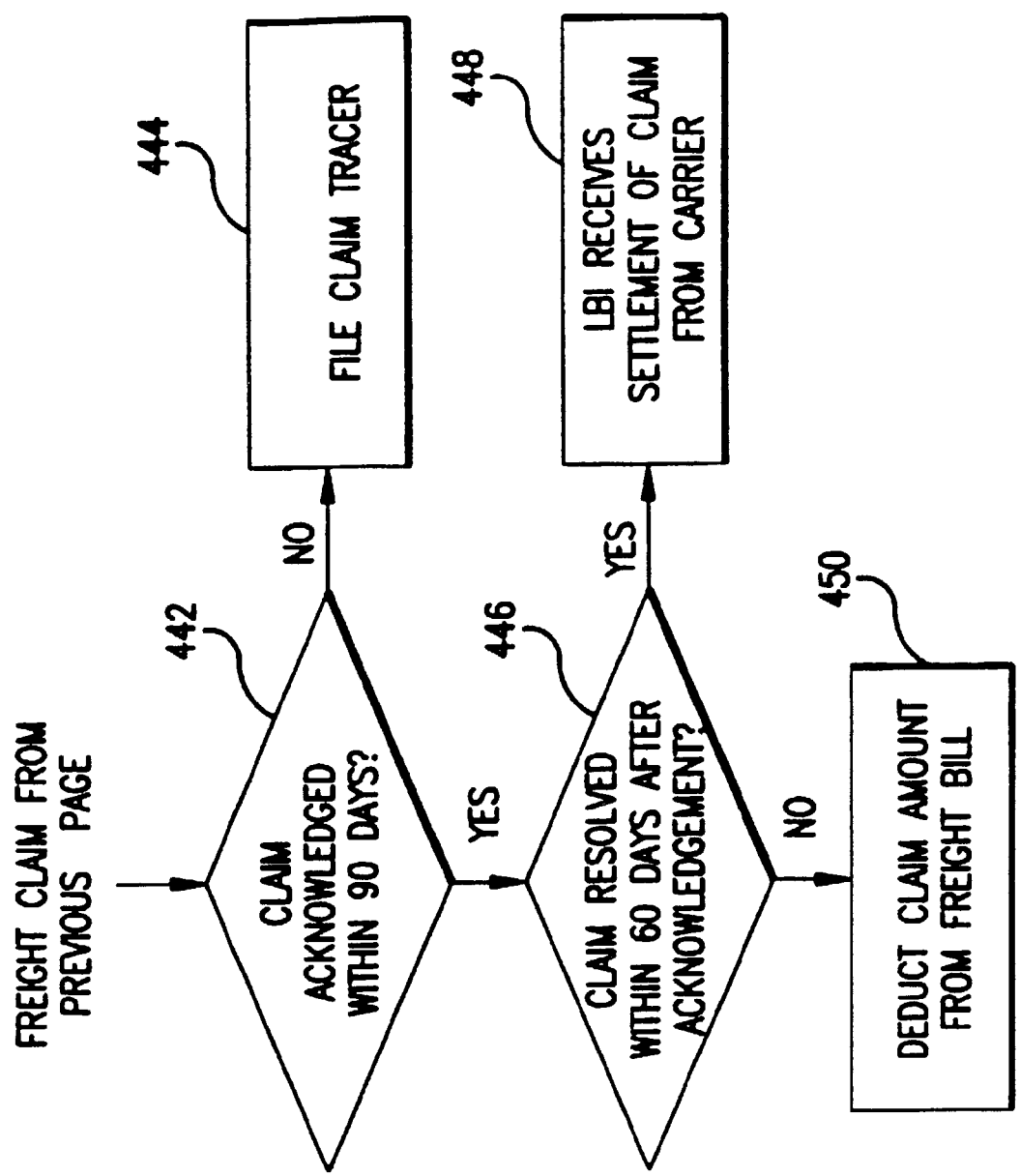
FIG. 18 illustrates a delivery subprocess for freight claim management

Referring to FIG. 18, in decision Box 442 (note previous page), the carrier has 90 days (set by ICC) to respond to a claim and acknowledge it. There is a standard acknowledgment form.

If not in 90 days, the process goes to decision Box 444 where a claim tracer is generated which states a claim was filed, and inquires why the carrier has not responded. If the carrier does respond in 90 days, it is acknowledged. Otherwise the carrier must confirm that they received the claim and are researching it. Nothing needs to be settled in this 90-day period. A follow up on the promptness of the settlement is used for the carrier scorecard.

In decision Box 448, if the claim is resolved, then the carrier pays the settlement.

In decision Box 450, if carrier doesn't pay within a 60 day period, the loss resulting from the damage is deducted from the freight bill per an agreement with the carrier.

Freight Payment/Reconciliation Process

Figure 19:
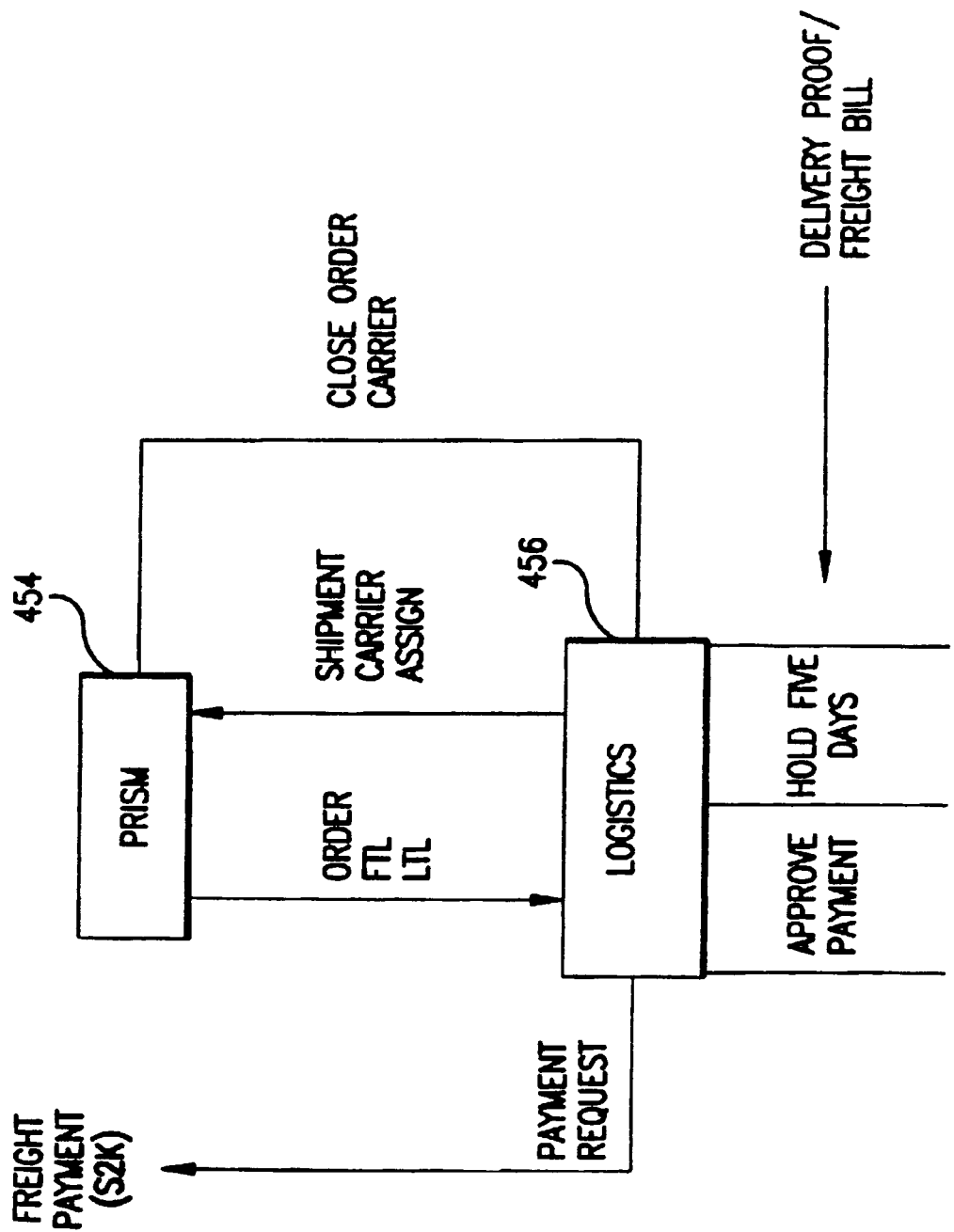
FIG. 19 illustrates a delivery subprocess for freight payment/reconciliation.

Referring to FIG. 19, this is the process to pay the carrier for their freight.

Decision Box 454 is PRISM software. The arrow down indicates that an order is passed whether full or LTL to logistics. Logistics does its whole process and goes through load consolidation and carrier selection (note the rate established for the carrier). This rate information then is fed back to PRISM.

Decision Box 456 provides that because the carrier is known there is no need to perform a reconciliation any more. A carrier sends a freight bill including mileage, stop off charges and dividers, requiring a 100% audit of those freight bills back to the Bill of Lading. On the Bill of Lading is hand typed the actual amount of freight that is expected to be paid. Again, the carrier selection process lists the carrier and the rates they charge so when a carrier is selected and they've accepted the load, the system actually takes that freight amount and prints it on the Bill of Lading. This allows the freight bill to be used in performing a reconciliation, and to pay the carrier directly by going and approving the payment (a final check before releasing those bills for payment).

Below decision Box 456 is payment approval that may be going on once a week by paying carrier ABC for all the loads hauled in that week to generate one invoice in a summary type format that shows the loads that went out in that five day period. Then the "hold five days" step is used initially for the purpose of taking into account additional charges that may occur while delivering the load. For example, the driver may be retained at a customer's dock for a specific reason, resulting in a detention charge, so the carrier may bill for that depending on the rules that are in effect for their rate. All such information is captured within that five-day period. Five days is not fixed so the system can be modified to have a separate adjustment process where the initial estimated freight charges are used based on what is shown on the carrier selection process and a separate adjustment charge made when this detention occurred resulting in an adjustment to that particular invoice/order number. For example, once a week all payments due to carrier ABC are sent from decision Box 456 indicating to make a freight payment, to S2K software in finance. The payment request would be interfaced into accounts payable. The coding is performed within the logistics process using the account numbers with an interface into accounts payable.

The line item out to the right of the hold five days area called "delivery proof/freight bill" is a request for the carrier to send proof of delivery on all freight bills on an exception basis.

Proof of Delivery

Figure 20:
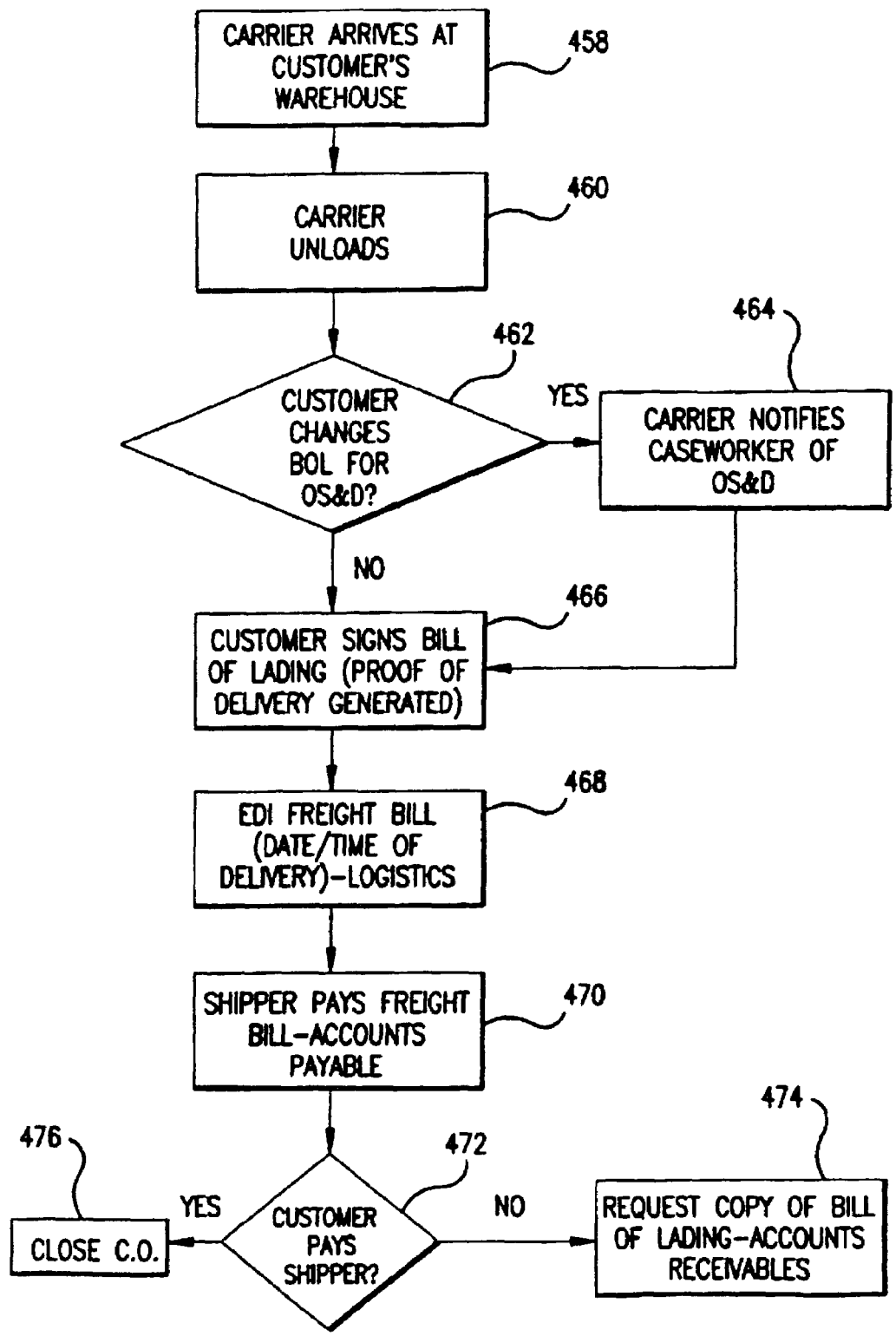
FIG. 20 illustrates a delivery subprocess for proof of delivery.

Referring to FIG. 20, decision Box 458 indicates that the carrier arriving at the customer's warehouse and unloading which is decision Box 460. During that unloading process, the carrier gives the warehousemen at the customer's dock a detailed list of all the products that he is delivering by SKU. The warehousemen at the customer's dock are responsible for confirming the condition and quantity of the load. At decision Box 462 it is determined if there needs to be any changes to the Bill of Lading for OS&D. The customer would actually change the Bill of Lading as part of decision Box 462.

The process goes to decision box 464, and if there are any OS&D, the carrier needs to notify the caseworker. The carrier is required while at the customer's dock to call and say if there is a problem (discussed earlier). He needs to notify the shipper again to be proactive with the customer and the shipper determines if a back order or shipment is needed, or whatever else, to satisfy the customer's needs.

Decision Box 466 indicates that after the carrier has notified the caseworker that there are no changes to the Bill of Lading, the customer signs the Bill of Lading and this is proof of delivery. The earnings process is basically complete at this point.

Decision Box 468 indicates for the carrier to EDI the freight bill to the shipper, or EDI the date and time of delivery to the logistics network. This will further remove paper from the system.

Decision Box 470 shows that the shipper pays the freight bill by accounts payable, without the need of a paper freight bill.

Decision Box 472 queries whether the customer pays the shipper or rather makes any deduction on the invoice that's in addition to the agreed upon OS&D. In addition, even if no OS&D is reported, the customer still may nonetheless take a deduction on the invoice. Decision Box 474 shows that shipper requests a copy of the Bill of Lading from the carrier when the customer does not pay the shipper. Anytime there is a shortage in a receivable amount from the carrier that's not justified or documented, a copy of the Bill of Lading is requested from the carrier. This information is used to adjust accounts receivable, if appropriate. They are required to be kept on file for six years by the ICC. This is the only time that this piece of paper is required to be delivered to the shipper. If the customer does pay the shipper the full amount, then Box 476 shows that the C.O. is closed and cash is to be applied fully if there are no discrepancies in accounts receivable. The C.O. was closed earlier in the process.

IV. Inventory Management

Figure 21:
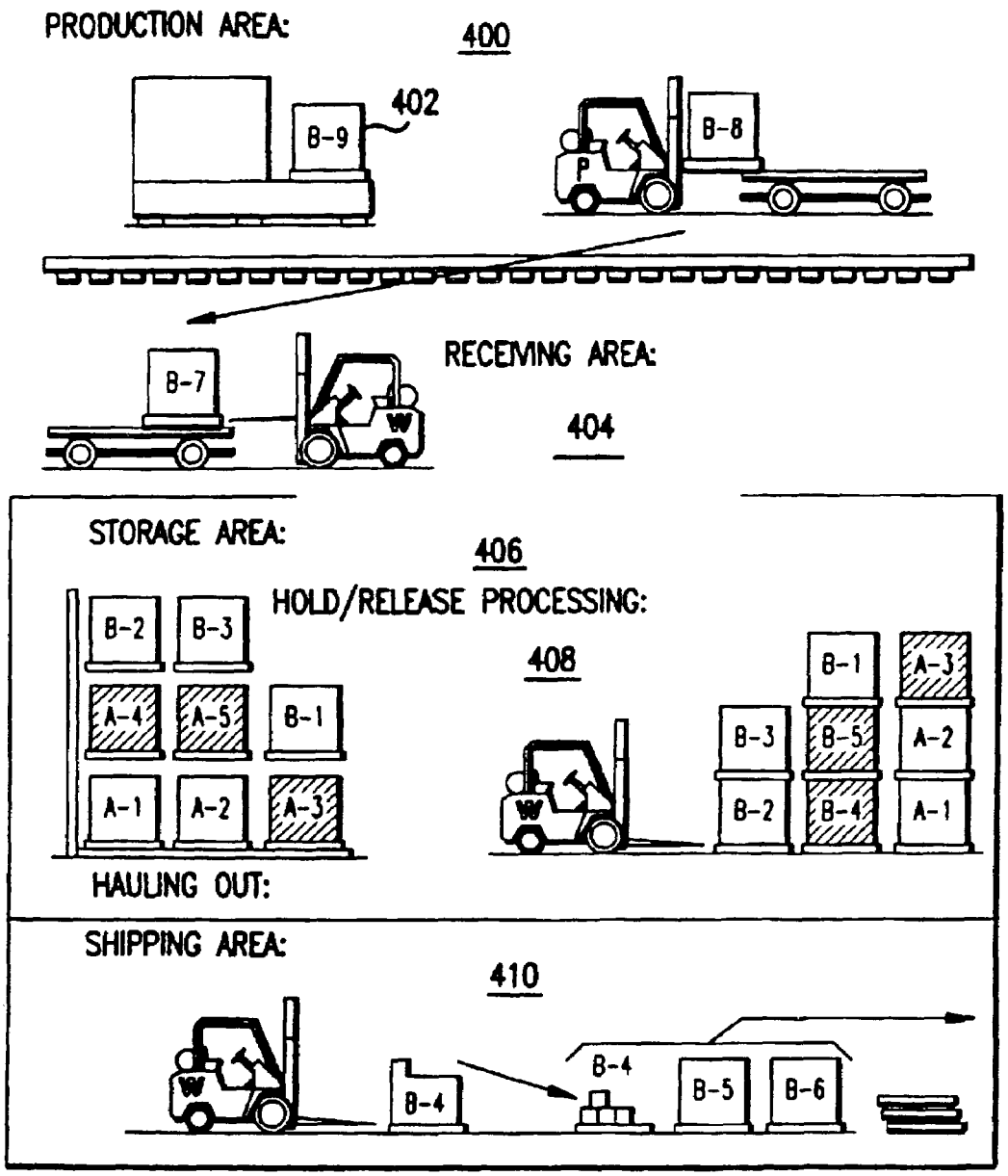
FIG. 21 illustrates a product flow from receipt to the staging area for storage and ultimately shipment.

Referring to FIG. 21, there is shown a diagrammatic representation of product flow within this order management system. At the head of the diagram is shown the production area (400) where as pallets (402) come off the receiving line and a bar code license plate is attached. Each pallet (402) is scanned and counted as it is loaded on the pallet train. This information is fed into the inventory management system that connects across the AS/400 network. The pallets (402) are loaded from the receiving train and the license plate and quantity are scanned in the receiving area (404). If there is an error it must be corrected before the pallet (402) is taken into the warehouse. Next each pallet (402) is stored (406) and the location is scanned. Each time a pallet (402) is moved from one location to another the pallet (402) is scanned and counted and a new location is scanned. Likewise, there is hold release process (408) where a hold is put on pallets (402) and recorded in database. Pallets (402) marked hold cannot be shipped until they are released. The pallets when pulled are moved to a shipping area (410) and if partial pallet usage is required, this information is recorded before pallets (402) are moved back to storage (406). The shipment is readied from these pallets, and is loaded and Bills of Lading issued.

Figure 22:
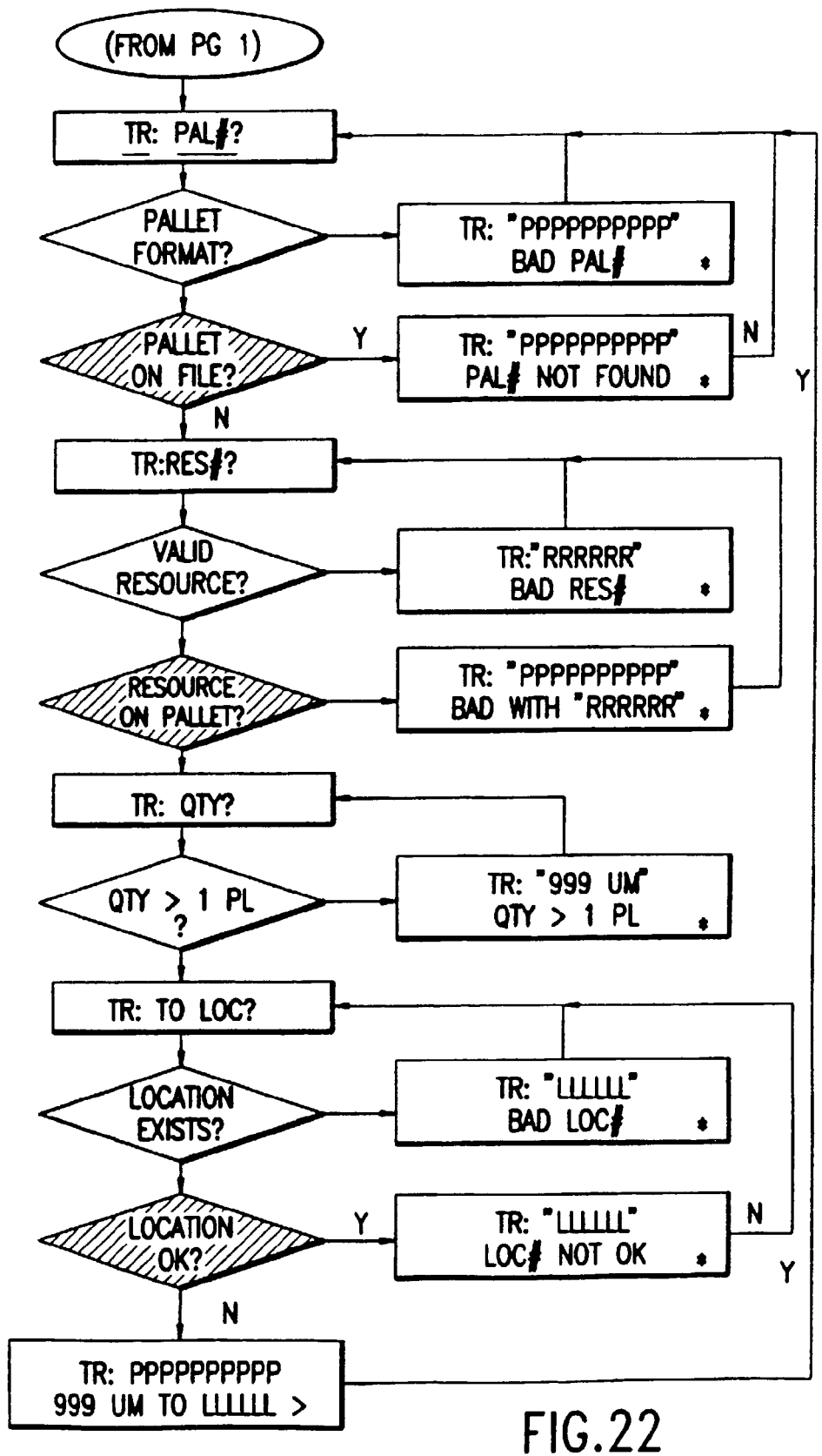
FIG. 22 illustrates a flow chart of a transaction (TR).

Shown in FIG. 22 is a diagram of the software function supporting the inventory process previously described.

Figure 23:
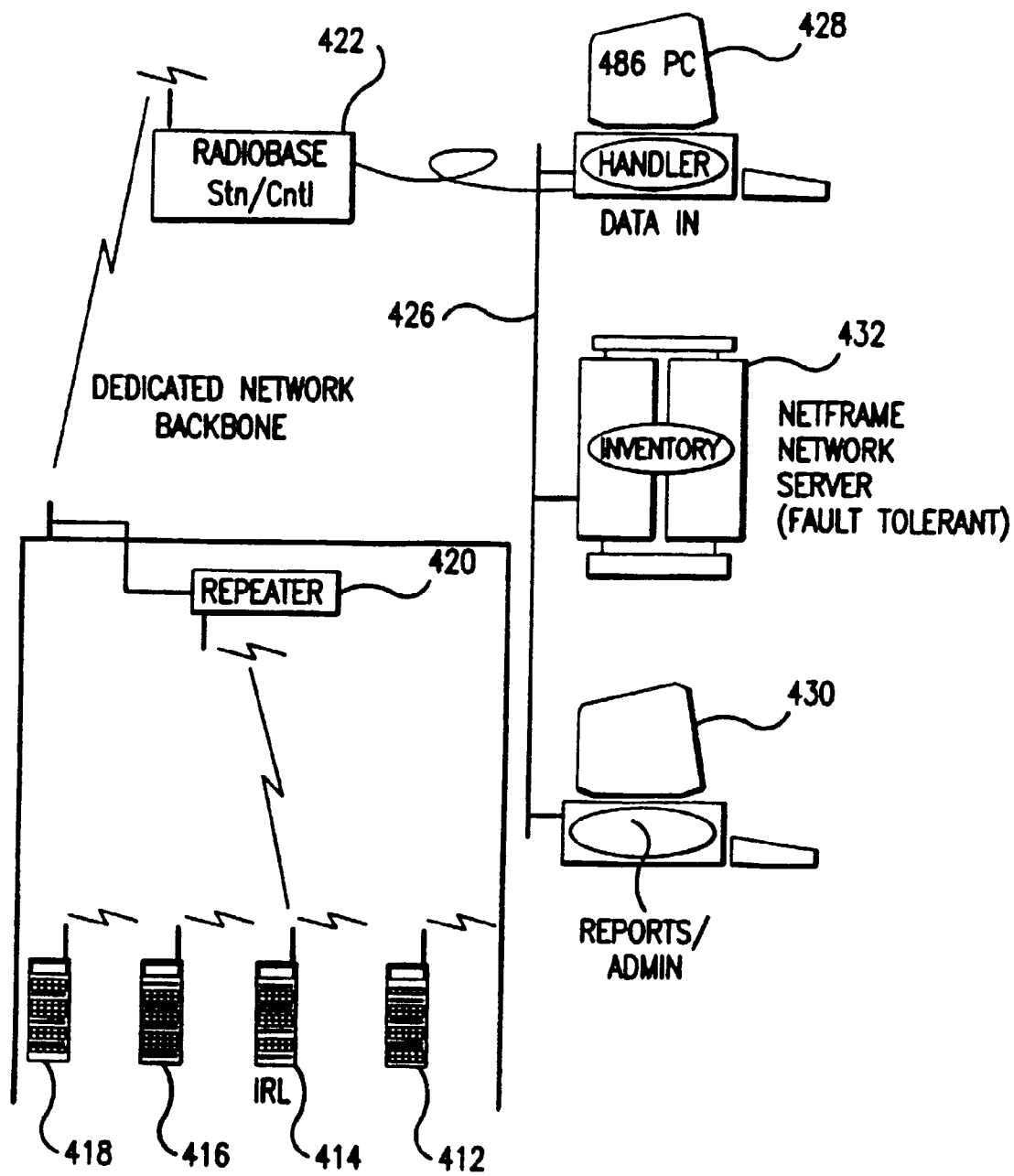
FIG. 23 illustrates a system for hand-held warehouse reading devices interconnected to a dedicated network through a radio base for inputting and receiving warehouse data.

Shown in FIG. 23 is the hardware system that supports inventory management and control. Hand-held devices (412, 414, 416 and 418) are used in the warehouse to scan pallet license plates and to update information to the database. The scanned data is received by repeaters (420) and relayed to a base station (422) where through a network (426), this data is related to PCs (428, 430). Information then flows to the network server (432) which supports the inventory function and information likewise flows from this network into the reports and administration function where financial records and the like are created.

Figure 24:
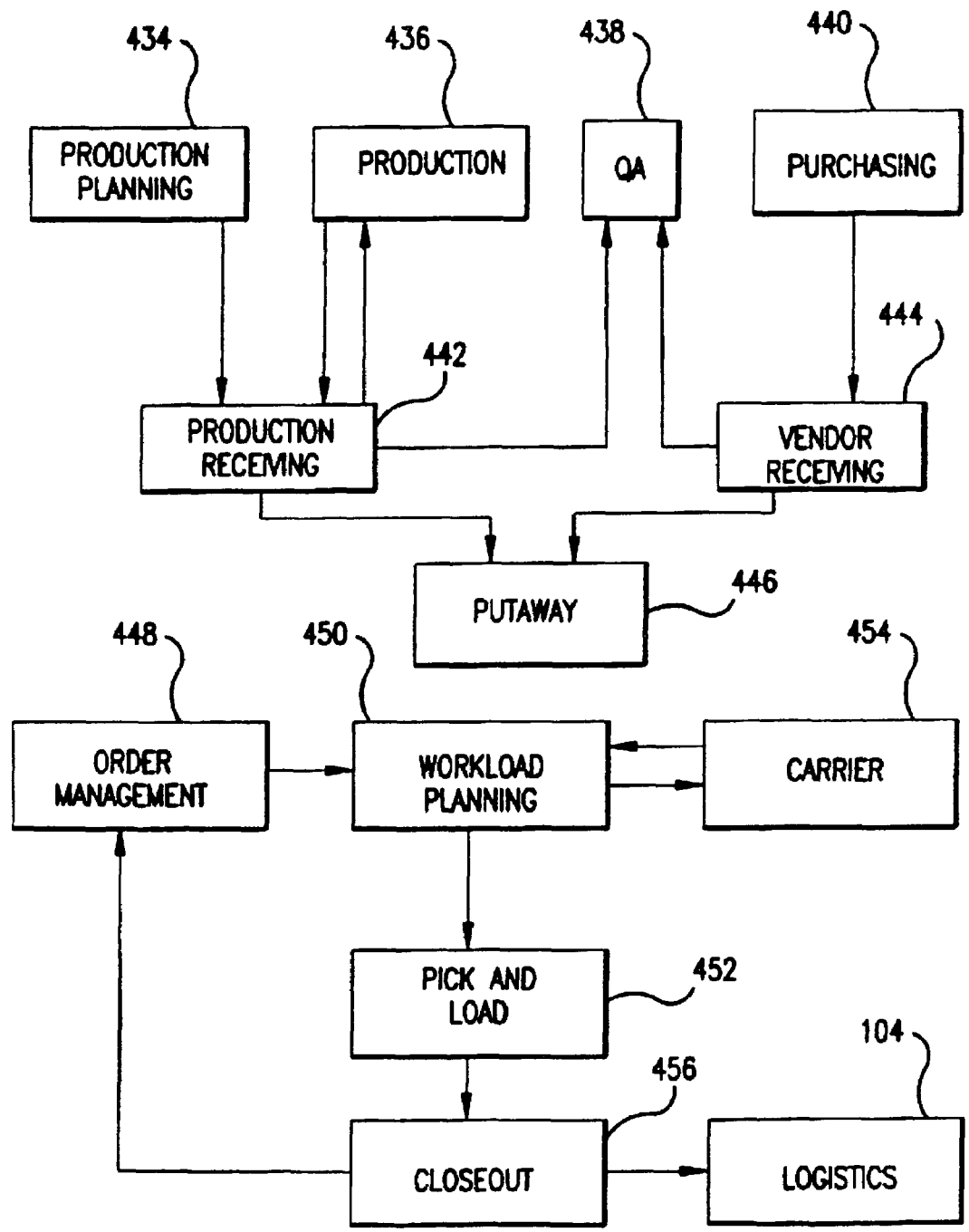
FIG. 24 illustrates an inventory management normal cycle overview.

FIG. 24 illustrates in diagrammatic function the normal cycle of inventory management. It shows the functions as they interrelate one to another. Particularly the production planning (434), production (436), quality assurance (438) and purchasing (440), interacting with production receiving (442) and vendor receiving (444) to create the necessary records and instructions for the putting away (446) of inventory. Likewise the order management function (448) inputs data for workload planning (450) to assist in making a decision of which goods to use and to pick and load the goods for the carrier (454) and to close out (456) the order and report the information to the logistics functions (104) and feed back information to the order management system (10).

Figure 25:
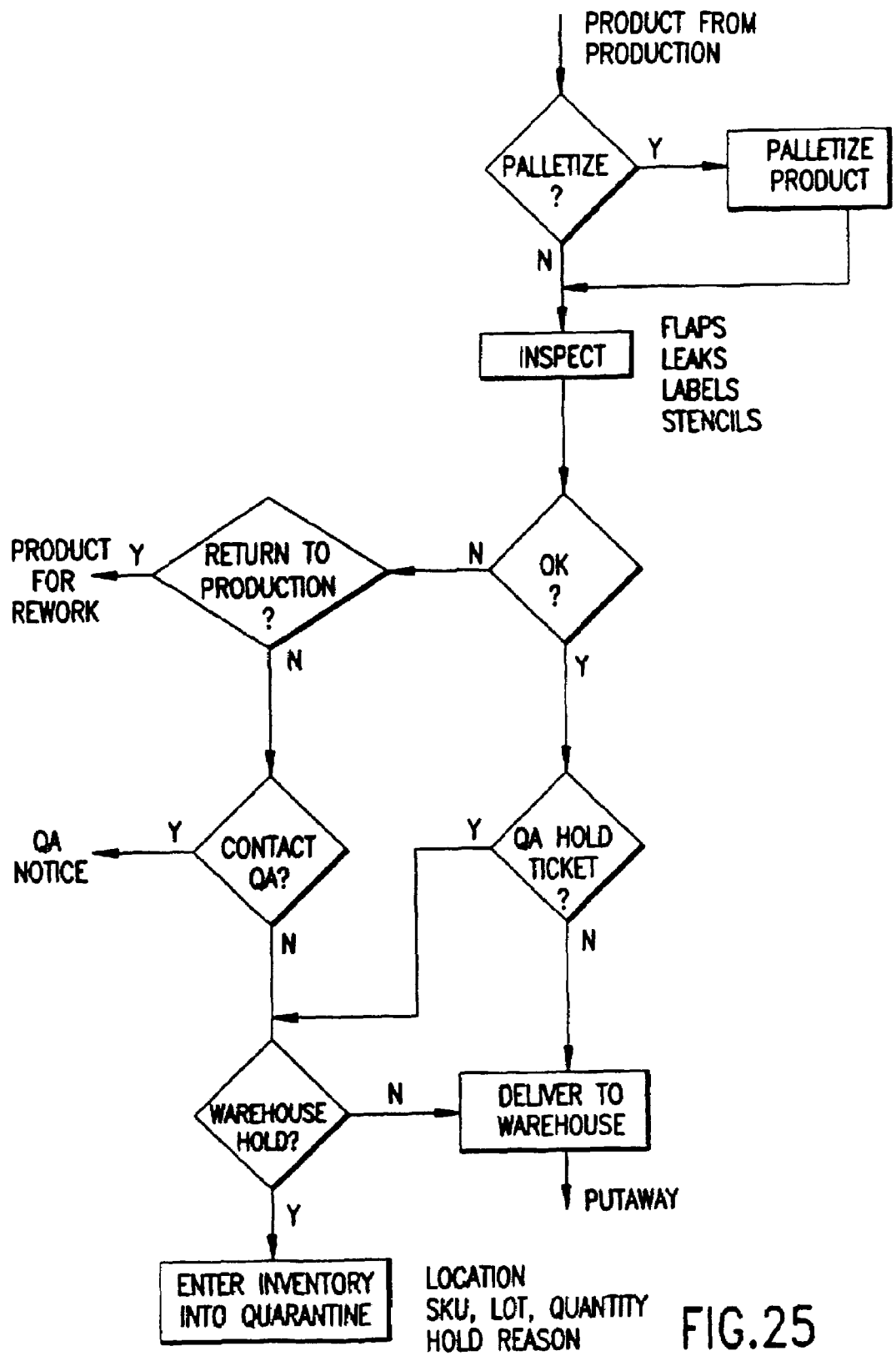
FIG. 25 illustrates a production receiving schematic.

FIG. 25 shows the logic tree for the production and receiving function as implemented in this system and tracks through the product being received from production, palletized, inspected and then delivered to the warehouse where the product is put away and this product is entered into inventory or quarantine with a database created on location by SKU number, lot, quantity and reason for hold, if it is held in quarantine.

Figure 26:
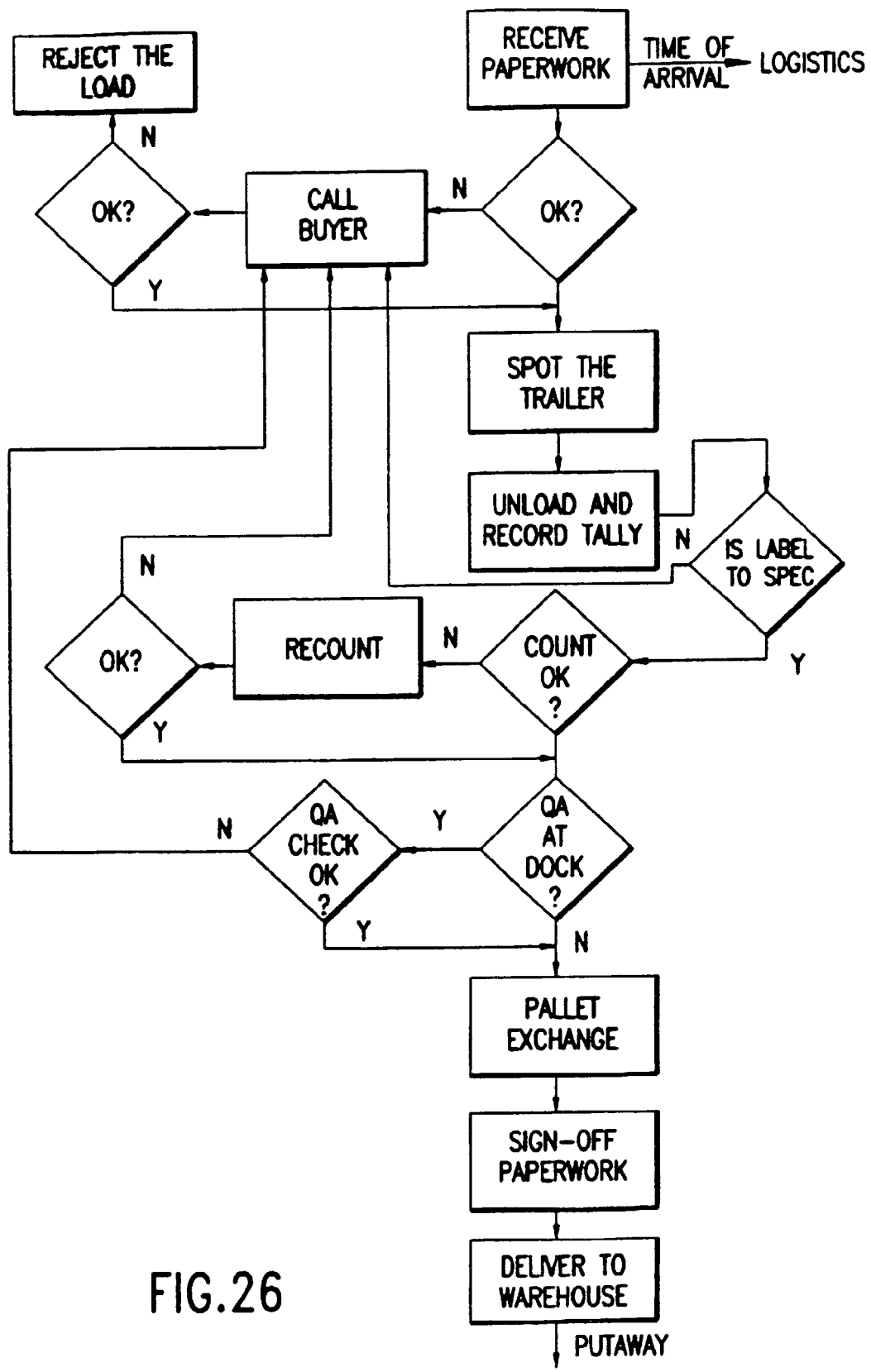
FIG. 26 illustrates a vendor receiving schematic.

FIG. 26 is the vendor receiving diagram showing the decision tree for the software to support this function and commences with the receipt of paperwork for items received. The information also is transmitted to logistics (104) at the same time to note the time of arrival of items received from vendors. Once again, there is an inspection function. If there is a problem, then the material is rejected and the vendor notified. If there is no problem, then the trailer is identified and unloaded and its contents tallied. Once again, if there is a problem, the buyer is notified so that they may contact the vendor. After the material is properly documented and inspected it is then delivered to the warehouse for putting away (446) and the information on the material is inputted into the system database for further use including the purchasing database to support an Electronic Catalog, described later.

Figure 27:
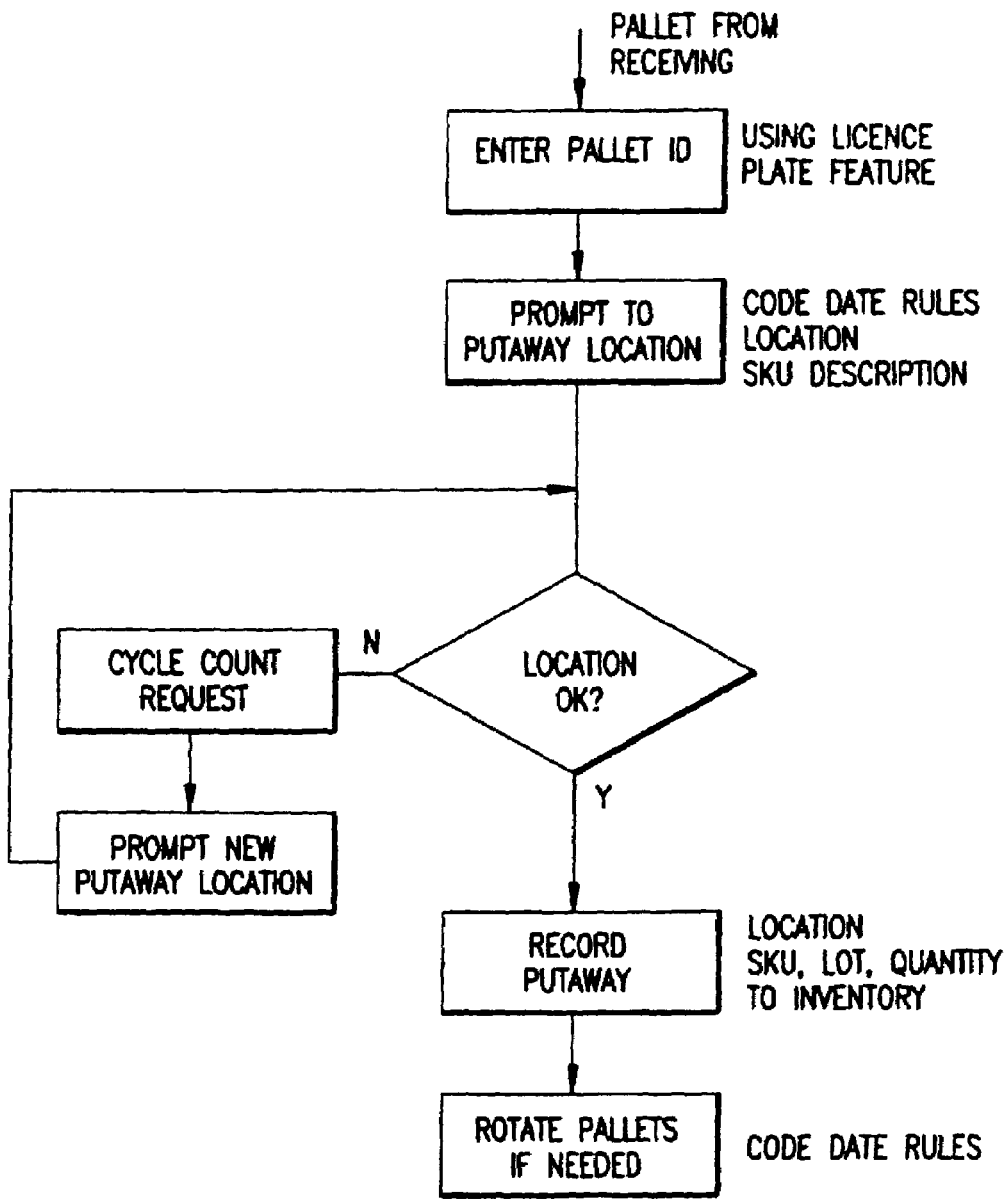
FIG. 27 illustrates a put-away schematic for identifying and placing goods received.

FIG. 27 is a decision tree on the put away (446) function. Put away (446) is the function of storage of items in inventory. As pallets (402) are received, identification is entered using the license plate as previously described. The pallet (402) after being identified is promptly moved to a put away (446) location which has been identified for it. This information is fed into the database where the system determines if the location is appropriate for it based upon factors such as the frequency of use and the size and weight of the load. Products used more frequently tend to be moved to the front of the warehouse where they can be pulled more quickly. Heavier products tend to be loaded lower in the stack than lighter products. If the location is okay, there is a count made and prompt put away (446) is accomplished. As part of the information in this inventory system are coded dates to determine if there are perishable items that need to be moved within certain dates and this is also noted in the inventory records.

Figure 28:
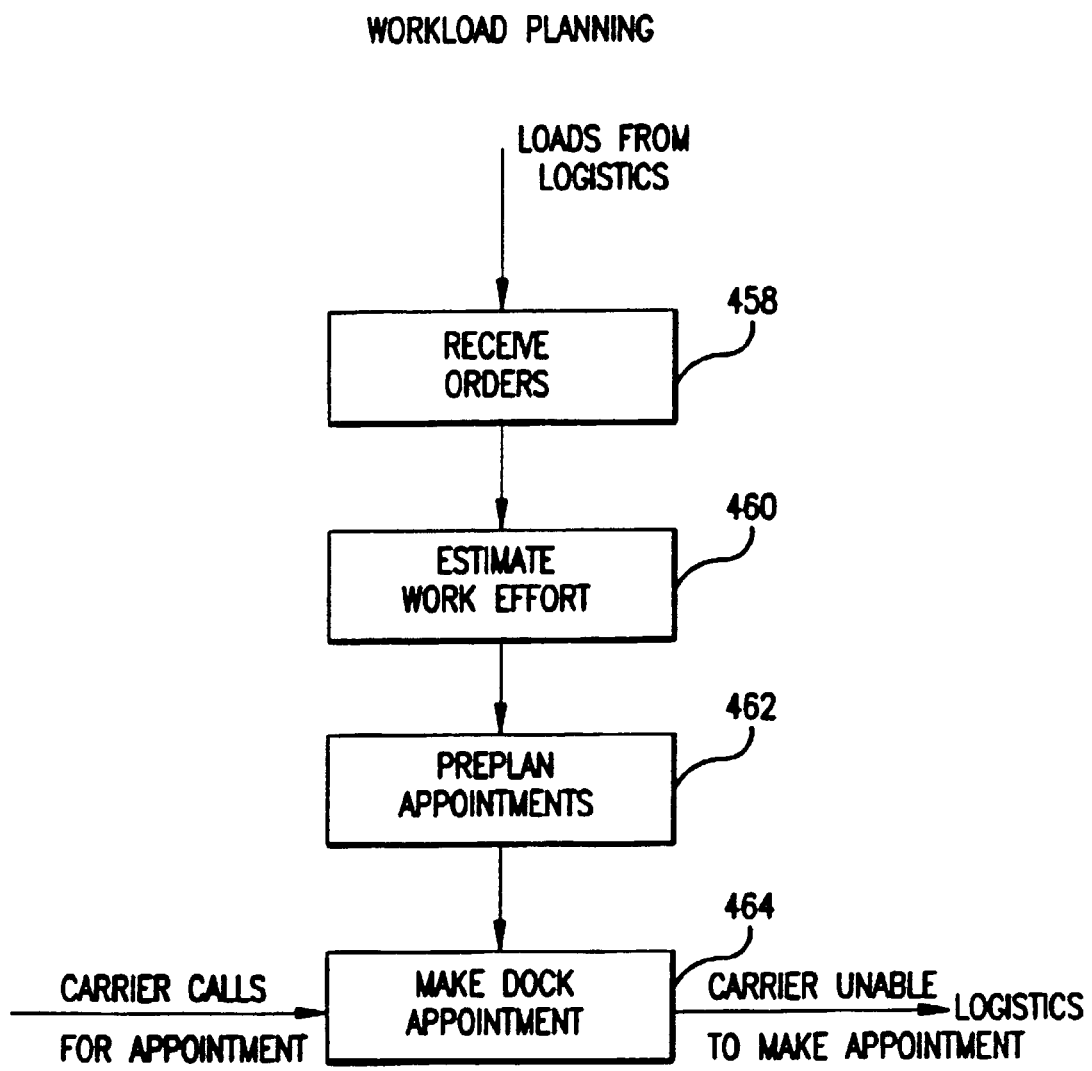
FIG. 28 illustrates a schematic for workload planning for receiving orders and placing shipments.

Referring to FIG. 28, workload planning, information on loads are received from the logistics function (102) as a basis to create receive orders (458) with estimated work effort (460) involved to provide a preplan for appointments (462). A carrier calls for appointment for delivery of goods and makes a dock appointment (464). If the carrier is unable to make appointments, this information is fed to logistics (102) where their records are updated as well.

Figure 29:
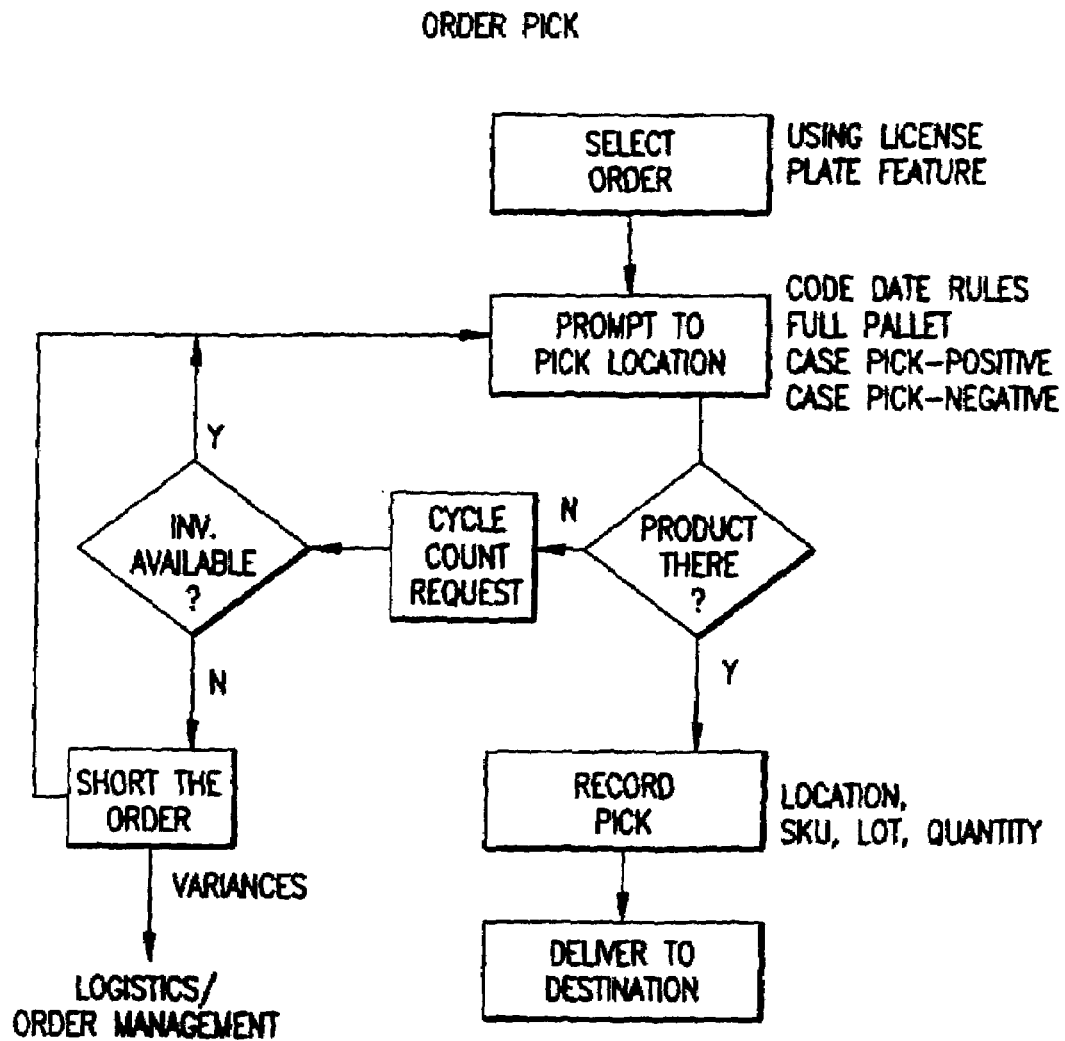
FIG. 29 illustrates an order-pick schematic for selecting orders and delivering to destinations.

Referring to FIG. 29 there is shown the order of pick function in diagrammatic fashion. The decision tree is used to represent functions embodied in the system software to support the function. Orders are used to create a selection process based upon the license plate of a pallet (402) to determine the goods stored on the pallet (402). This information is used to go to a picked location based upon the code dates so that perishable items are picked within their date rules first as well as the maximizing of the use of pallets by picking full pallets if that's what an order calls for, or partial pallets if not. As the process continues the driver goes to the location designated and if the product is there he picks the product and records it in a hand-held device which then immediately feeds the information on location, SKU, lot and quantity back into the inventory management system through the hand-held network and the driver then delivers his load to its destination in the system. A unique feature of this system is that using double-long forks, load picking can be maximized to route a driver to pick two pallets in adjacent locations, or in at least nearby locations, rather than run back and forth on a pick cycle. If the driver goes to the location and there is no product there he then puts a request back into the system to verify the request and location. If it comes back the same way, he then inputs this information into the system to create a cycle count that will then update the inventory system to show that there is an error and the product is not at the place indicated. The cycle count request will then initiate the second query into whether the inventory is available. If it's not, then there's a notification to the system that there is a short order and this information on variances is fed back to logistics and to management functions where it can be reconciled in a new product order. If the inventory is available, then this information is fed back into the system and a new pick order is generated. Both the availability and non-availability of inventory are fed back into the system so that the system database can be updated to respond to future pick orders.

Figure 30:
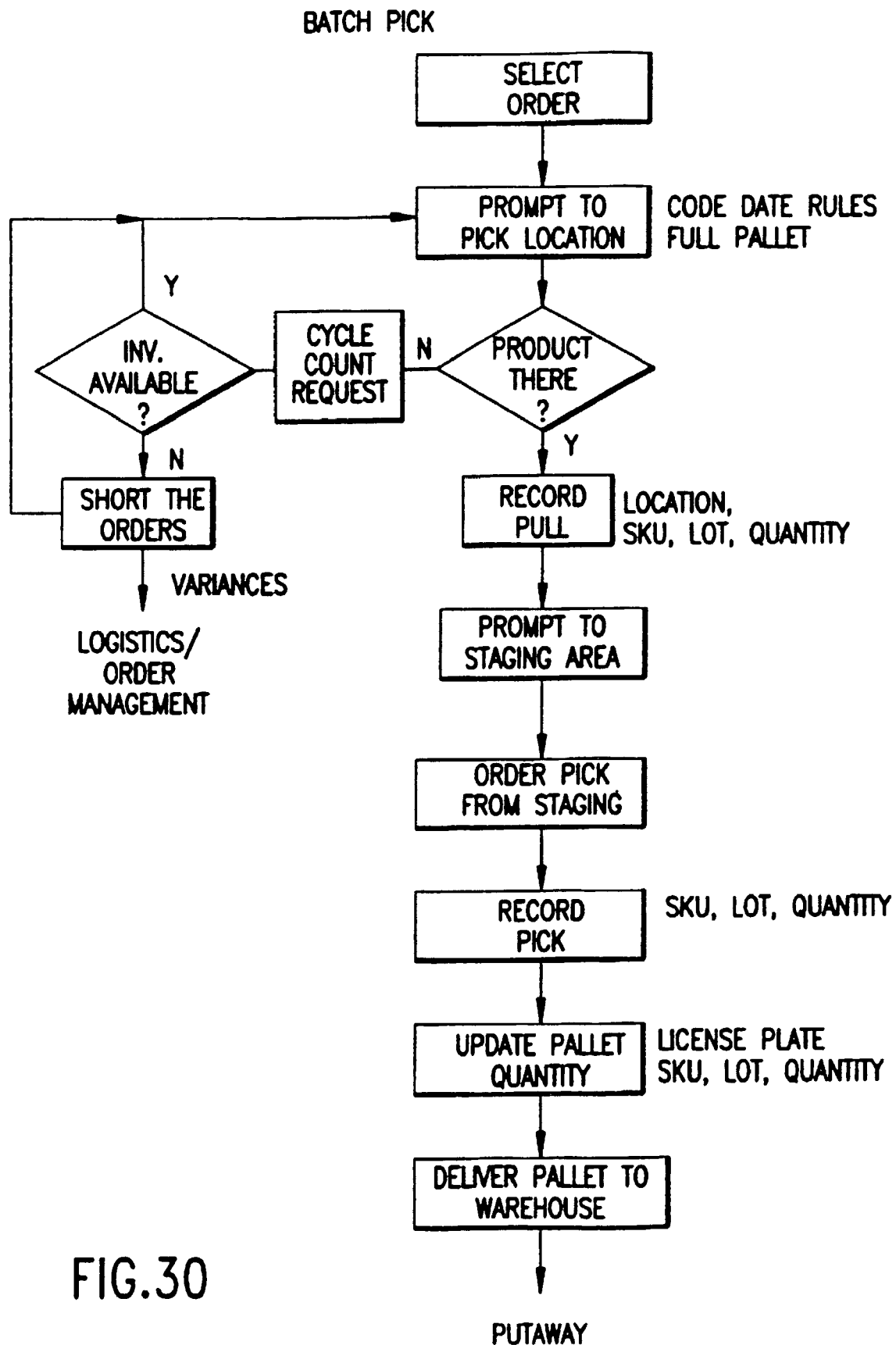
FIG. 30 illustrates a batch-pick schematic for selecting orders and delivering pallets of such orders to warehouse for put away.

Referring to FIG. 30, shown here is a batch pick function in diagrammatic fashion. Once again a select order of goods is initiated and the location then is generated for the driver based upon the code date rules and whether full pallet or partial pallet are requested. The driver goes to the location to see if the product is there. If the product is not there, as in the previous order pick function, the cycle count request is initiated to determine if there is a short order, and if the inventory is available at another location. This information is fed back into the system once again. If the product is there, there is a record made of the pull of the product by location, SKU, lot and quantity. The load is then moved to the staging area from which the order is picked. A record of the pick is made and if there is a partial pallet picked, then the quantity on the pallet is updated by license plate, SKU, lot and quantity. The pallet is then delivered to the warehouse after the goods have been picked for putting away.

Figure 31:
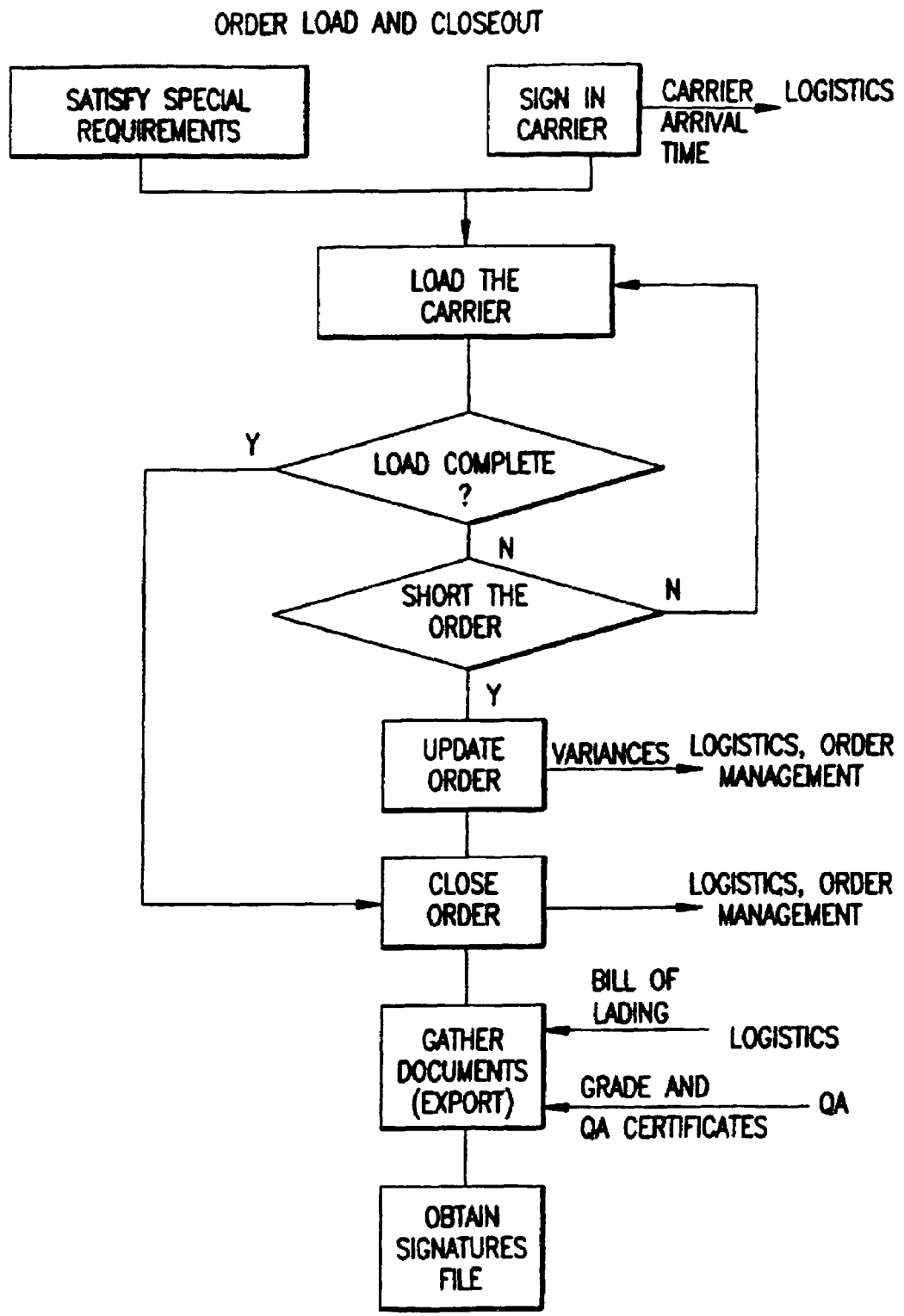
FIG. 31 illustrates an order load and closeout schematic showing the process for documenting orders and their ultimate filing into the system of this invention.
Figure 32:
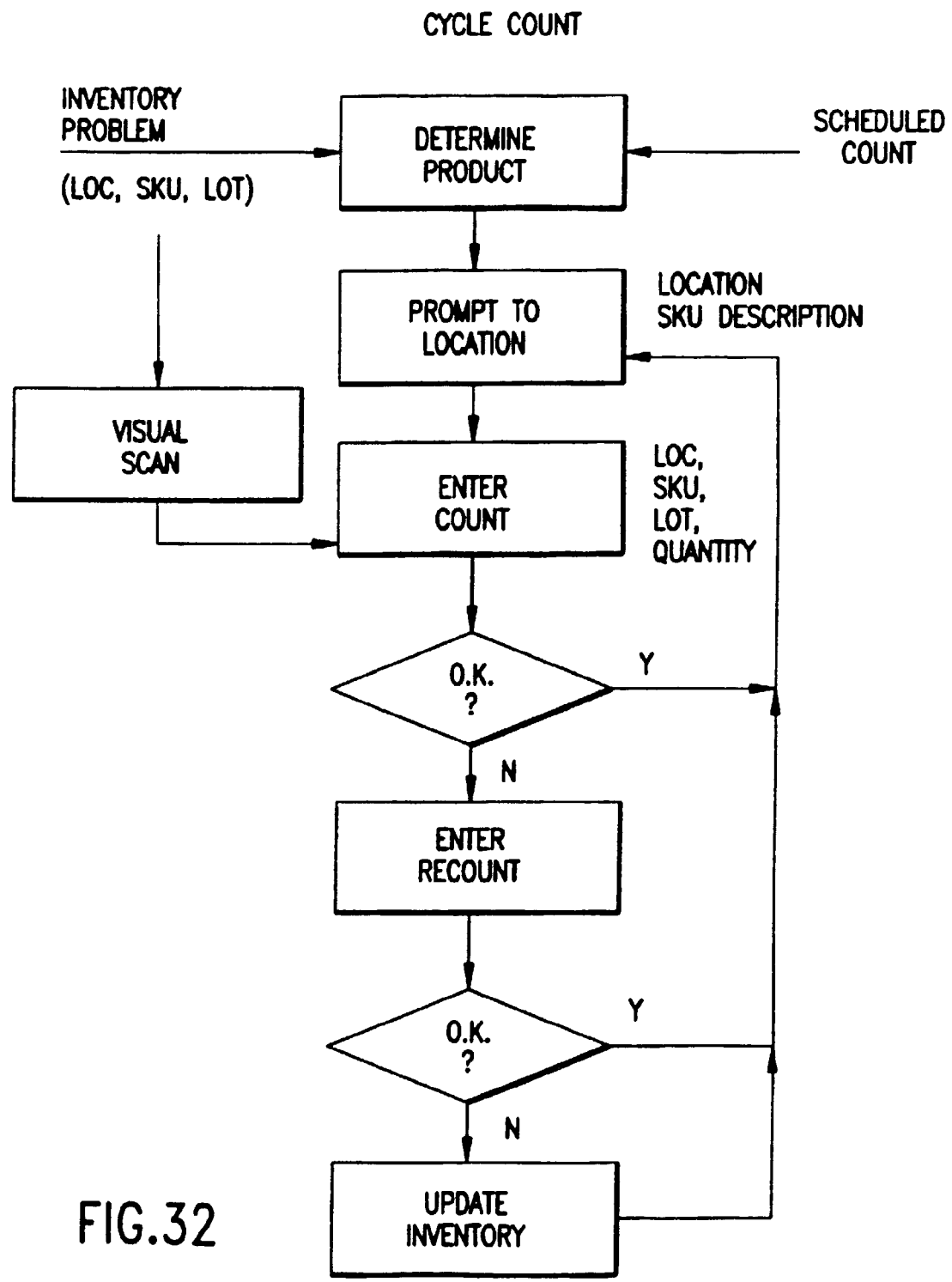
FIG. 32 illustrates a cycle count diagram for determining product scheduled for processing and moving to inventory as well as updating inventory.

Referring to FIG. 31, there is shown an order, load and closeout function in diagrammatic fashion. Once again the diagram indicates the logic of the software implementing this function. Having previously described the functions of picking an order and the loading of the order, the description shown here is further a description of the previous function except for the gathering of documents where there is an export of the goods and appropriate Bills of Lading must be created as well as grade and quality certificates are created and signatures are obtained for the files as needed. After the order has been loaded and the updates and variances noted, the order is closed out and this information is transmitted to logistics and the order management function. Referring to FIG. 32 there is shown the cycle count function in diagrammatic fashion as implemented by software in the system. The cycle count provides for correcting inventory problems that are identified in the warehouse. The inventory problems could arise from the wrong location of storage of products, a wrong SKU number or a lot problem. The cycle count is implemented by a visual scan that then enters the information of location, SKU, lot and quantity. If this information is okay, then that data is fed back into the database. If it's not, then there is a recount initiated resulting in a further query of whether the information is okay. If it is okay it gets fed back in the system to indicate that. If not, the inventory is updated. All of this is done without paper and is done in a real time fashion using hand-held instruments to input the data into the inventory management database.

Figure 33:
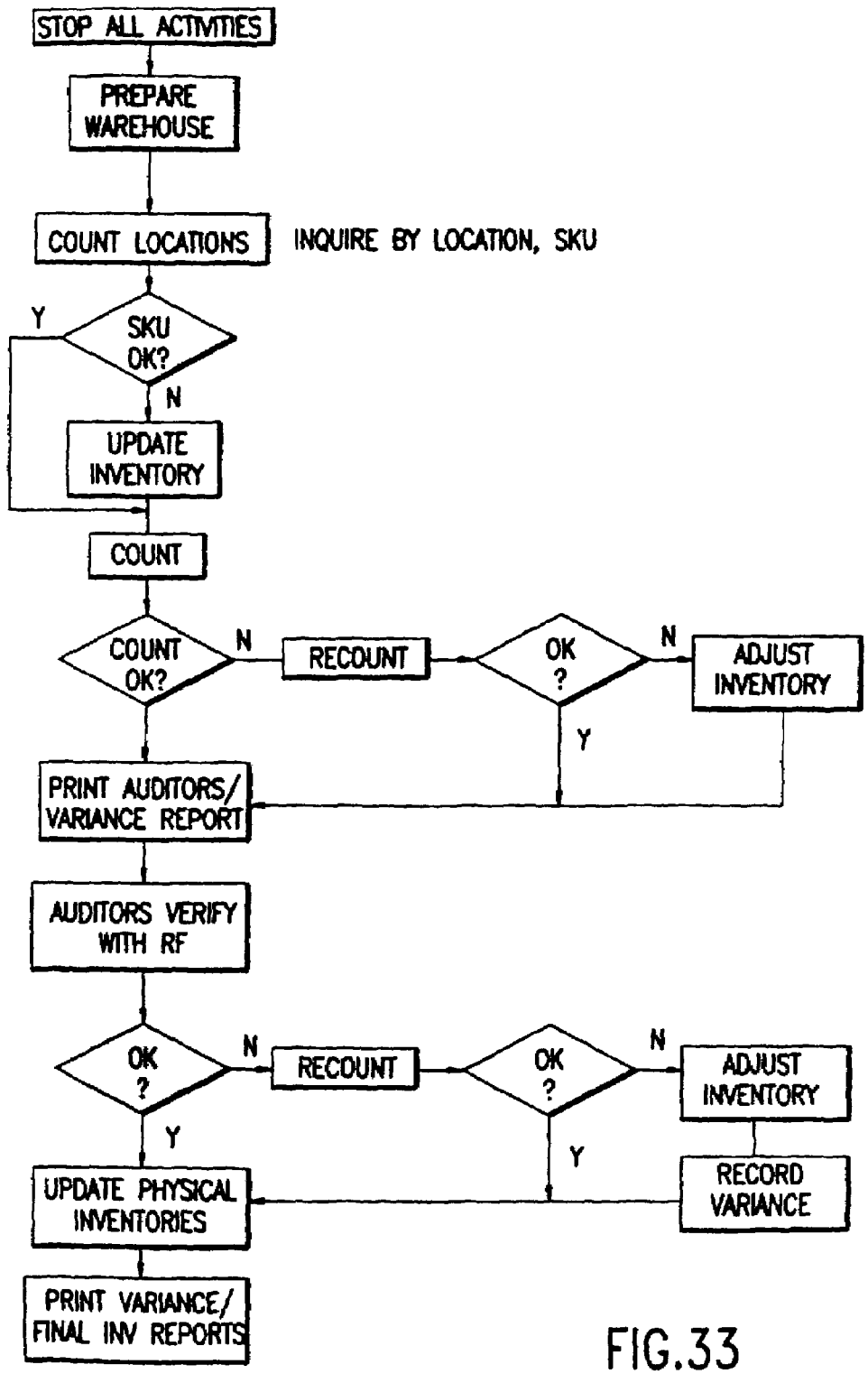
FIG. 33 illustrates year-end physical schematic to provide a year-end inventory count.

Referring to FIG. 33, there is shown in diagrammatic fashion the year-end fiscal accounting of inventory. Some of the functions have been described previously and for simplicity reference is made to this diagram which is fully descriptive of the inventory count process.

Figure 34:
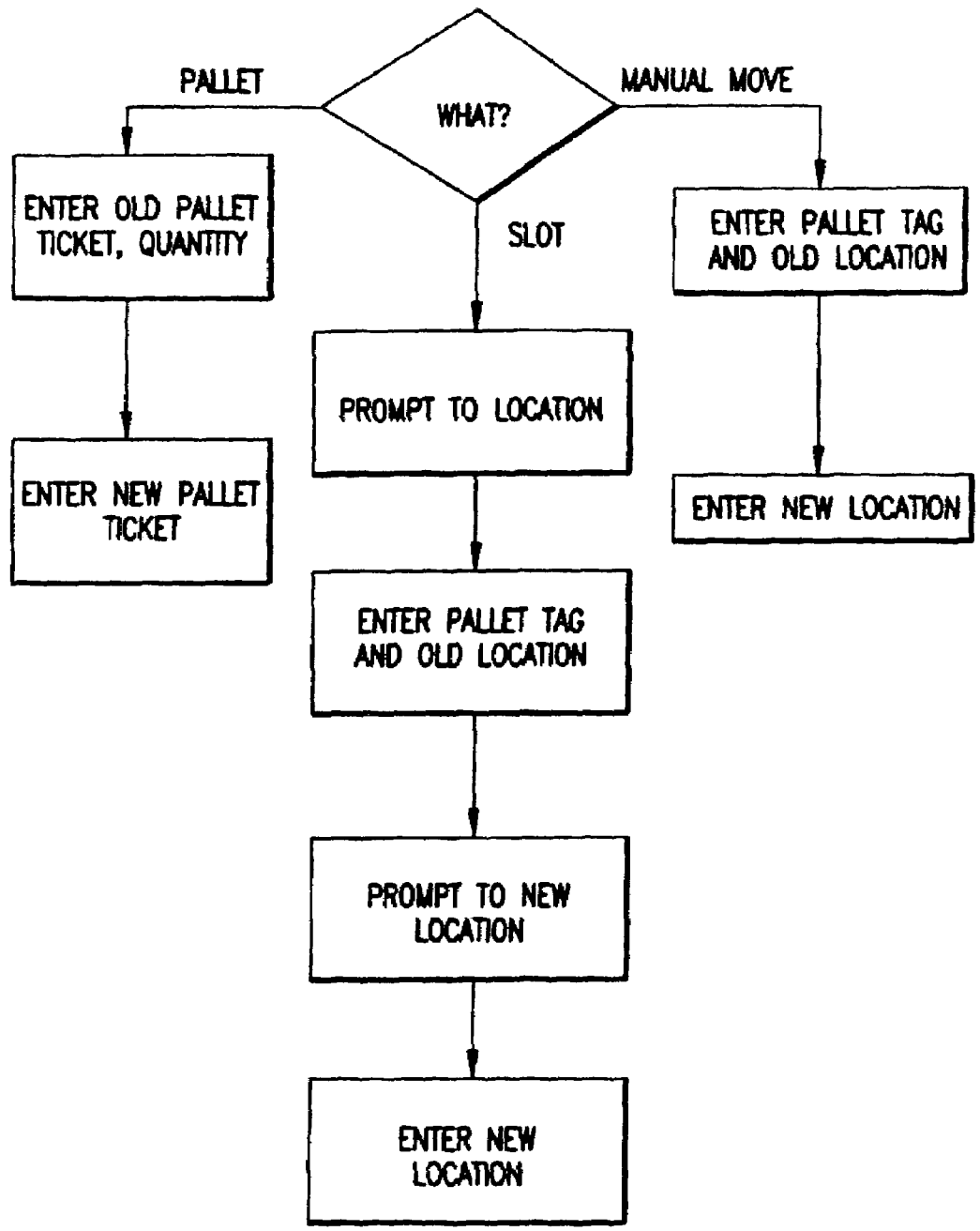
FIG. 34 illustrates a consolidation schematic showing the process of moving goods to new locations for efficient storage and processing.

Referring to FIG. 34, the consolidation function is shown in diagrammatic fashion as implemented by software in this system. A decision is made in software as to what to do with the product received. The decisions can be to place it on a pallet, at which point in time the old pallet data from which this product was pulled is entered, including ticket and quantity and a new pallet is ticket is created. If the decision is to place the material in a slot, the material is moved to a location where the pallet information and the old tag location is entered to create a new location identification. Alternatively, if the decision is to make a manual move of the product, then the old pallet data is entered as well as the new location that the pallet will be moved to, to update the records for the inventory system.

Figure 35:
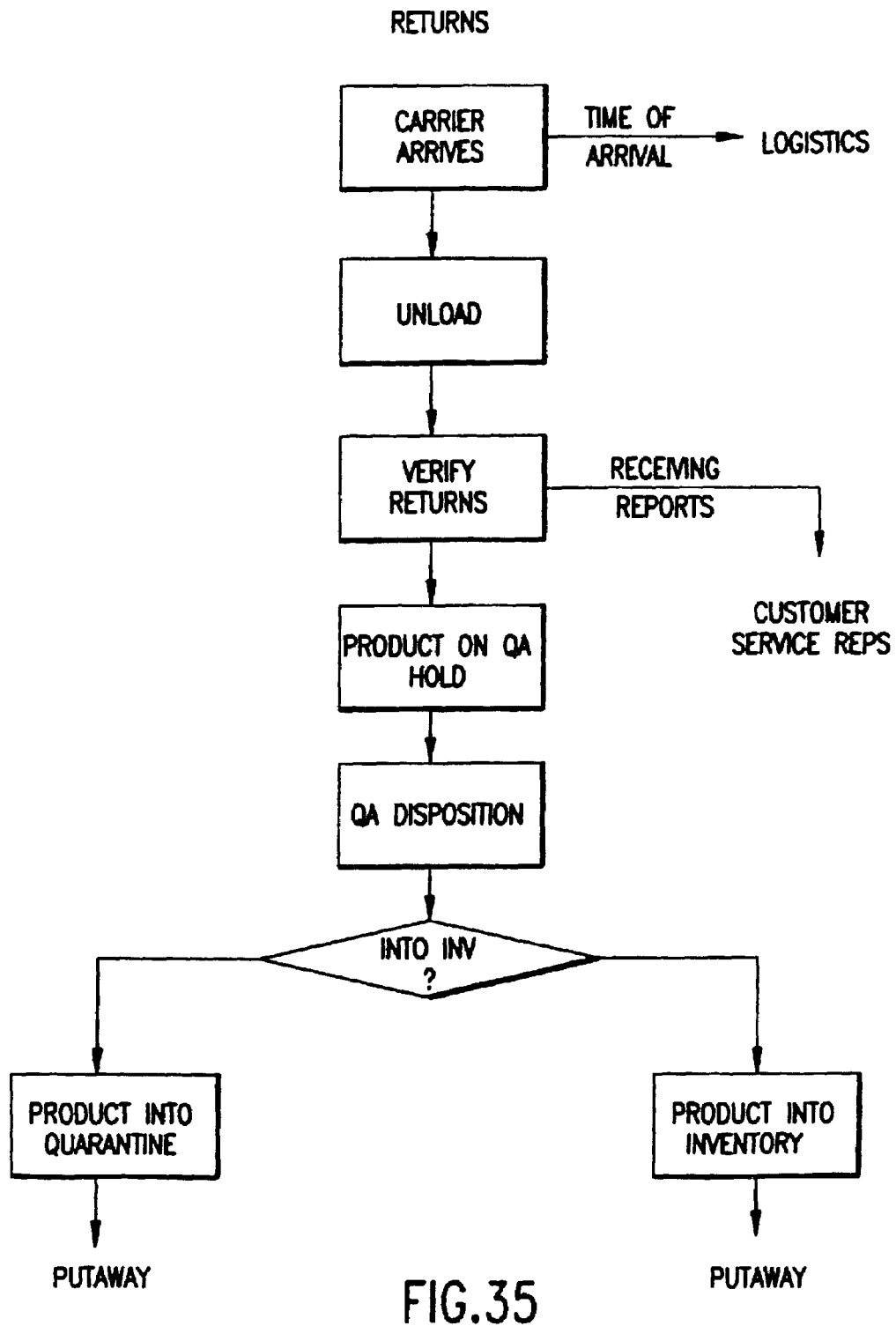
FIG. 35 illustrates a return schematic demonstrating the receipt of goods that are returned to either inventory or to quarantine.

Referring to FIG. 35, there is shown the return system and document function. As returns are received, logistics is informed of the time of arrival of the goods. Simultaneously the truck is unloaded. The information on the material, such as quantity and the shipping information is entered into the system and the customer representative is fed this data on line before the product goes back into the inventory. There is a quality check and after making disposition on the quality, a decision is made as to whether to put the product into quarantine or back into inventory.

Figure 36:
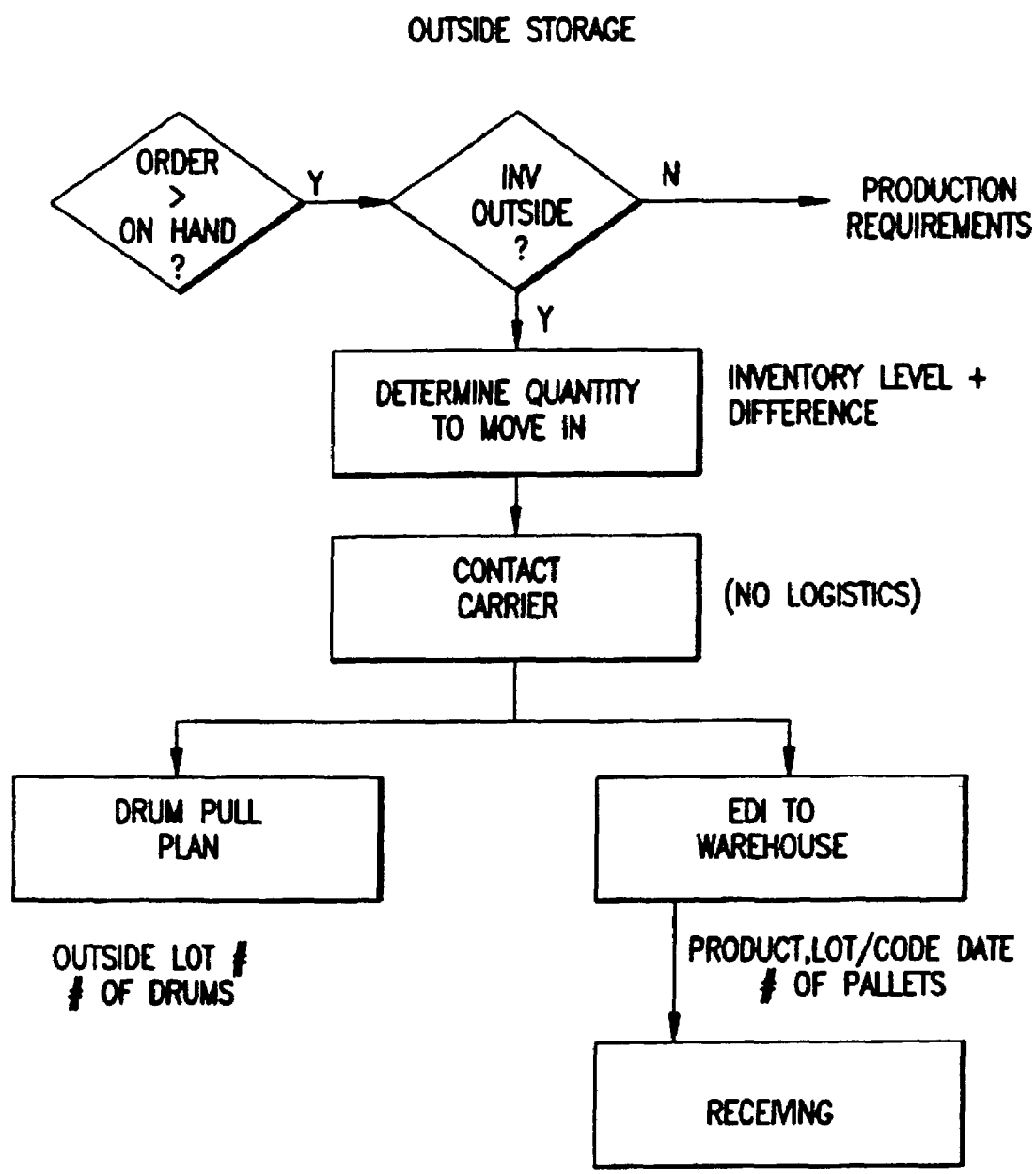
FIG. 36 illustrates an outside storage schematic showing the movement of goods from inventory to storage and ultimately receiving.

Referring to FIG. 36, there is shown in diagrammatic fashion the outside storage decision process. When an order is received, the decision is made as to whether it's going to be used for production or needs to be stored. If the decision is for storage, the carrier is contacted and the material is moved to storage where the data on the location and the retrieval cycle is entered. There is electronic data communication with the warehouse storage to update the product/lot, code, date and number of pallets and this information is simultaneously provided to receiving to create records of the goods coming into the system and having been identified as being stored outside of the shipper's facility.

V. Purchasing

Figure 37:
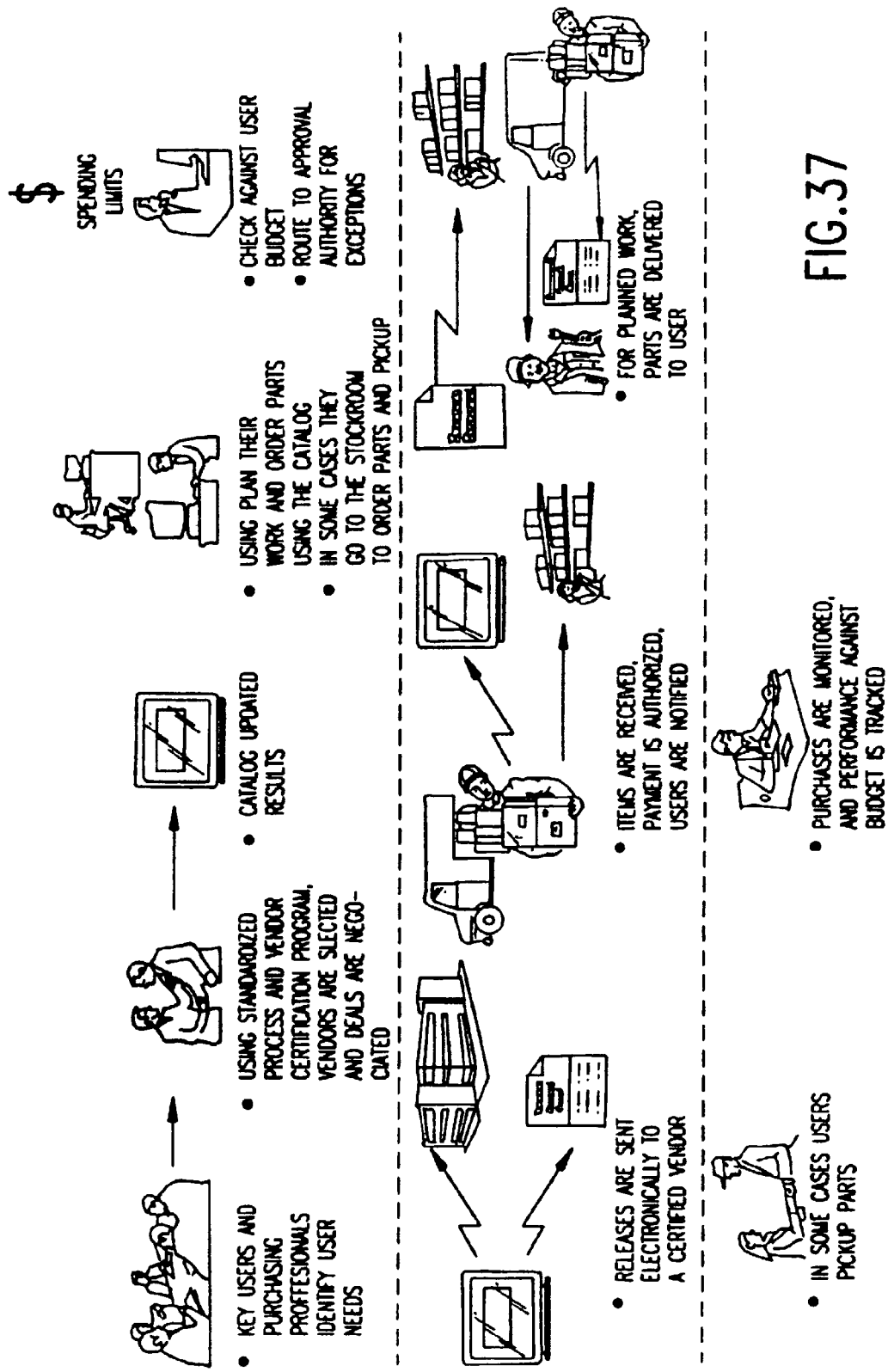
FIG. 37 illustrates the standardized process and end solution for creating an electronic catalog and system to support it.

Referring to FIG. 37, there is shown a process of standardized purchasing. By standardizing purchases, the process of acquiring materials for the system is streamlined. This is accomplished by creating blanket vendor agreements that have sufficient data on quantity, shipments, charges, delivery times and availability that this information can be entered into an electronic catalog (EC) for use by a user having access to the system.

Figure 38:
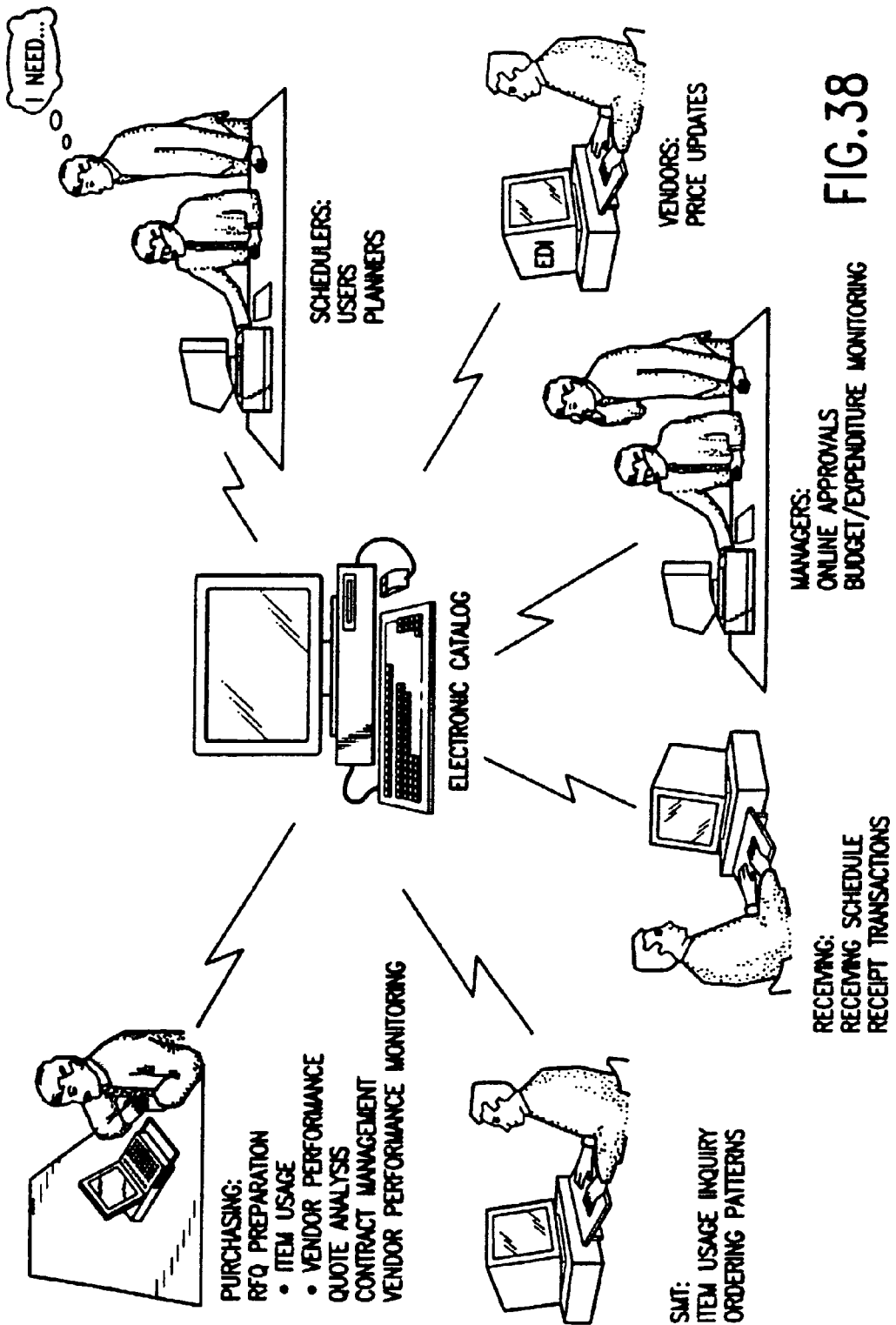
FIG. 38 illustrates the relationship of an electronic catalog to the various components using it.

Referring to FIG. 38, there is shown in diagrammatic fashion the electronic catalog. The different functions of the system using the electronic catalog are noted on this diagram. The purchasing function is notable in which requests for quotations are prepared based upon item usage and vendor performance. The analysis for quotes is accomplished by contract management system which provides for the monitoring of contracts vendors. A subsequent vendor's performance is monitored. All of this is entered into the database. Likewise the supplier management team, designated by SMT, examines item usage and inquiries as well as ordering patterns to determine the historical basis of future order requirements, thereby creating a decision basis as to what inventory to use to create a database of items to be made available on the electronic catalog. The items will be standardized to the extent possible and fewer vendors approved to minimize the amount of transactions necessary for procuring repetitive standardized items. Likewise the information on receipt of goods for receiving, schedules and receipt transactions are supported by the electronic catalog. Managers may make selections from the electronic catalog using on-line approval procedures based upon approved budgets. This information is fed back into the budget and expenditure monitoring programs to update the financial projections for the year-end to determine if the budget is on target or otherwise out of performance. The electronic catalog also may be updated by vendors, including price updates, if there is approval for that practice with the vendor.

Figure 39:
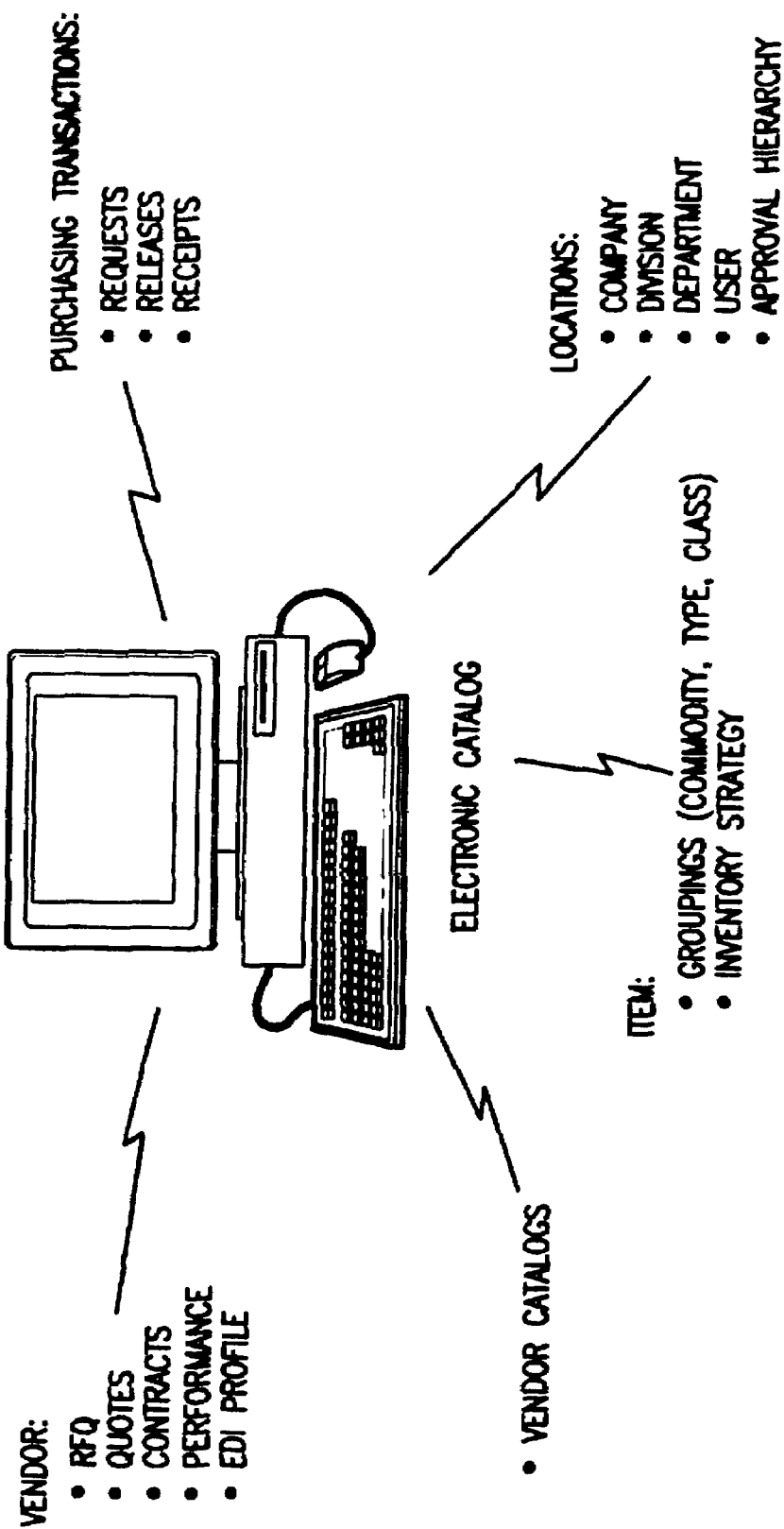
FIG. 39 illustrates the information stored in an electronic catalog.

Referring to FIG. 39, there is shown an electronic catalog information and storage. The electronic catalog stores information on vendors by request for quotation, quotes received, whether there are contracts in place, as well as vendor performance and maintains an EDI profile of the vendor to determine how to communicate with it. The electronic catalog also maintains records on purchasing transactions with the request for items, releases those purchase order requests and notes the receipt of the items. Vendor catalogs also may be included in the electronic catalog if compatible. Items in the catalog are grouped by commodities, types and class and there is an inventory strategy as to the stocking of continually used items, if appropriate. The electronic catalog also notes location by company, division, department, user and approval hierarchy. In this fashion the goods may be identified at any point in time and if necessary retrieved.

Figure 40:
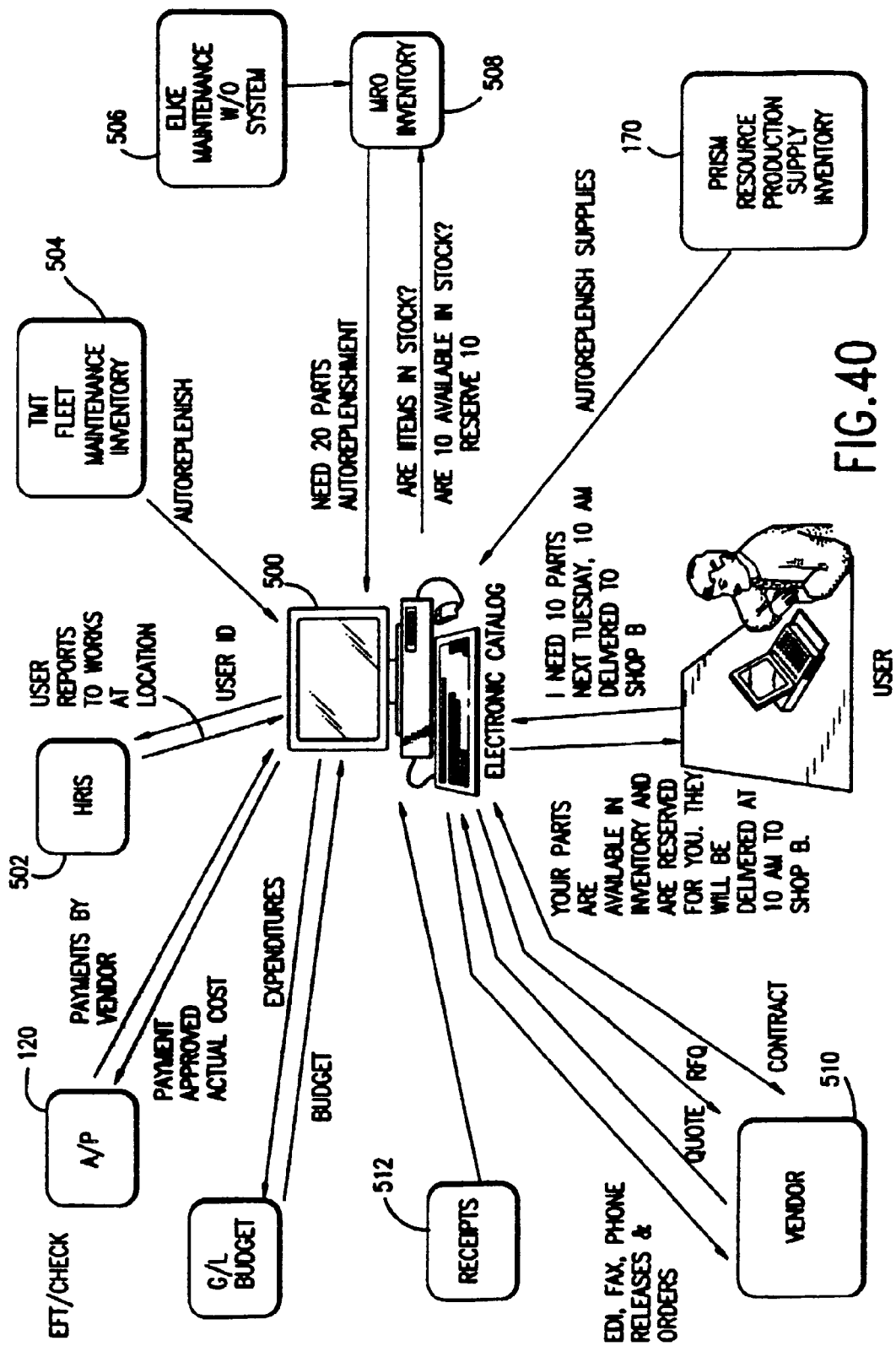
FIG. 40 illustrates how the electronic catalog accesses information in various databases.

Referring to FIG. 40, there is shown in diagrammatic relationship, the electronic catalog (500) and how it accesses information throughout the system. It can be seen that the electronic catalog (500) works throughout this network to update (120) accounts payable as well as to show when there has been a payment to or by a vendor. The electronic catalog (500) also interacts with the human resources input system (502) to identify approved users in the system. The electronic catalog (500) also interacts with the transportation, maintenance technique inventory system (504) to identify items for the fleet maintenance system. The electronic catalog (500) also interacts with the ELKE maintenance system (506), and the MRO inventory (508), which is a store room inventory system, to see if items are in stock and to respond to a request by a user, versus having to order the items from the catalog. The EC also interacts with the PRISM software (170) to update inventory records. As previously stated, the electronic catalog (500) interacts with the vendor (510) to receive quotes and to ask the vendor (510) for requests for quotations and transmit contracts back and forth. This communication is by EDI, supplemented by fax, phone and release orders, if appropriate. The electronic catalog notes receipts of goods (512), so its database may be updated.

Modifications and variations of the above-described embodiments of the present invention are possible, as appreciated by those skilled in the art in light of the above teachings.

It is therefore to be understood that, within the scope of the appended claims and their equivalents, the invention may be practiced otherwise than as specifically described.

What is claimed is:

1. A system for processing customer orders for goods in a computer-based data processing system having a plurality of connected databases, comprising:
    an input component for entry of customer orders;
    a processor for validating customer orders and controlling user interaction with the plurality of databases through a plurality of components operating on the processor, including:
    a component for automatically checking inventory for availability of ordered goods;
    a component for enabling retrieval and tracking of goods stored in inventory to create shipping loads;

a component for building shipping loads from the retrieved goods; and a component for scheduling delivery of shipping loads to a plurality of customers;

a component for monitoring a plurality of carriers to determine an on time delivery rate for each carrier, a rate of claims for damaged or missing goods made against each carrier and a frequency at which a carrier rejects picking up a load for delivery.

2. A method for processing customer orders in a computer-based data processing system comprising the steps of:

receiving the customer orders for goods from an input source;

processing the customer orders based on information stored in a plurality of connected databases;

checking an inventory availability of the ordered goods in response to the customer orders;

retrieving the ordered goods that are available from inventory;

building a shipping load for the ordered goods available from inventory; and scheduling the shipping load with a selected carrier for delivery to a customer monitoring a plurality of carriers to determine an on time delivery rate for each carrier, a rate of claims for damaged or missing goods made against each carrier and a frequency at which a carrier rejects picking up a load for delivery.

3. The method for processing customer orders of claim 2 further comprising the step of validating customers orders as part of an order acceptance process.

4. The method for processing customer orders of claim 3 wherein the order accept process includes review of an order lead time required by the customer, a requested order delivery schedule, the customer's credit and payment history, an available inventory of customer ordered goods, a production time to build additional inventory, and availability of the carrier to meet the requested order delivery schedule.

5. The method for processing customer orders of claim 2 wherein the input source comprises customer order terminals which are used by a customer service representatives to enter customer orders.

6. The method for processing customer orders of claim 2 wherein the input source comprises an electronic data interchange (EDI) transmission.

7. The method for processing customer orders of claim 6 further comprising the step of creating an exception report and conveying the exception report to the customer if the customer order cannot be fulfilled.

8. The method for processing customer orders of claim 2 wherein the step of retrieving the ordered goods includes determining a location for each of the ordered goods in an inventory storage facility, recording a plurality of goods pulled by location, moving the pulled goods to a staging area and picking the customer order from the pulled goods.

9. The method for processing customer orders of claim 8 wherein the step of recording pulled inventory includes identifying the location, lot and quantity of goods pulled.

10. The method for processing customer orders of claim 2 wherein the step of building a shipping load comprises consolidating less than full truckload customer orders based on a transportation algorithm that considers at least a transit time to a destination and a delivery date for the customer order.

11. The method for processing customer orders of claim 10 wherein the transportation algorithm further considers a commodity type for each of the goods shipped and a maximum and a legal capacity load for a carrier's transportation vehicle.

12. The method for processing customer orders of claim 2 further comprising the step of tendering a load to the selected carrier based on a plurality of selection factors.

13. The method for processing customer orders of claim 12 wherein the plurality of selection factors includes cost of shipping and a service rating.

14. The method for processing customer orders of claim 2 further comprising the step of releasing the shipping load to the carrier and generating a bill of lading for the shipping load.

15. The method for processing customer orders of claim 2 wherein the plurality of connected databases includes a deals database, a pricing database, a customer order management and fulfillment database and an inventory database.

16. The method for processing customer orders of claim 15 wherein the deals database stores information relating to discount lists for goods, and sales targets by category of goods and by customer.

17. A system for processing customer orders comprising:

an input component for accepting orders for goods received from customers;

a plurality of databases that are accessed by the input component;

a component for processing customers orders based on information stored in the plurality of databases;

a component for checking inventory availability for ordered goods;

a component for facilitating the retrieval of the ordered goods that are available from inventory, including a module for determining a location of each of the ordered goods in an inventory storage facility; and a module for recording a plurality of goods pulled by location;

a component for building a shipping load for the ordered good available from inventory; and a component for scheduling the shipping load with a selected carrier for customer delivery.

18. The system for processing customer orders of claim 17 wherein the input component comprises at least one input terminal which is used by a customer service representative to enter customer orders.

19. The system for processing customer orders of claim 17 wherein the input component comprises an electronic data interchange transmission.

20. The system for processing customer orders of claim 17 wherein the plurality of databases include a deals database, a pricing database, a customer order management and fulfillment database and an inventory database.

21. The system for processing customer orders of claim 20 wherein the deals database stores information relating to discount lists for goods, and sales targets by category of goods and by customer.

22. The system for processing customer orders of claim 17 further comprising a component for validating customer orders as part of an order acceptance process.

23. The system for processing customer orders of claim 22 wherein the component for validating comprises a module for evaluating a plurality of criteria before accepting a customer order.

24. The system for processing customer orders of claim 23 wherein the plurality of criteria include an order lead time required by the customer, a requested order delivery schedule, the customer's credit and payment history, an available inventory of customer ordered goods, a production time to build additional inventory, and availability of the selected carrier to meet the requested order delivery schedule.

25. The system for processing customer orders of claim 17 wherein the component for checking inventory availability includes a module for enabling inventory data base queries from the input component.

26. The system for processing customer orders of claim 17 wherein the component for building a shipping load comprises a module for determining a transit time to a destination and a delivery date for the customer order.

27. The system for processing customer orders of claim 17 wherein the module for determining also considers a commodity type for each of the goods shipped and a maximum and legal capacity for a carrier's transport vehicle.

28. The system for processing customer orders of claim 17 wherein the component for scheduling the shipping load comprises a module for monitoring a performance history of a plurality of carriers.

29. The system for processing customer orders of claim 28 wherein the module for monitoring determines an on time delivery rate for each carrier, a damaged or missing goods claim rate made against each carrier, and a frequency at which a carrier rejects picking up a load for delivery.

30. The system for processing customer orders of claim 17 further comprising a component for releasing the shipping load to the carrier.

31. The system for processing customer orders of claim 30 wherein the component for releasing comprises a module for generating a bill of lading.

32. A method for providing logistic support for customer order management over a computer communications network comprising the steps of:
  receiving customer orders for goods over the communications network to generate load criteria;
  performing customer order consolidation based on the load criteria;
  assembling loads from inventory based on customer order consolidation; and
  selecting a carrier for delivery of the assembled loads based on a plurality of carrier selection criteria;
  wherein the step of assembling loads from inventory comprises determining a location for each of the customer-ordered goods in an inventory storage facility, recording a plurality of goods pulled by location, moving the pulled goods to a staging area and picking the customers' orders from the pulled goods.

33. The method for providing logistic support of claim 32 wherein the step of selecting a carrier comprises cost of shipping and a service rating.

34. The method for providing logistic support of claim 33 wherein the service rating of a carrier is determined by monitoring a plurality of carriers to determine an on time delivery rate for each carrier, a rate of claims for damaged or missing goods made against each carrier and a frequency at which a carrier rejects picking up a load for delivery.

35. A system for providing logistics support for customer order management over a computer communications network, comprising:
  an input component for receiving customer orders for goods over the communications network in order to generate load criteria;
  a component for performing customer order consolidation based on the load criteria;
  a component for assembling loads from inventory based on customer order consolidation; and
  a component for selecting a carrier for delivery of the assembled loads based on a plurality of carrier selection criteria comprising a module that determines a service rating for each of a plurality of carriers and considers both the service rating and cost of shipping in evaluating each carrier.

36. The system for providing logistics support of claim 35 further comprising a routing component for determining a routing for delivery of customer goods based on the load criteria.

37. The system for providing logistics support of claim 35 wherein the component for performing customer order consolidation comprises a transportation module that considers at least a transit time to a destination and a delivery date for the customer order.

38. The system for providing logistics support of claim 37 wherein the transportation module further considers a commodity type for each of the goods shipped and a maximum and legal capacity load for a carrier's transportation vehicle.

39. The system for providing logistics support of claim 35 wherein the component for assembling loads from inventory comprises a module for determining a location for each of the customer-ordered goods in an inventory storage facility, recording a plurality of goods pulled by location, moving the pulled goods to a staging area and picking the customers' orders from the pulled goods.

40. The system for providing logistics support of claim 35 wherein the module that determines a service rating for each carrier evaluates an on time delivery rate, a rate of claims for damaged or missing goods and a frequency of rejection for picking up a load for delivery.

* * * * *